United States Patent [19]

Shikama

[11] Patent Number: 5,671,993
[45] Date of Patent: Sep. 30, 1997

[54] PROJECTION-TYPE APPARATUS

[75] Inventor: Shinsuke Shikama, Nagaokakyo, Japan

[73] Assignee: Mitsubishi Denki Kabushiki Kaisha, Japan

[21] Appl. No.: 238,067

[22] Filed: May 4, 1994

Related U.S. Application Data

[62] Division of Ser. No. 998,948, Dec. 30, 1992, Pat. No. 5,442,484.

[30] Foreign Application Priority Data

| Jan. 6, 1992 | [JP] | Japan | 4-000235 |
| Mar. 25, 1992 | [JP] | Japan | 4-67105 |
| Sep. 9, 1992 | [JP] | Japan | 4-240793 |

[51] Int. Cl.⁶ ............................................. G03B 21/28
[52] U.S. Cl. ........................... 353/77; 353/78; 353/97
[58] Field of Search .......................... 353/74, 75, 76, 353/77, 78, 98, 99, 97; 348/744, 782, 786, 787, 789, 794, 836

[56] References Cited

U.S. PATENT DOCUMENTS

| 4,257,694 | 3/1981 | Reinhard | 353/78 |
| 4,544,946 | 10/1985 | VanBreemer | 348/786 |
| 4,578,710 | 3/1986 | Hasegawa | 353/78 |
| 4,708,435 | 11/1987 | Yata et al. | 353/77 |
| 4,963,016 | 10/1990 | Heijnemans et al. | 353/78 |
| 5,278,595 | 1/1994 | Nishida et al. | 348/751 |
| 5,285,287 | 2/1994 | Shikama | 348/745 |
| 5,311,227 | 5/1994 | Takayasu et al. | 353/37 |

FOREIGN PATENT DOCUMENTS

| 1-120192 | 5/1989 | Japan . |
| 1-157688 | 6/1989 | Japan . |
| 1-115778 | 8/1989 | Japan . |
| 3083038 | 4/1991 | Japan | 353/74 |

*Primary Examiner*—William Dowling

[57] ABSTRACT

A retro-focus type lens is provided from a large conjugate side with a first lens group having a negative refracting power, a second lens group having a positive refracting power which is spaced away from the first lens group at an air interval D1, and a third lens group having a positive refracting power. The following conditions are satisfied when focal lengths of the first lens group, the second lens group, the third lens group, and a total lens system are assumed respectively as f1, f2, f3, and f:

$$1.8 < D1/f < 3.0$$

$$1.1 < f2/f3 < 1.6$$

$$1.5 < |f1|/f < 2.3.$$

A projection lens constructed by inserting a mirror in a lens system of thus constructed retro-focus type lens is used in a projection-type display apparatus.

30 Claims, 63 Drawing Sheets

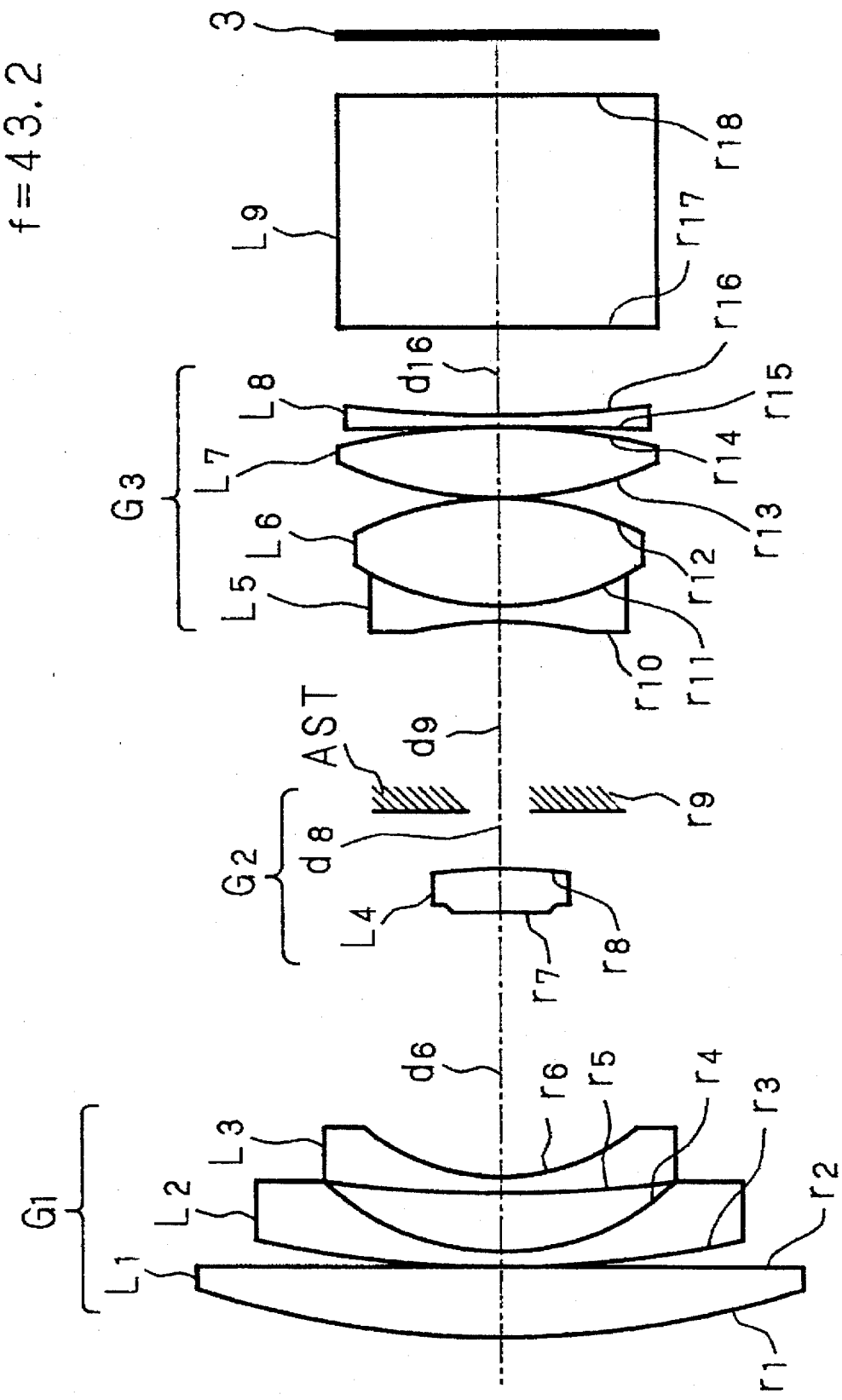

f=38.8 f=41.0 f=43.2

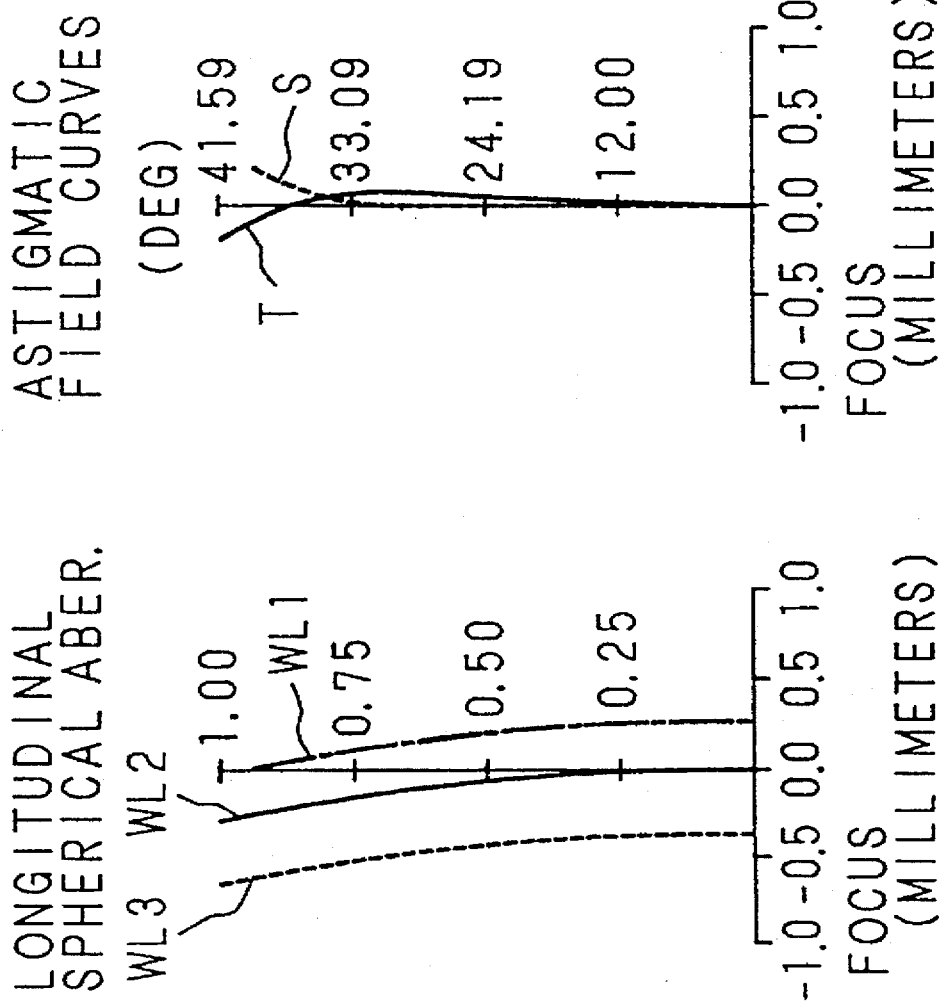
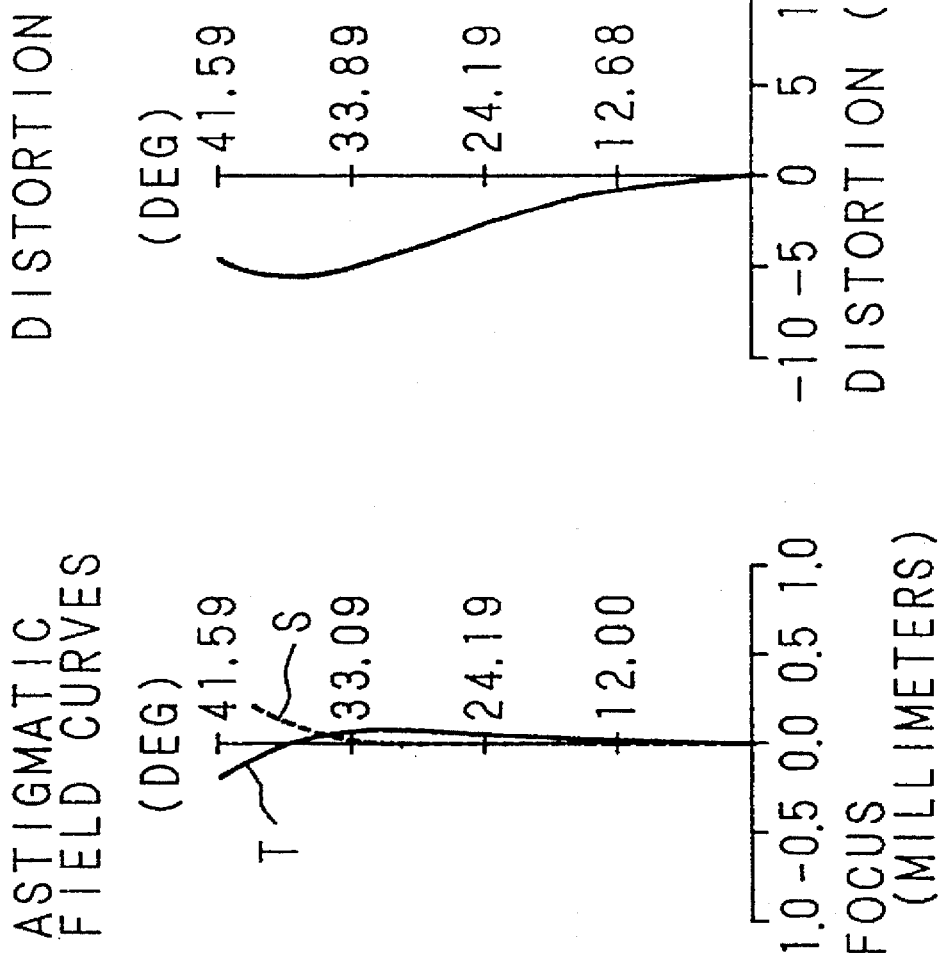
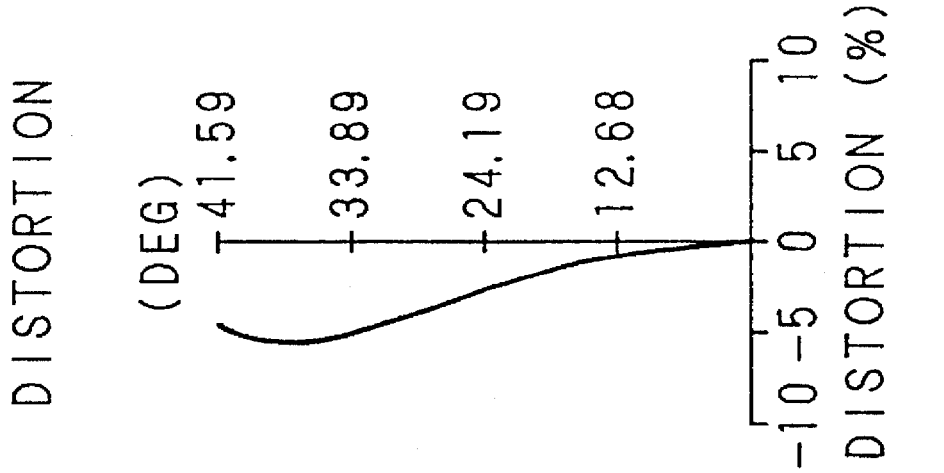
Fig. 3I(a) Longitudinal Spherical Aber.
Fig. 3I(b) Astigmatic Field Curves
Fig. 3I(c) Distortion

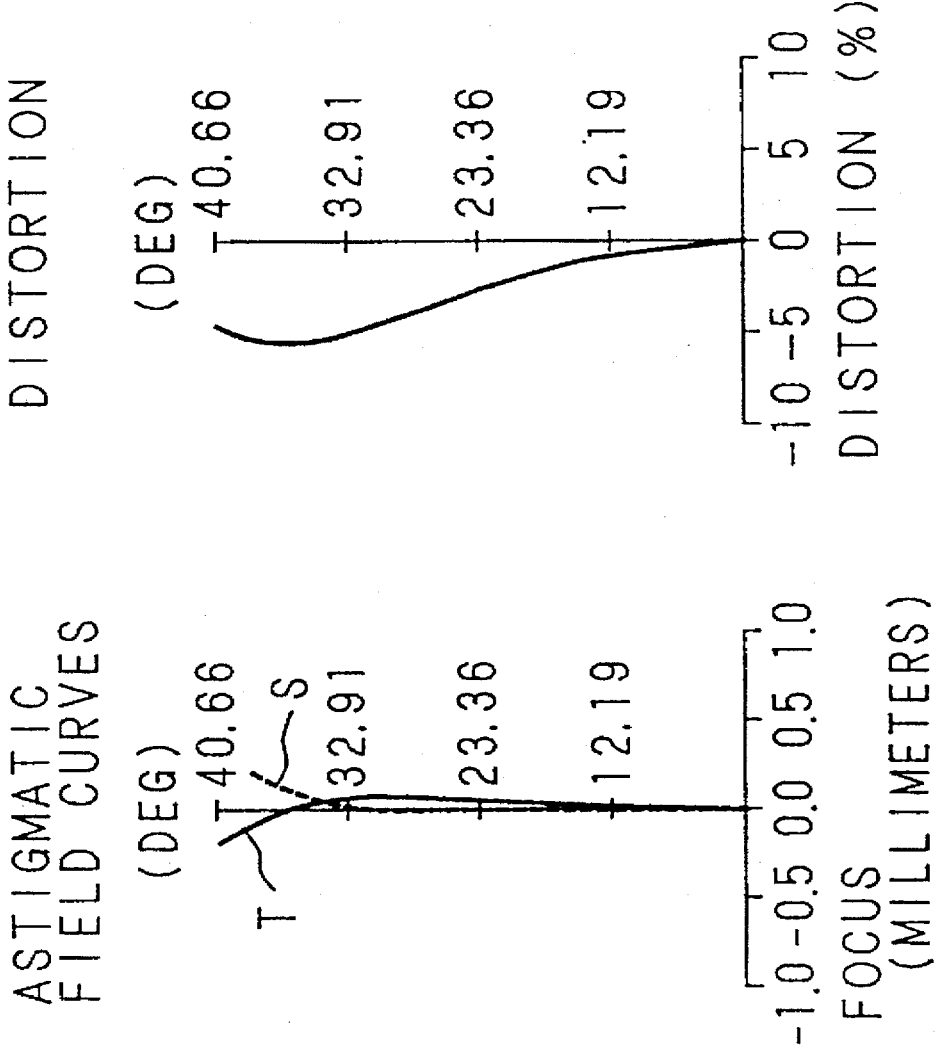

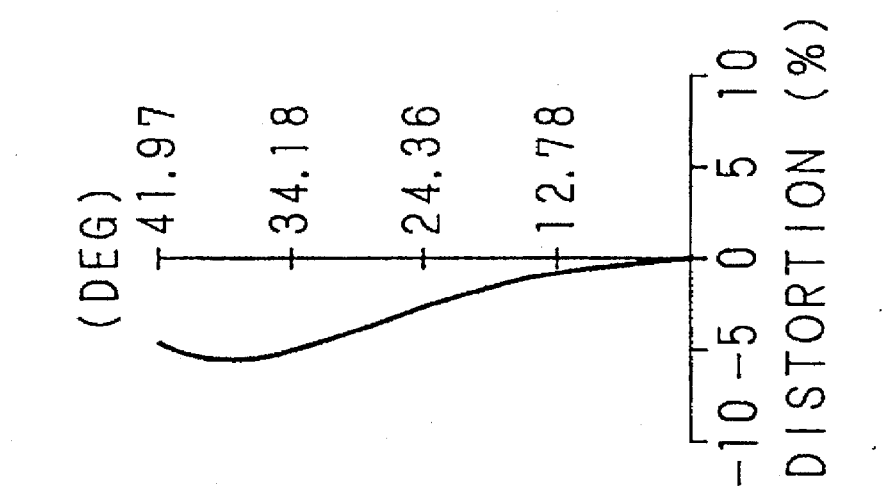
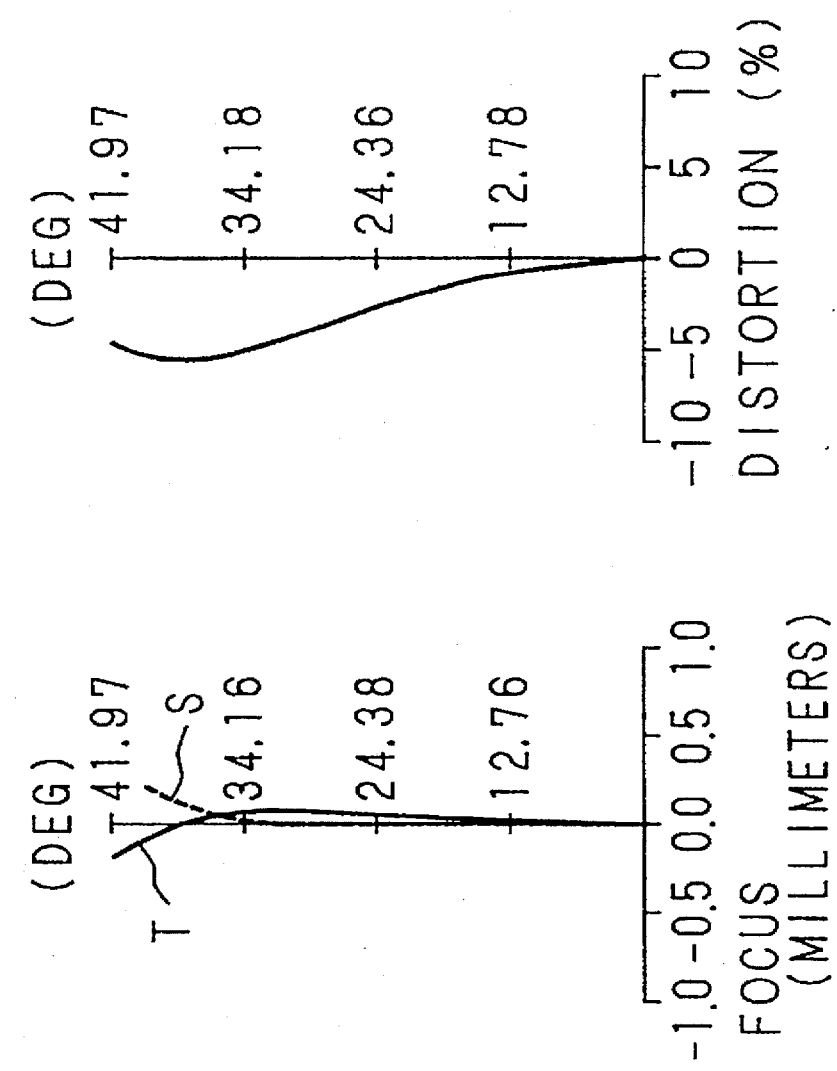
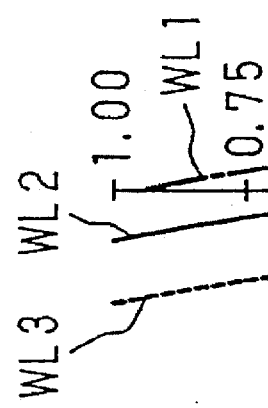

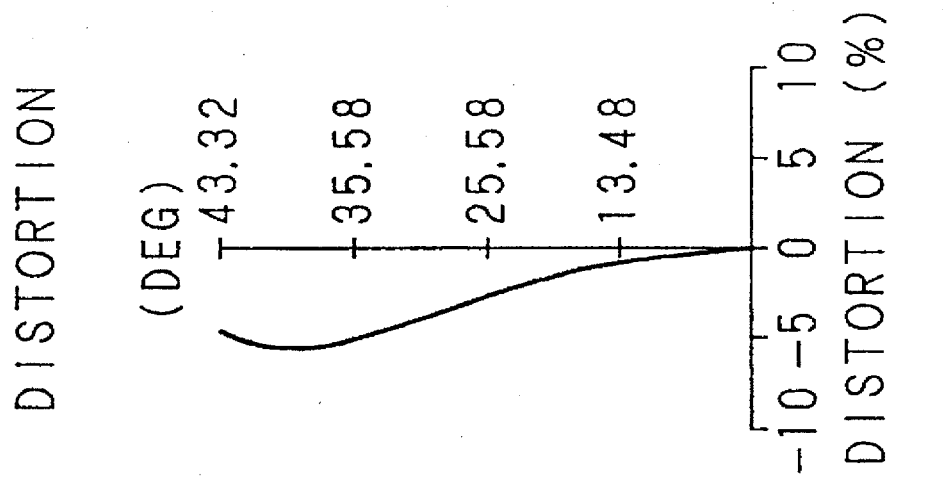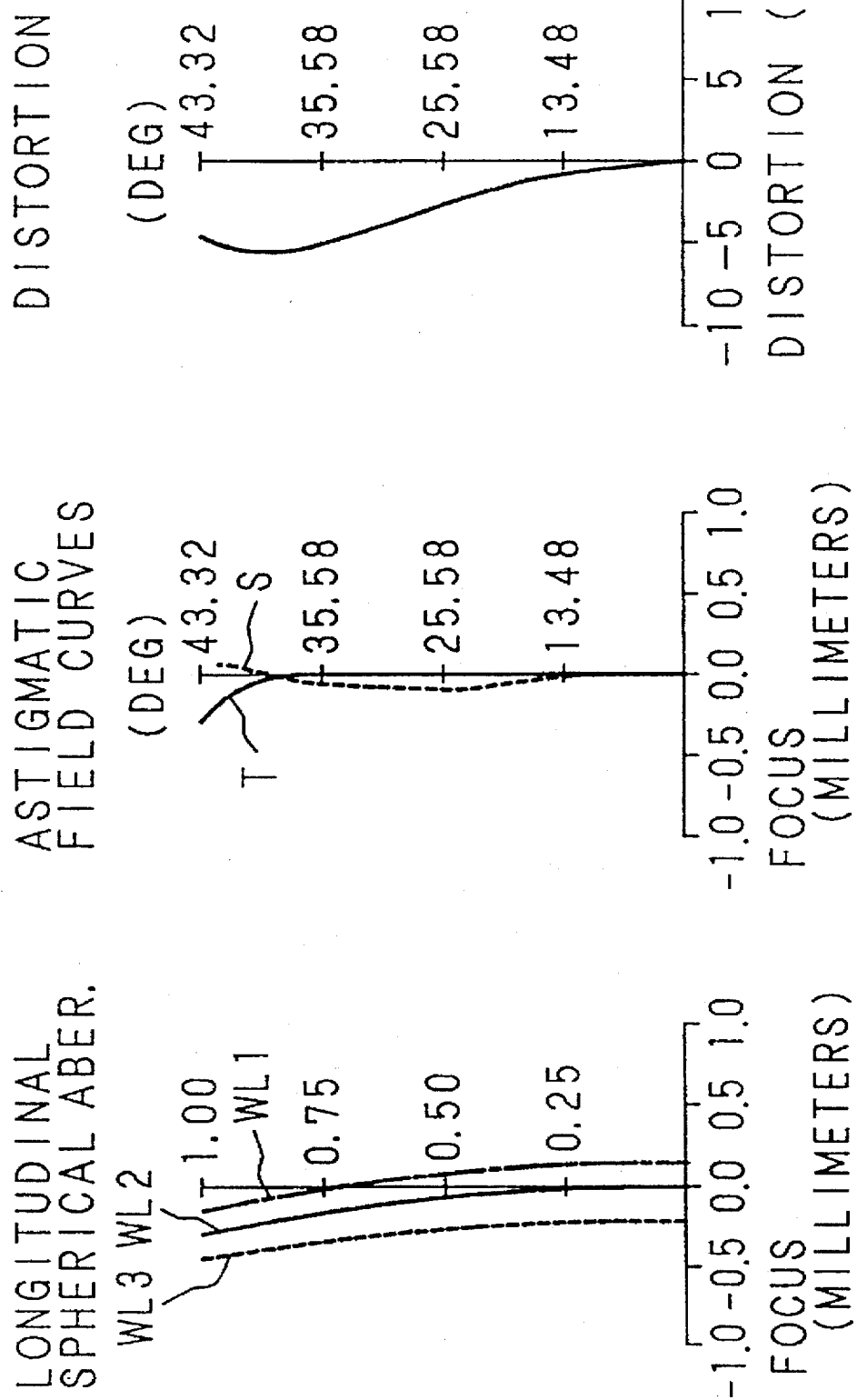

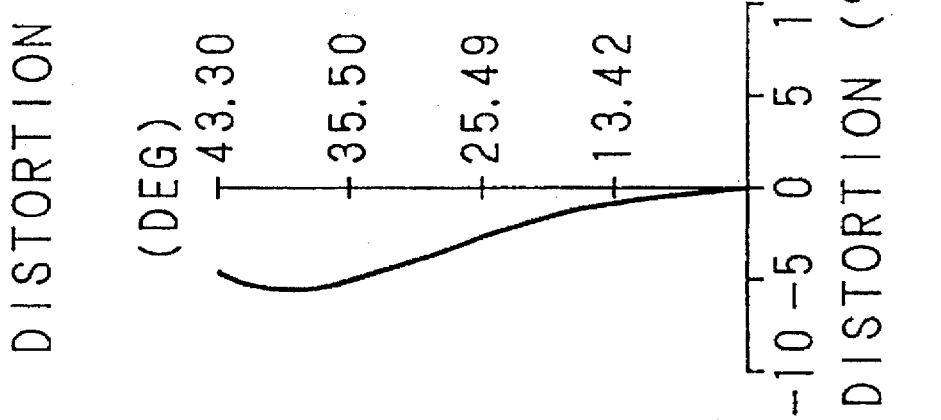
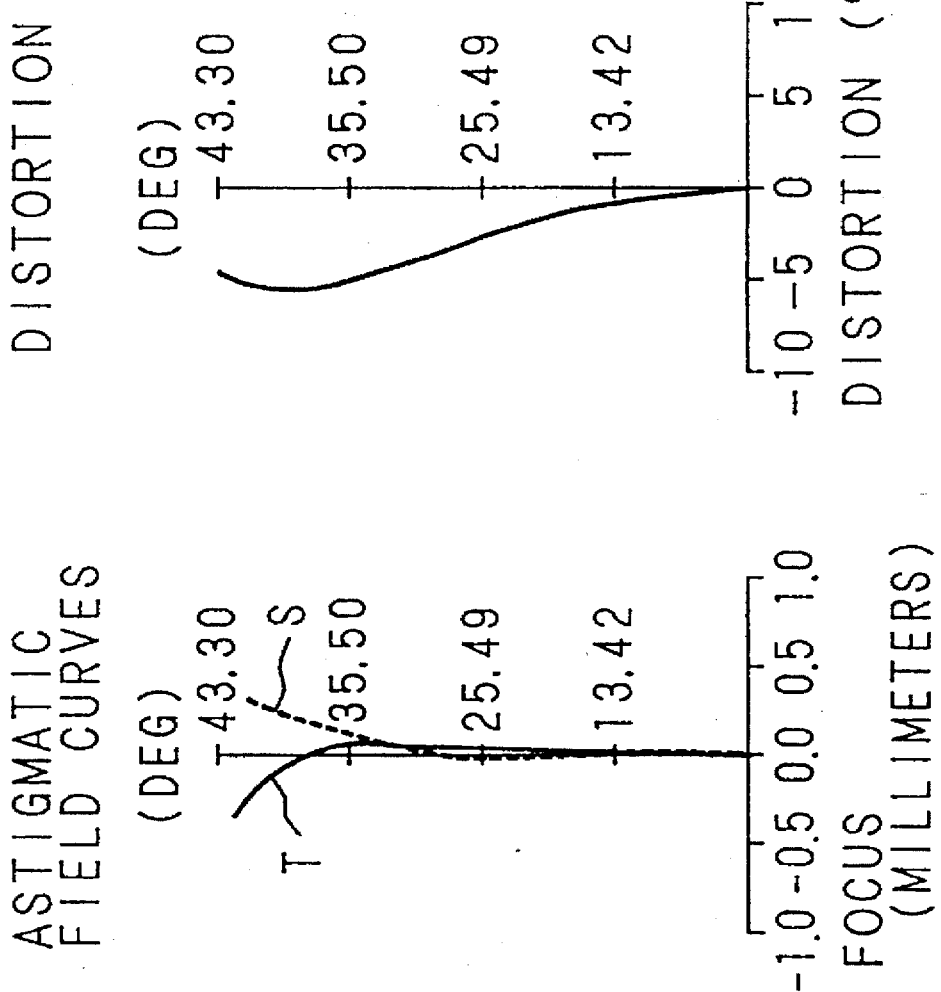
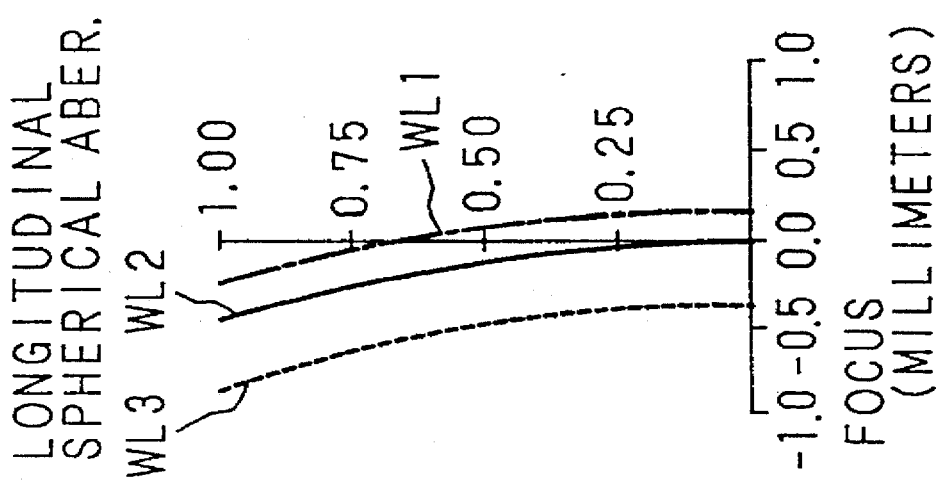

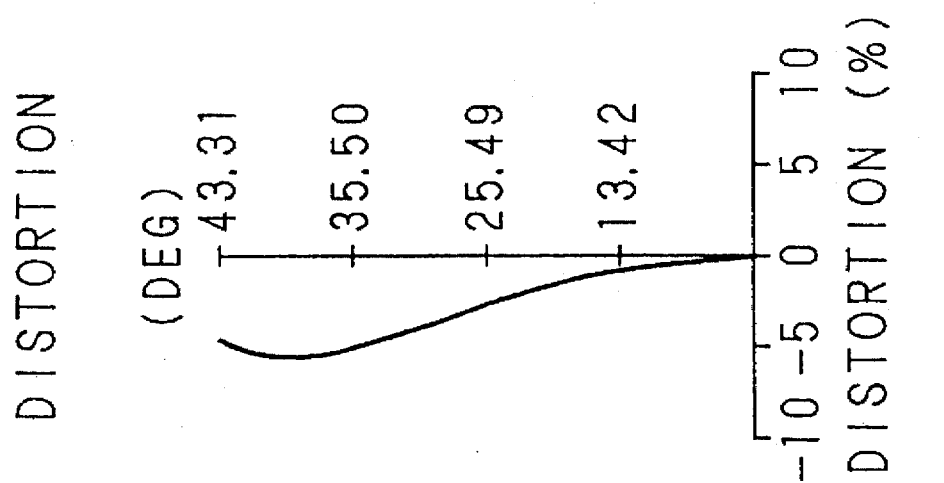
Fig. 37(c) DISTORTION
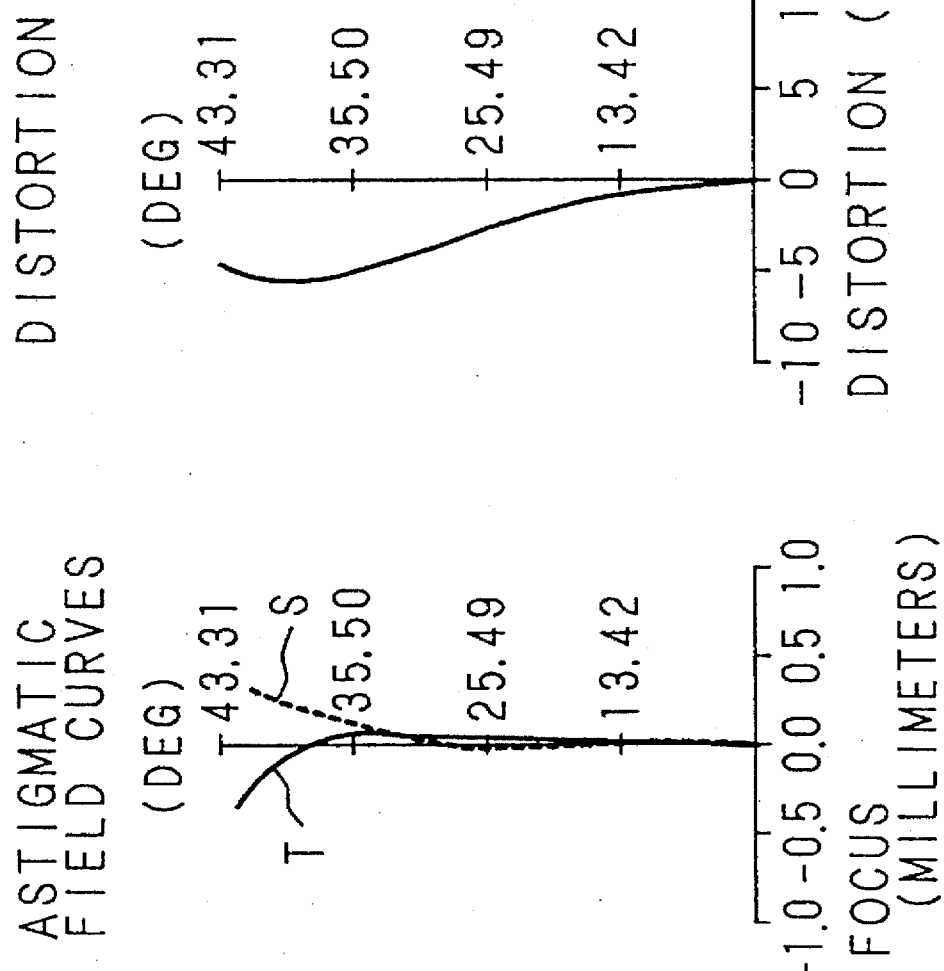
Fig. 37(b) ASTIGMATIC FIELD CURVES
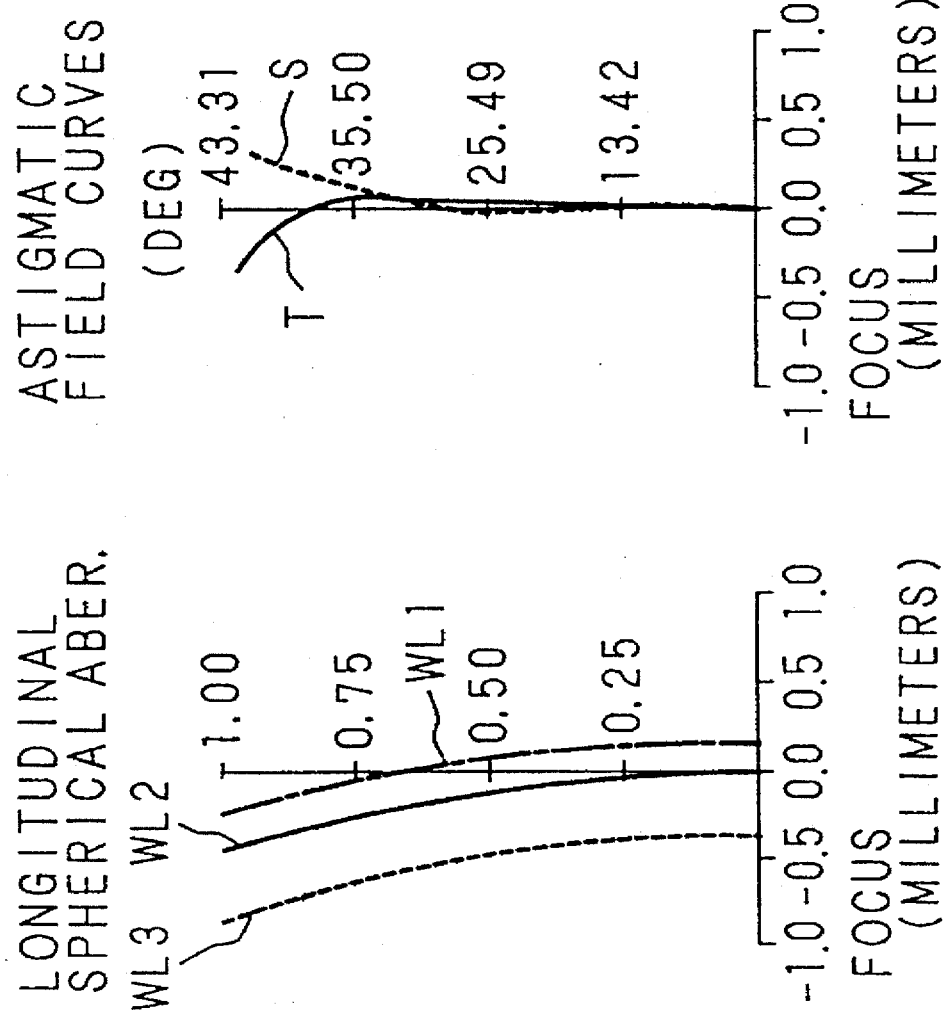
Fig. 37(a) LONGITUDINAL SPHERICAL ABER.

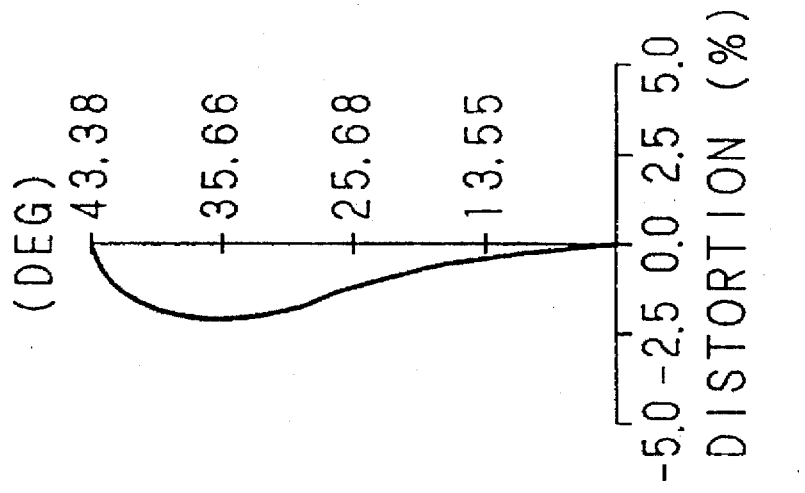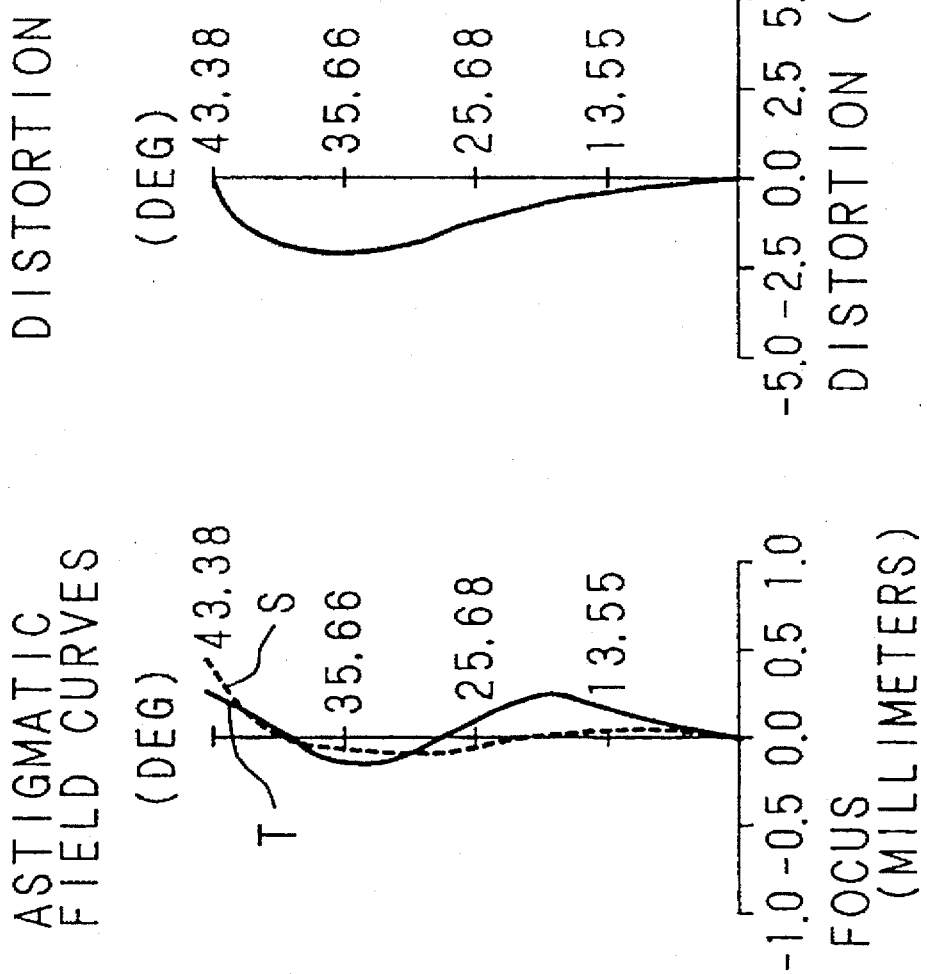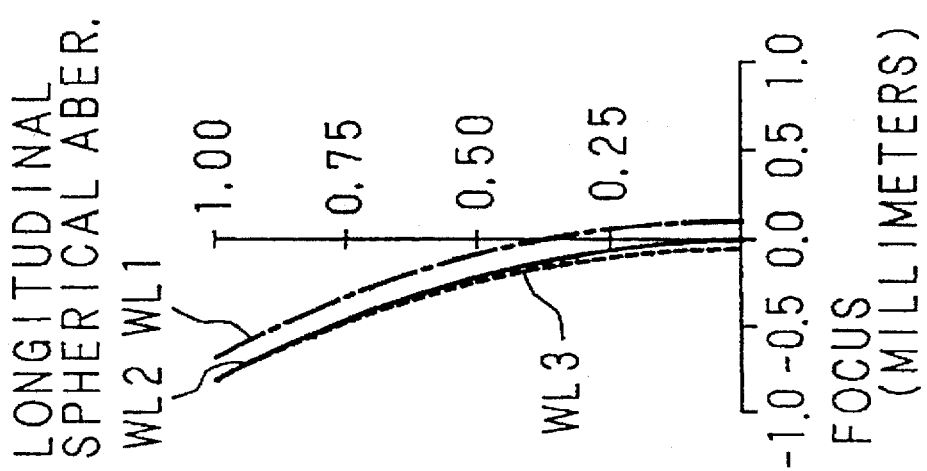

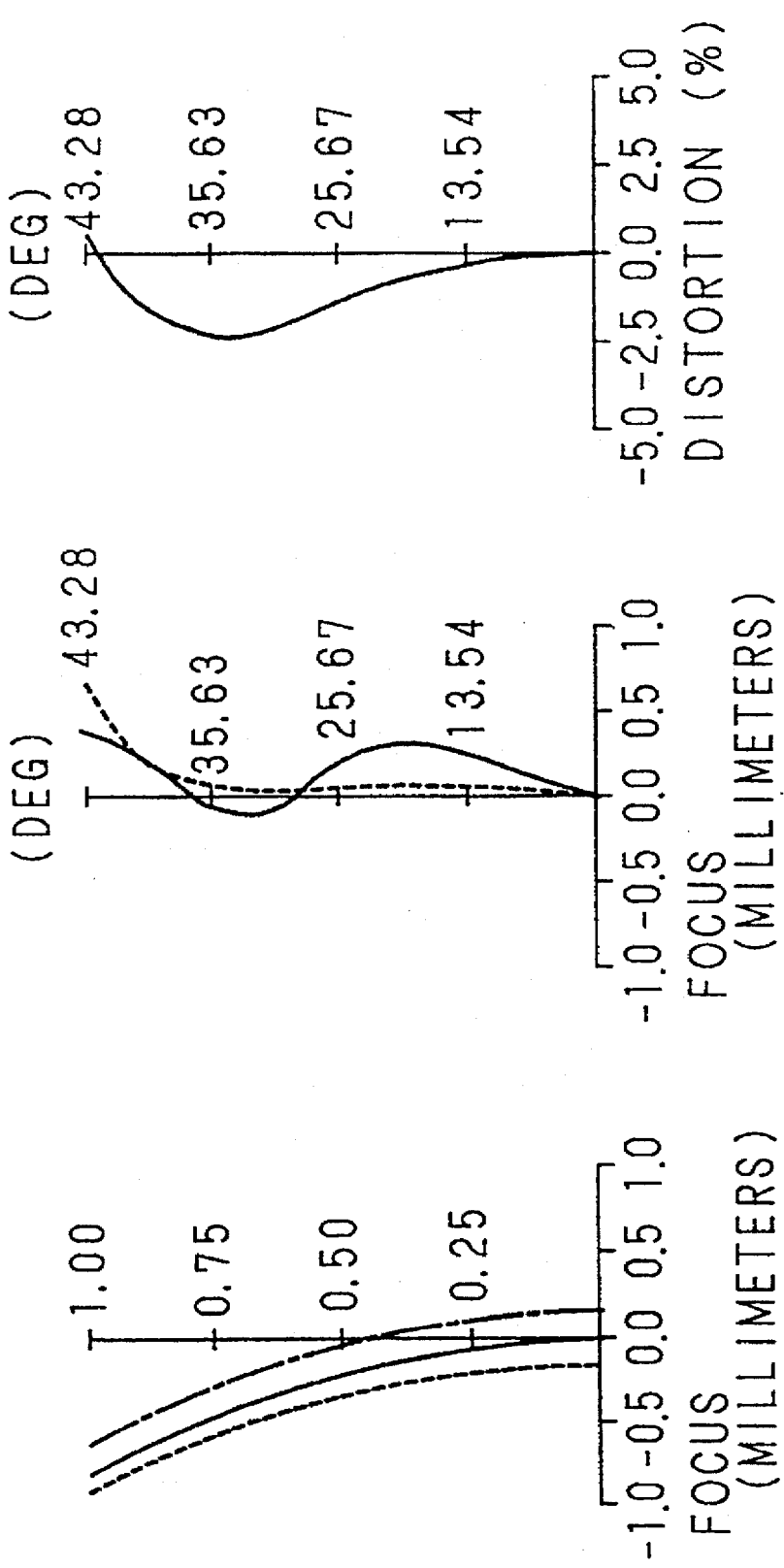
Fig. 39(a) LONGITUDINAL SPHERICAL ABER.
Fig. 39(b) ASTIGMATIC FIELD CURVES
Fig. 39(c) DISTORTION

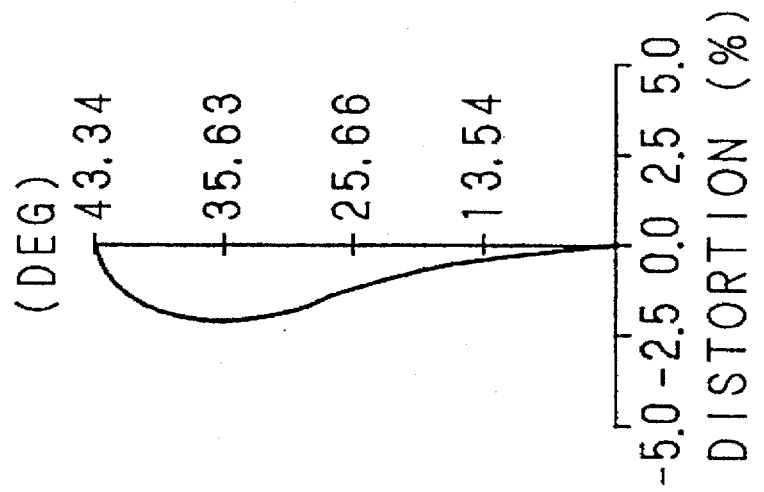
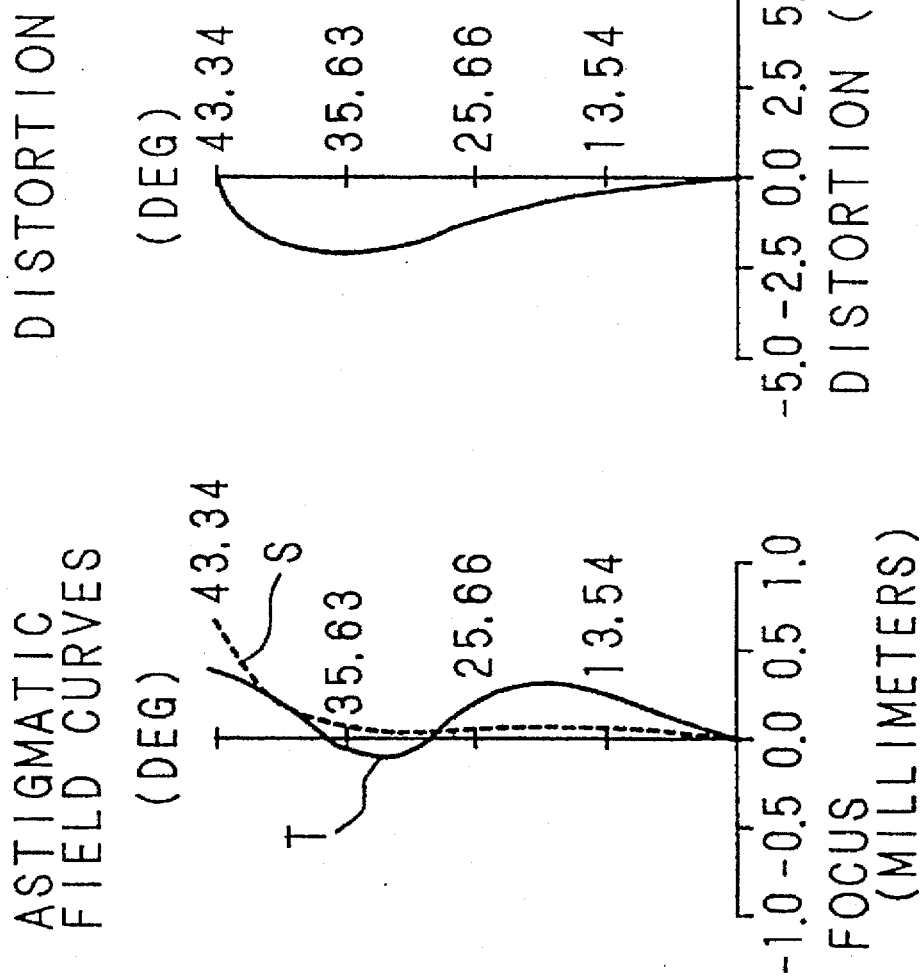
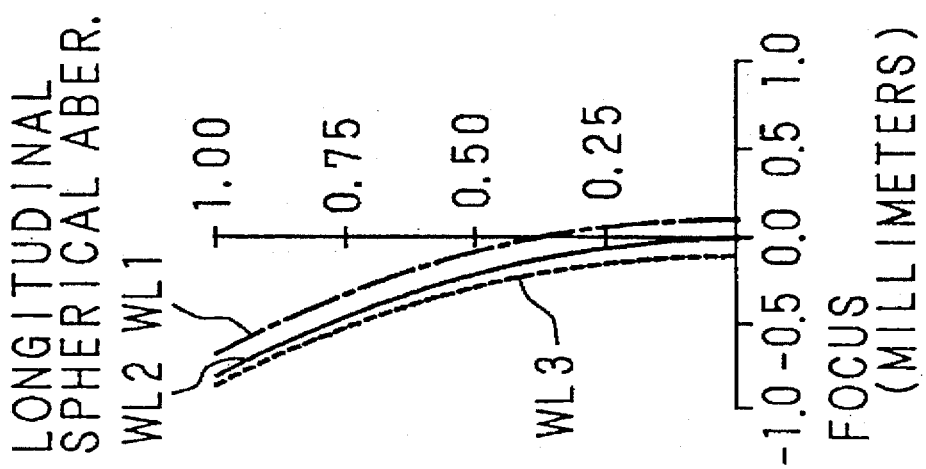

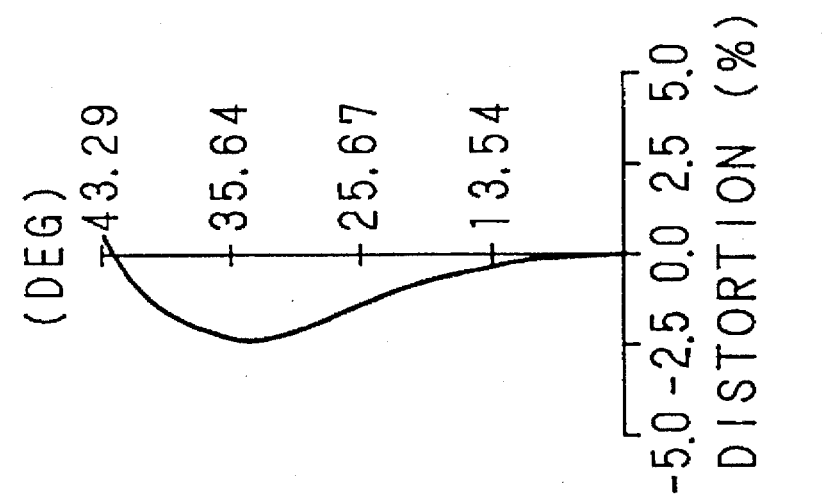
Fig. 41(c)
Fig. 41(b)
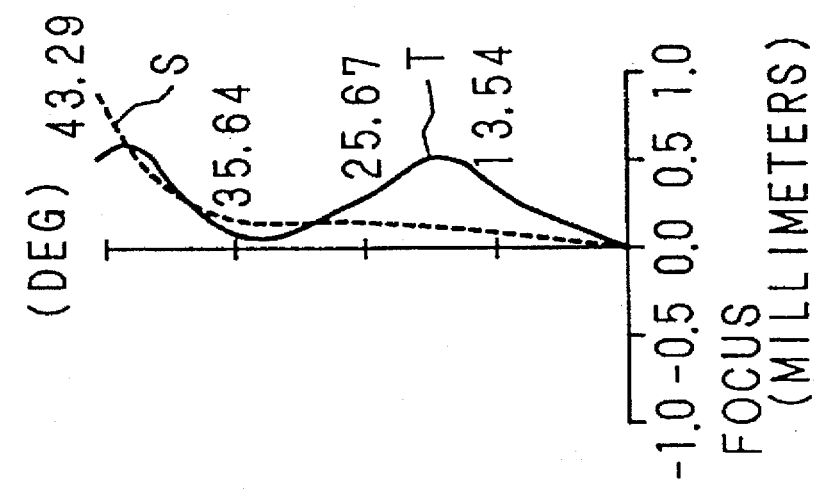
Fig. 41(a)
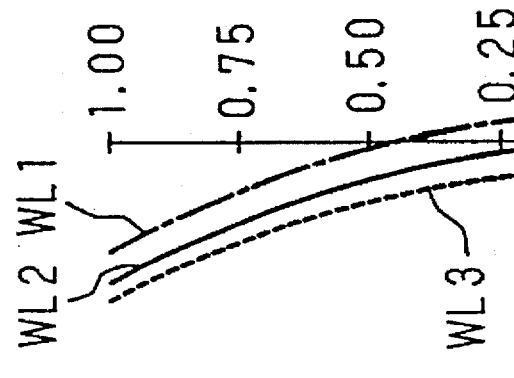

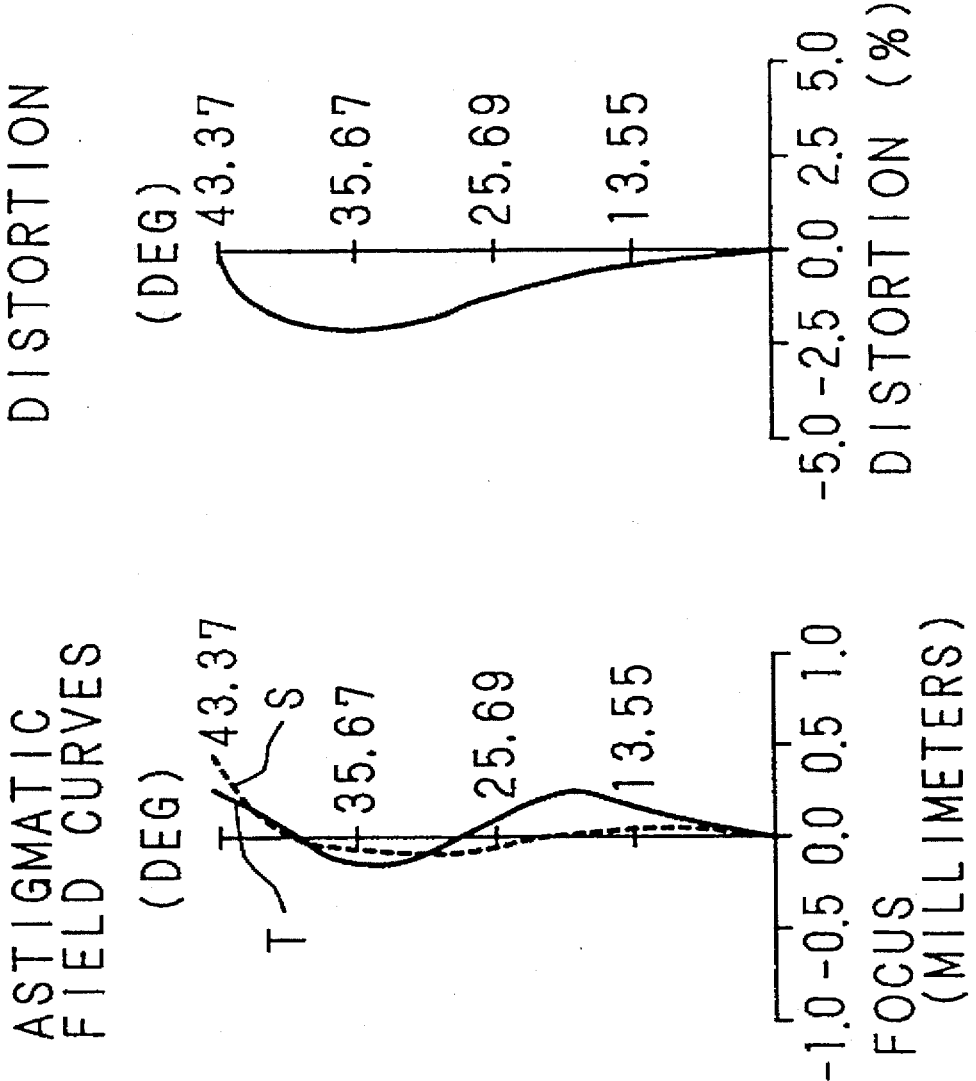
Fig. 42(a) LONGITUDINAL SPHERICAL ABER.
Fig. 42(b) ASTIGMATIC FIELD CURVES
Fig. 42(c) DISTORTION

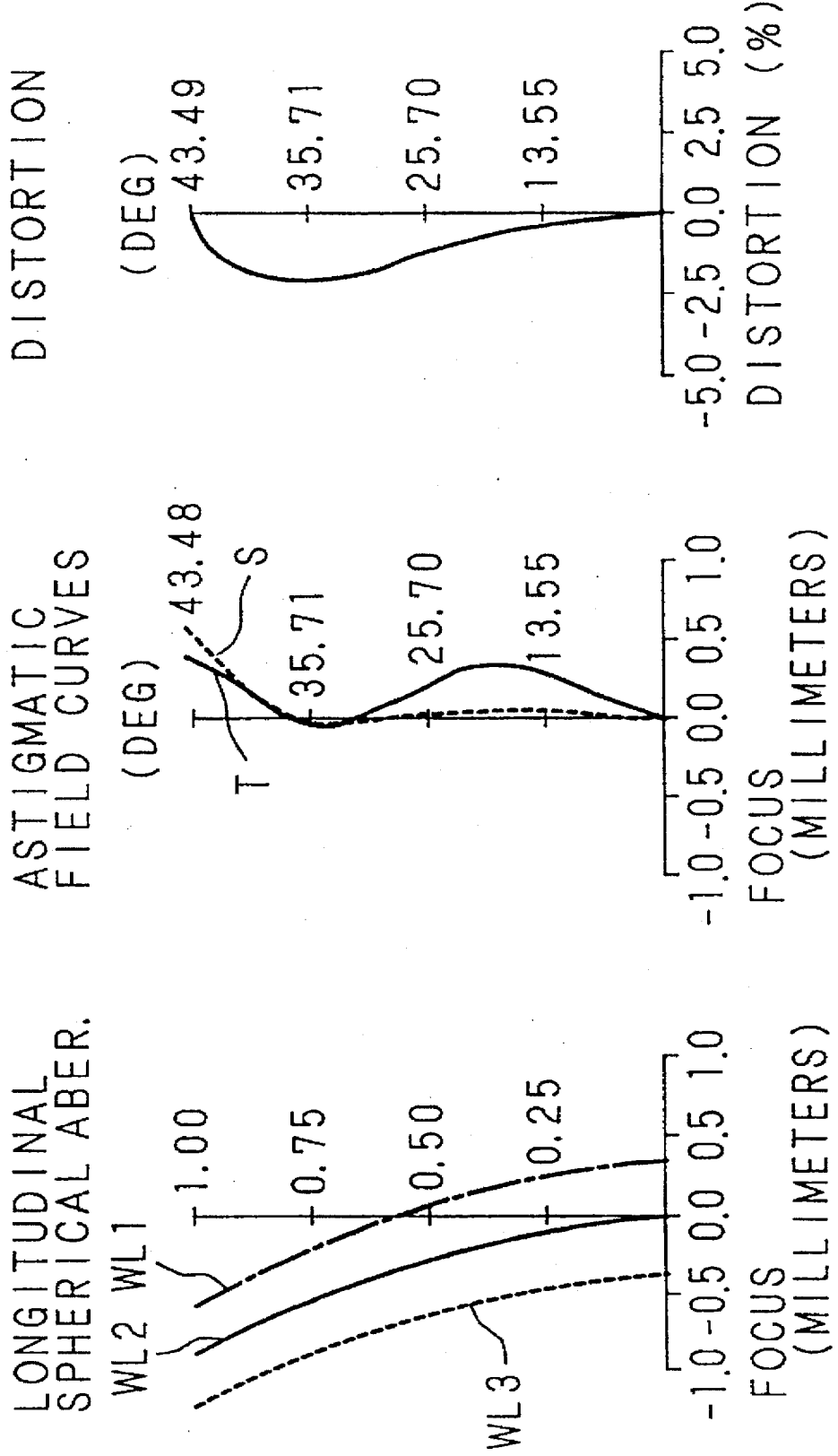

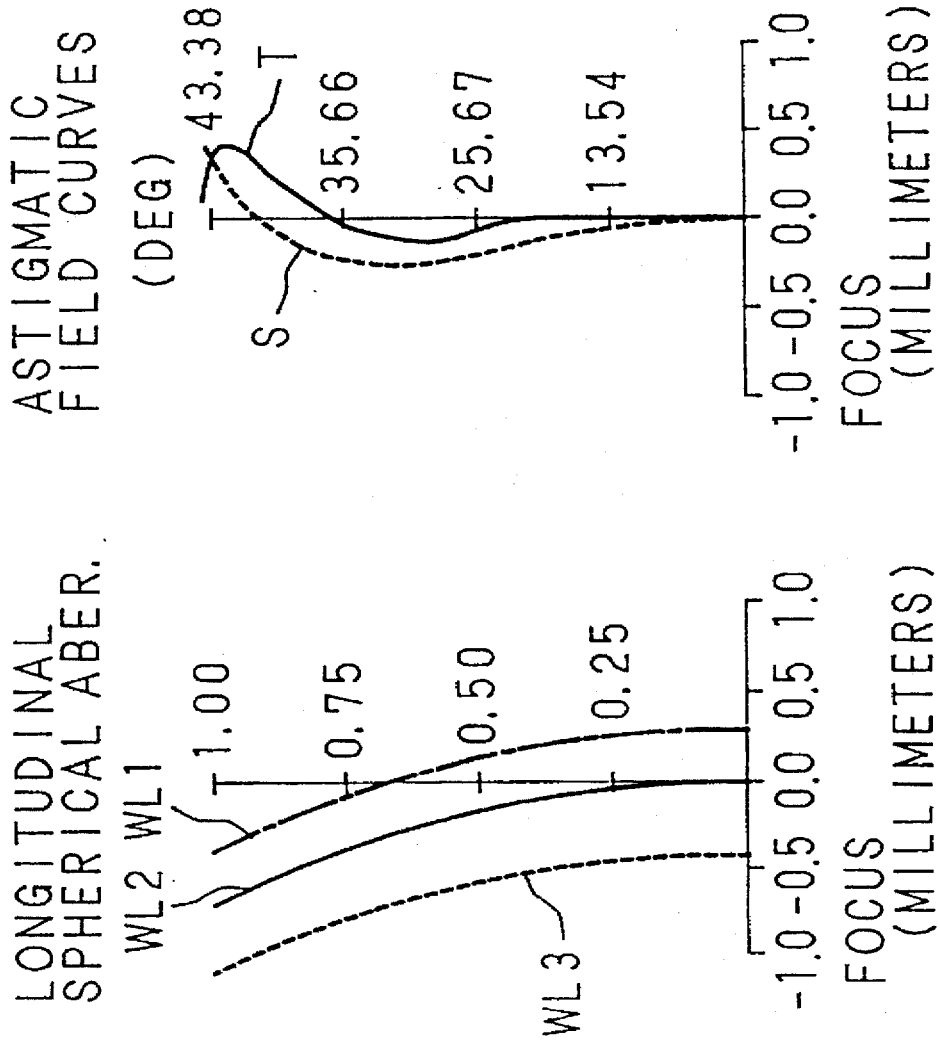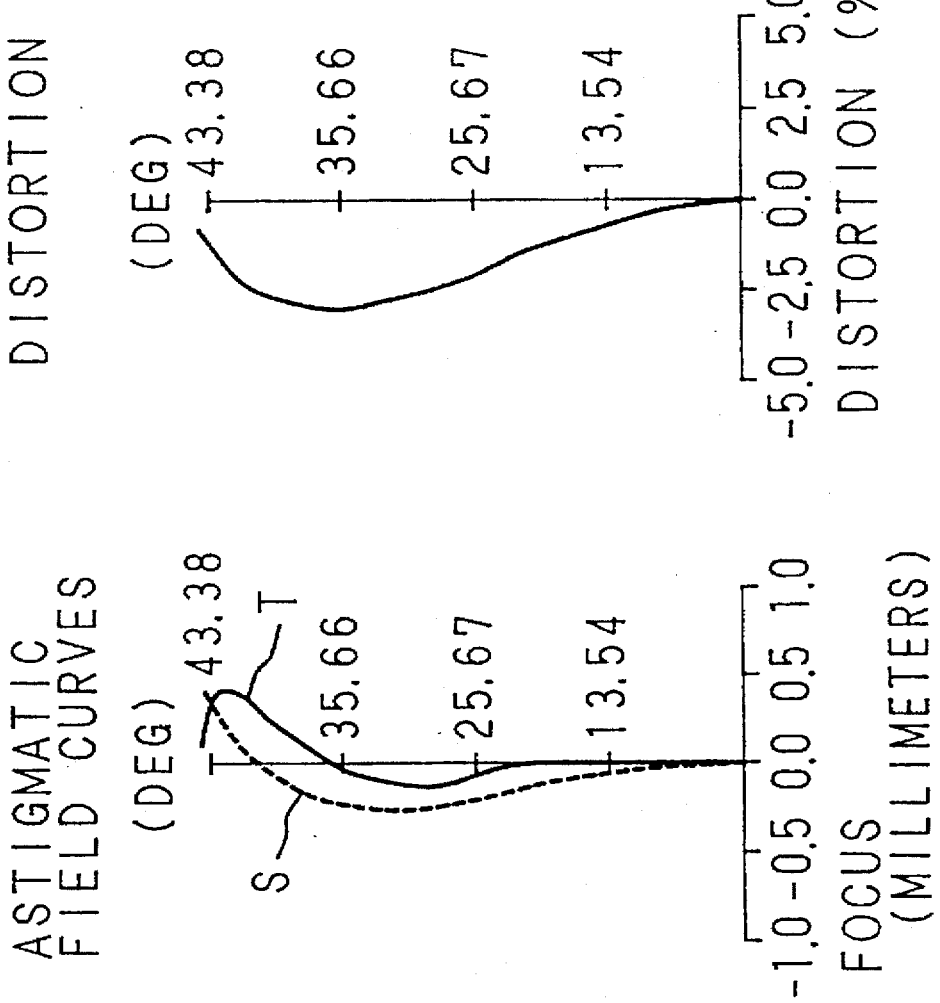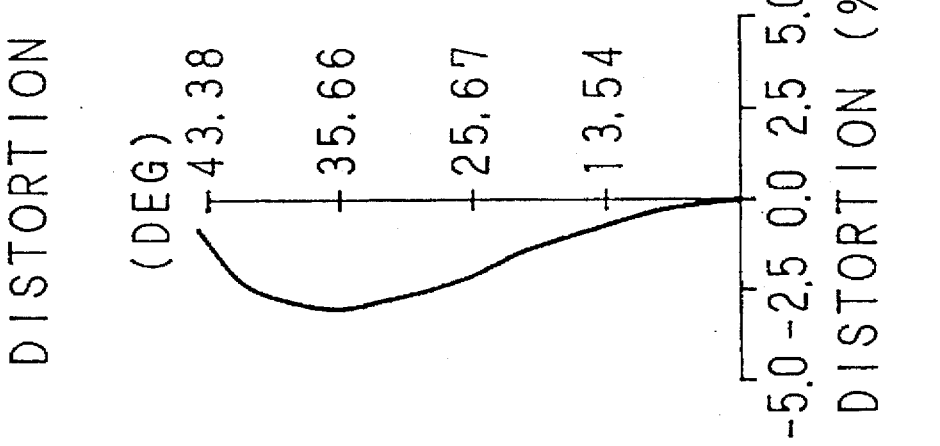

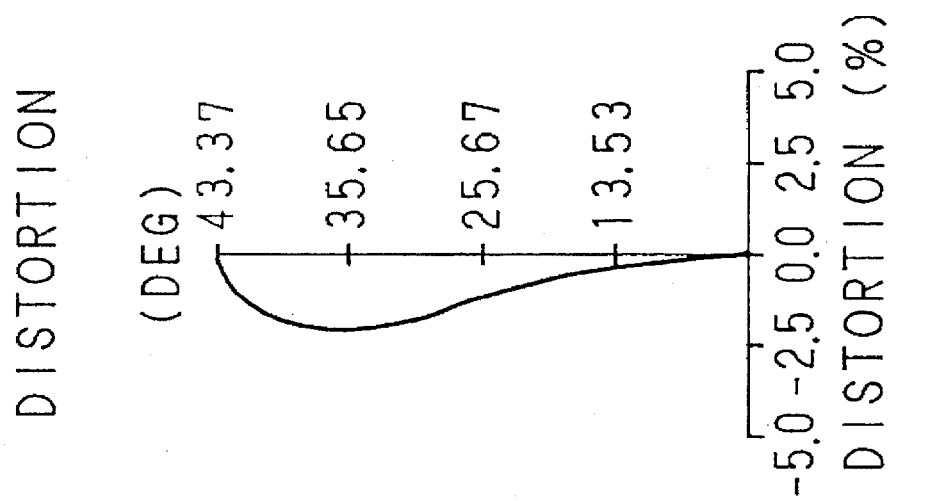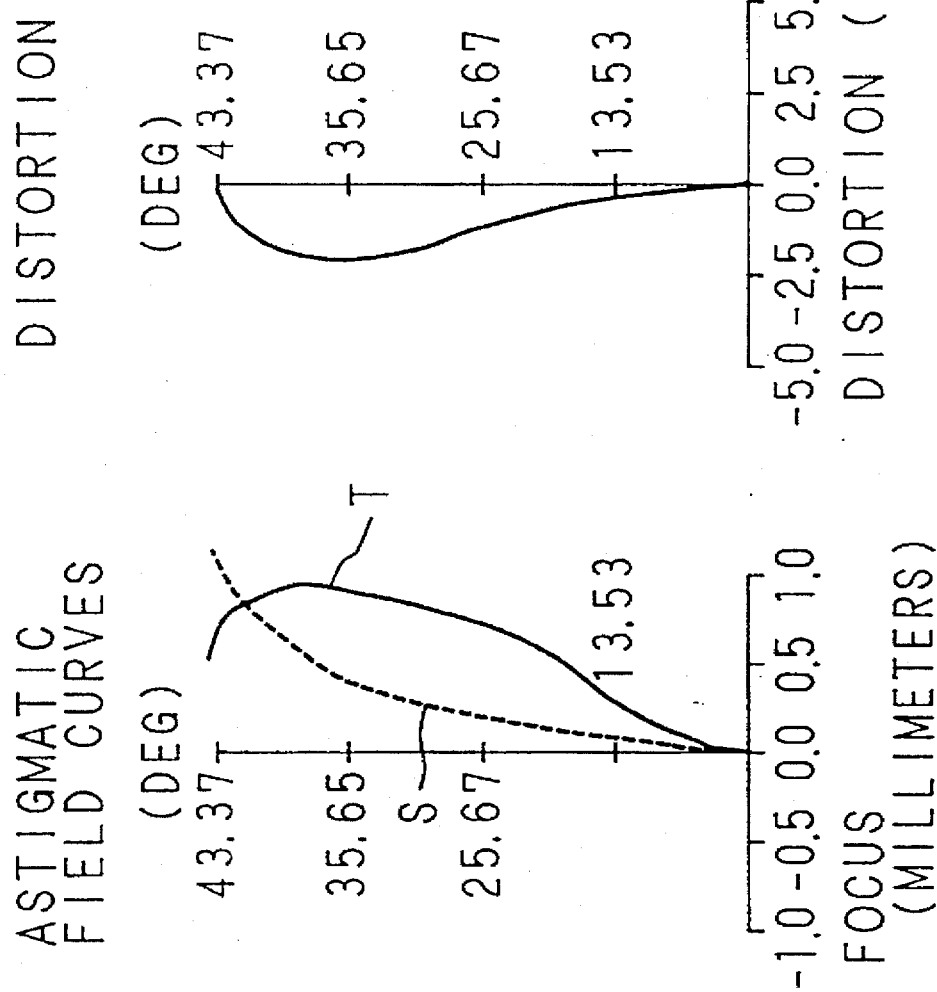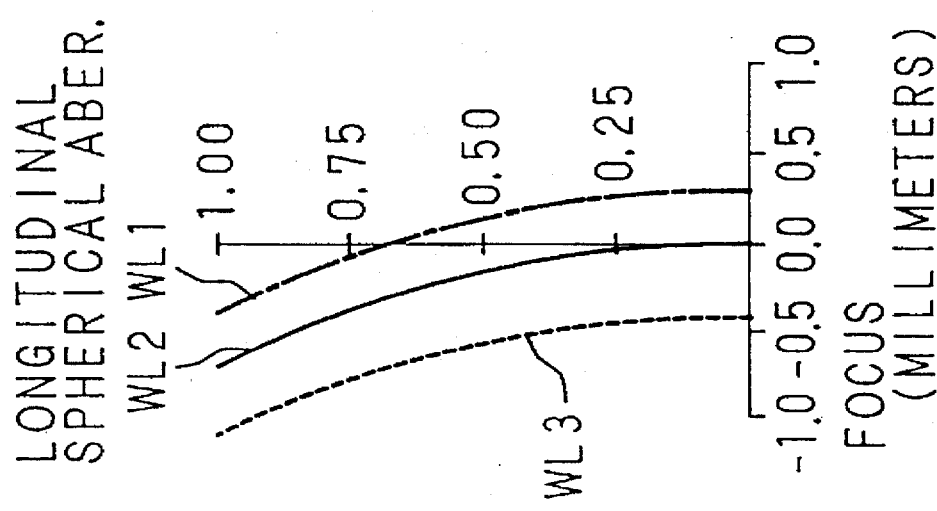

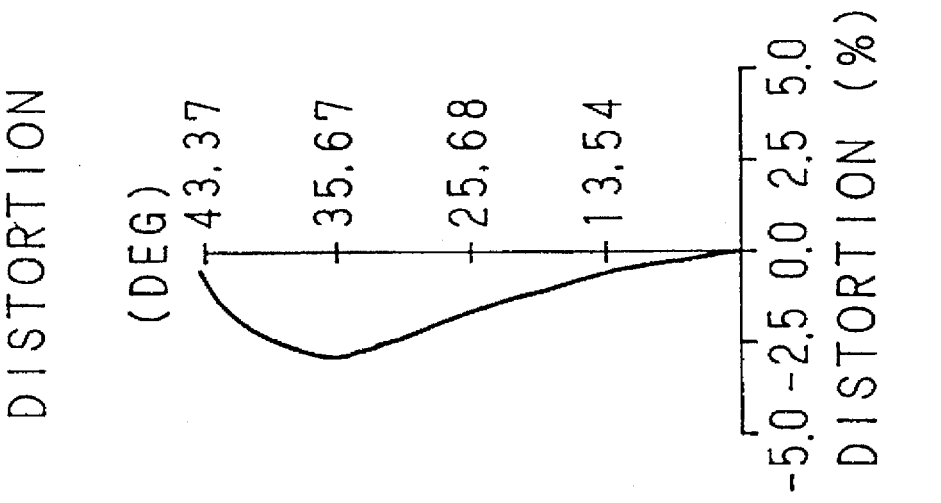
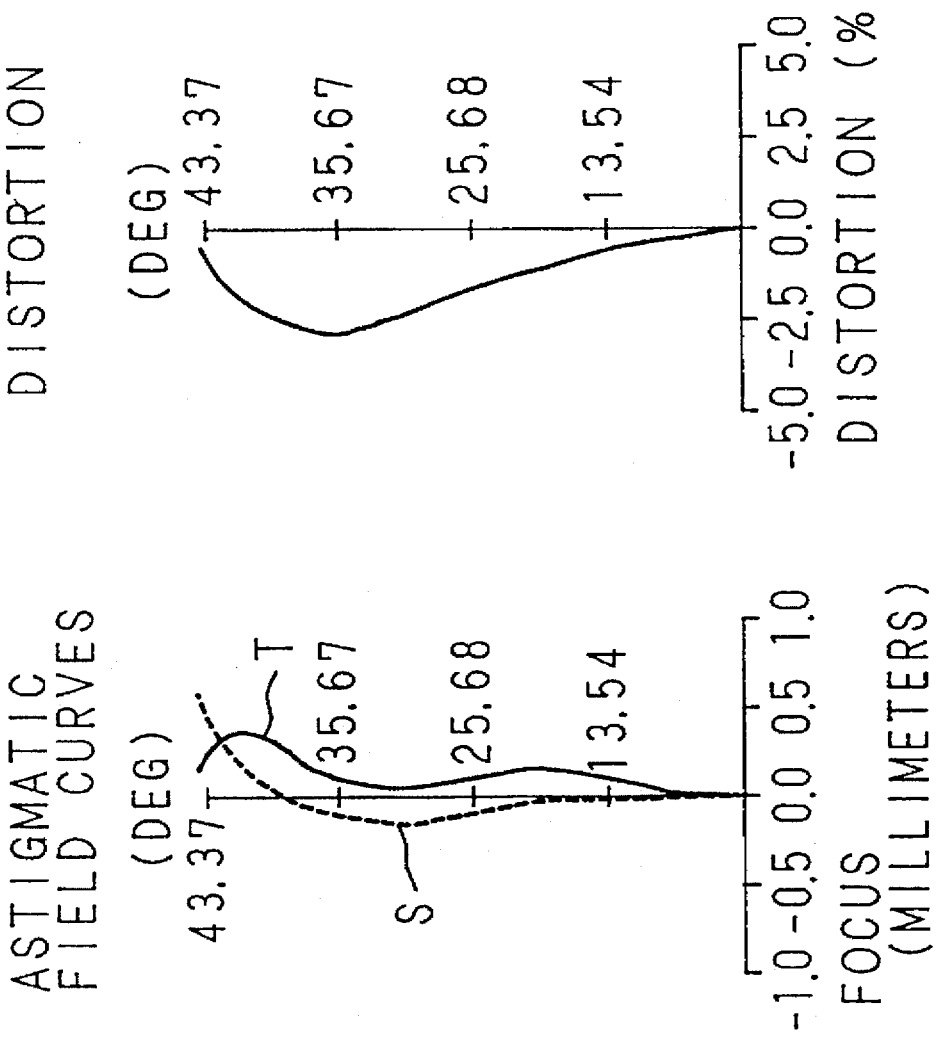
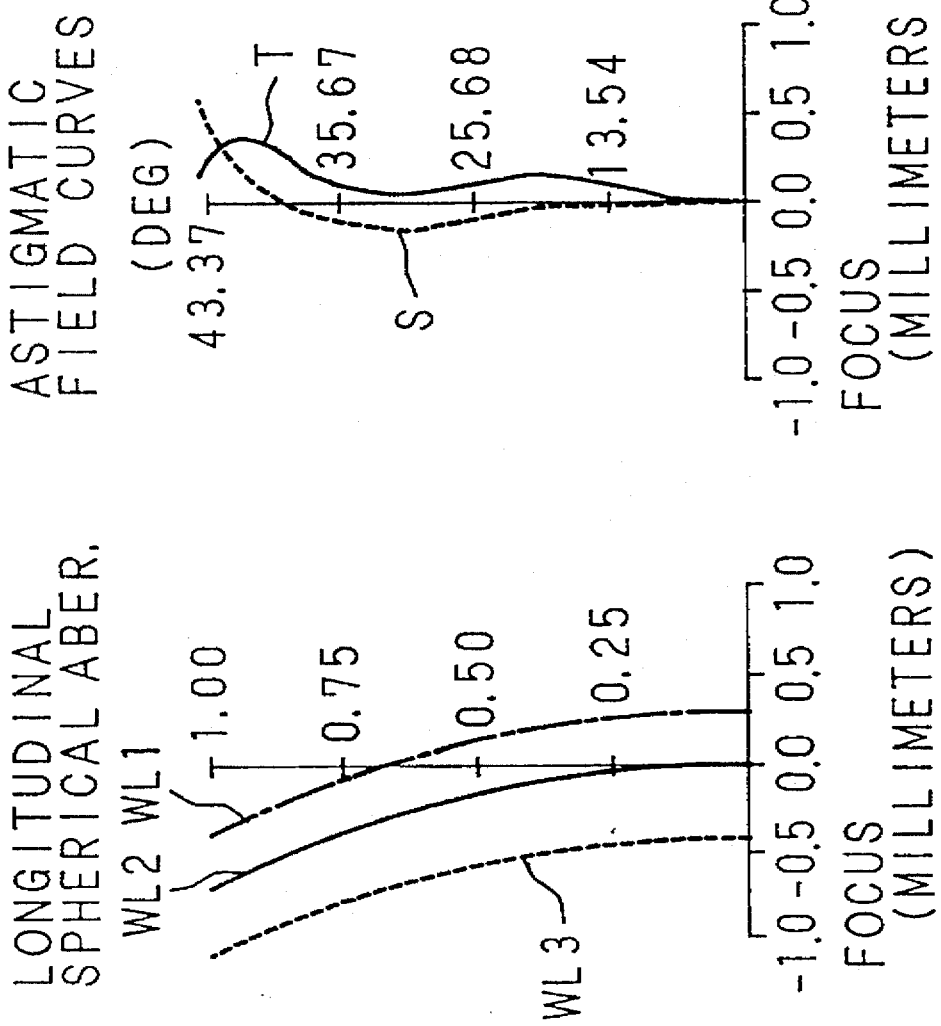
Fig. 48(a) LONGITUDINAL SPHERICAL ABER.
Fig. 48(b) ASTIGMATIC FIELD CURVES
Fig. 48(c) DISTORTION

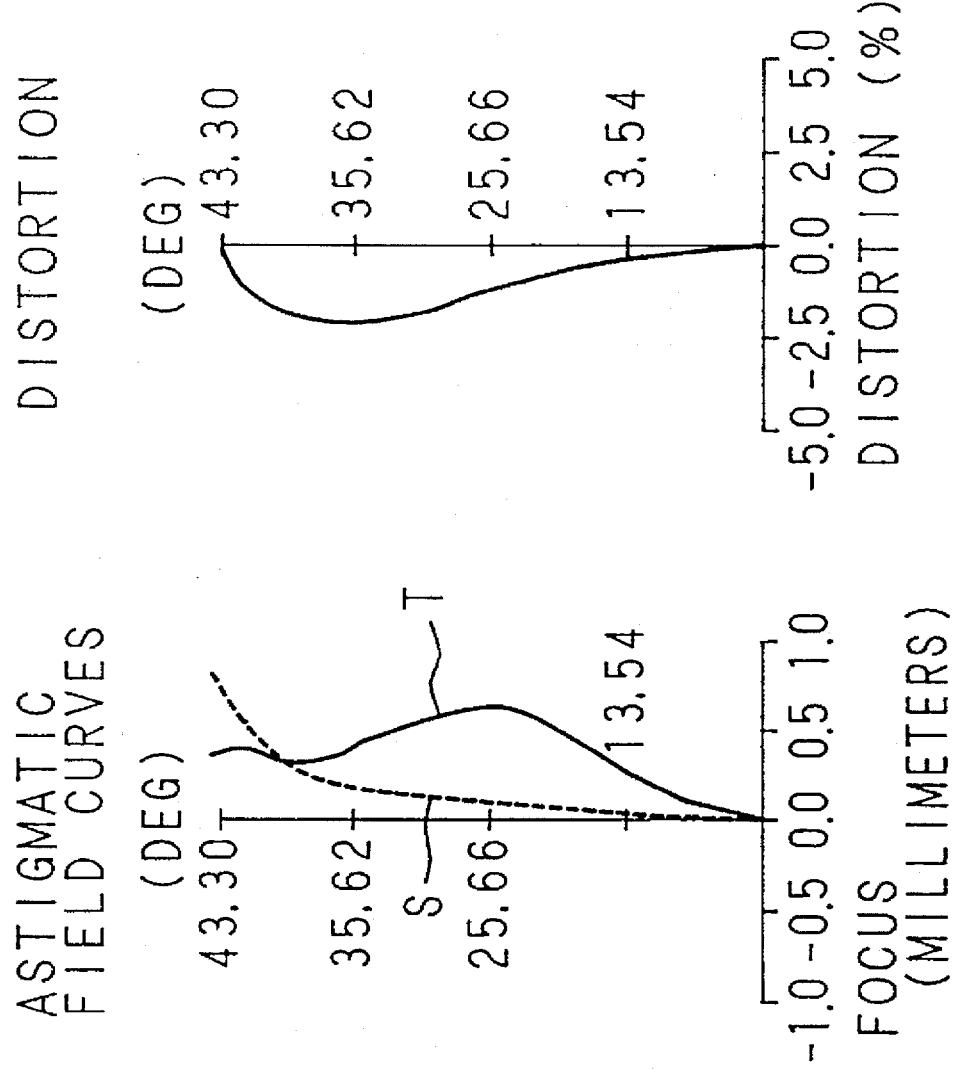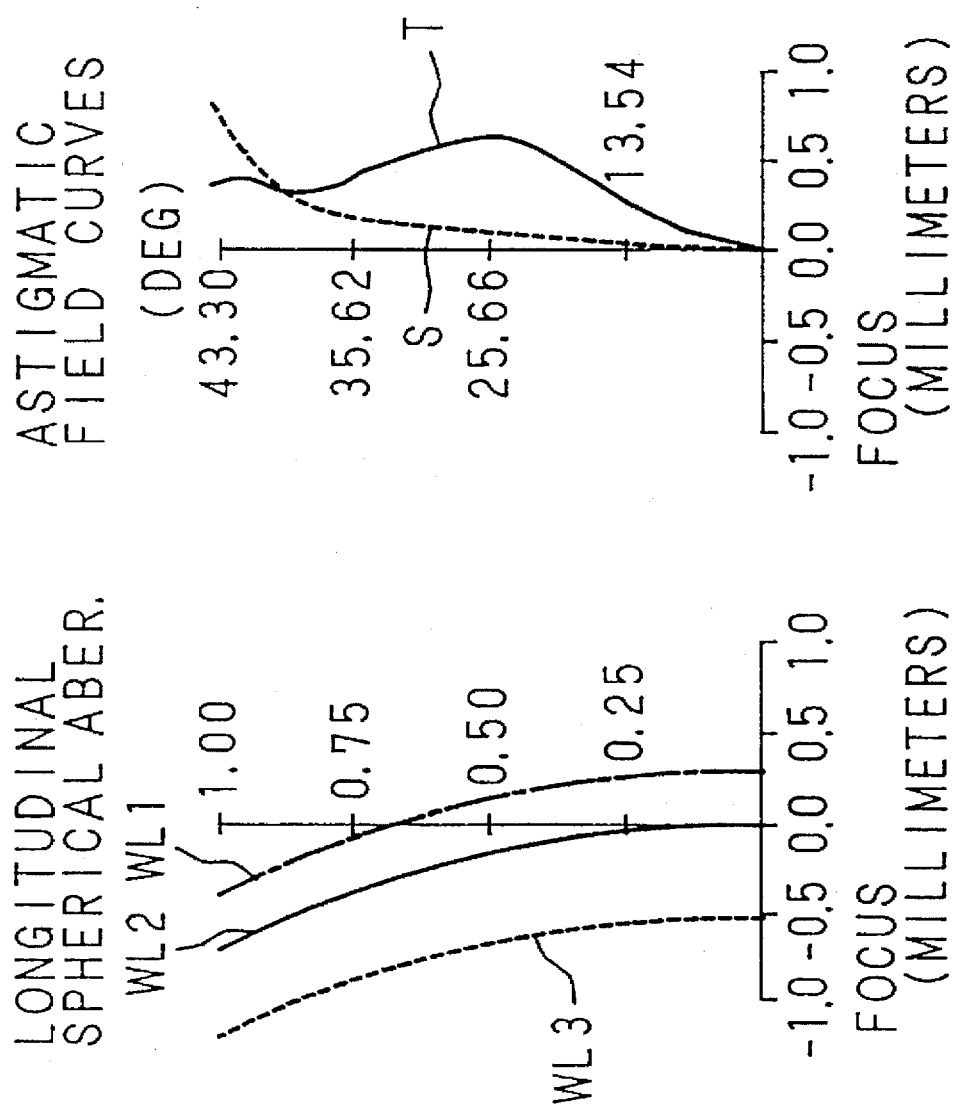

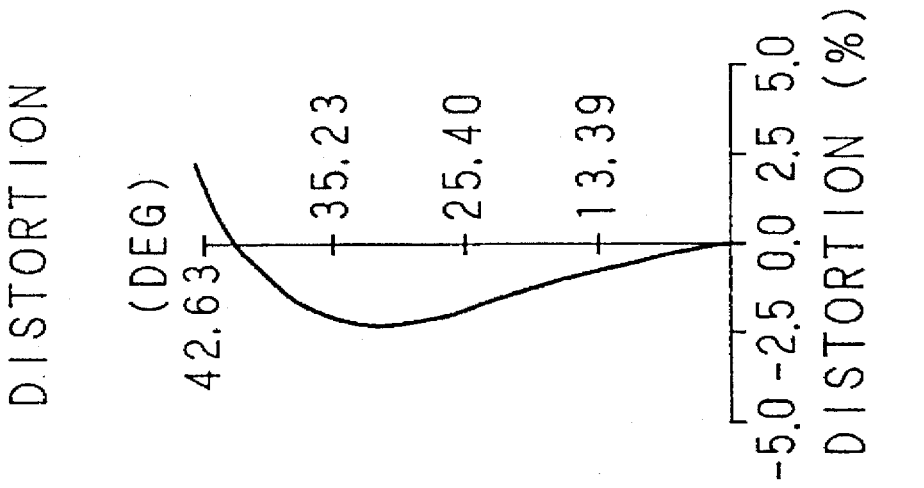
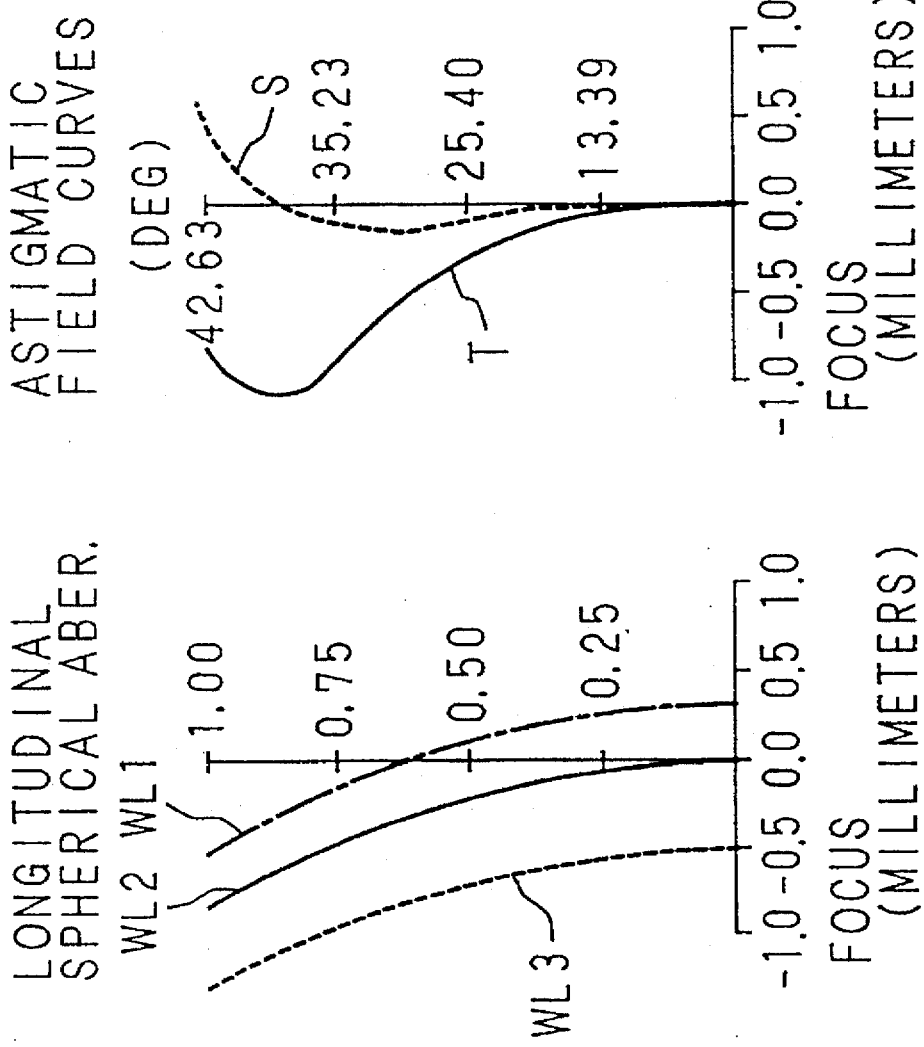

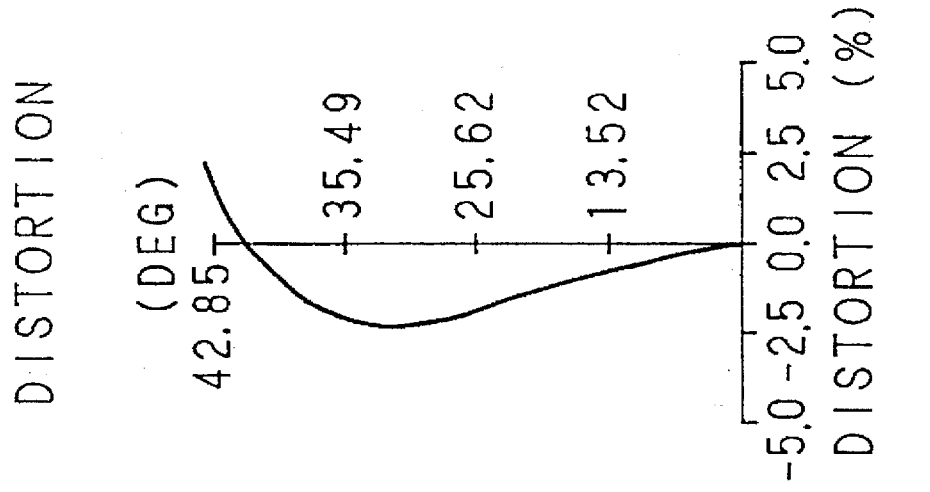
Fig. 5I(c) DISTORTION
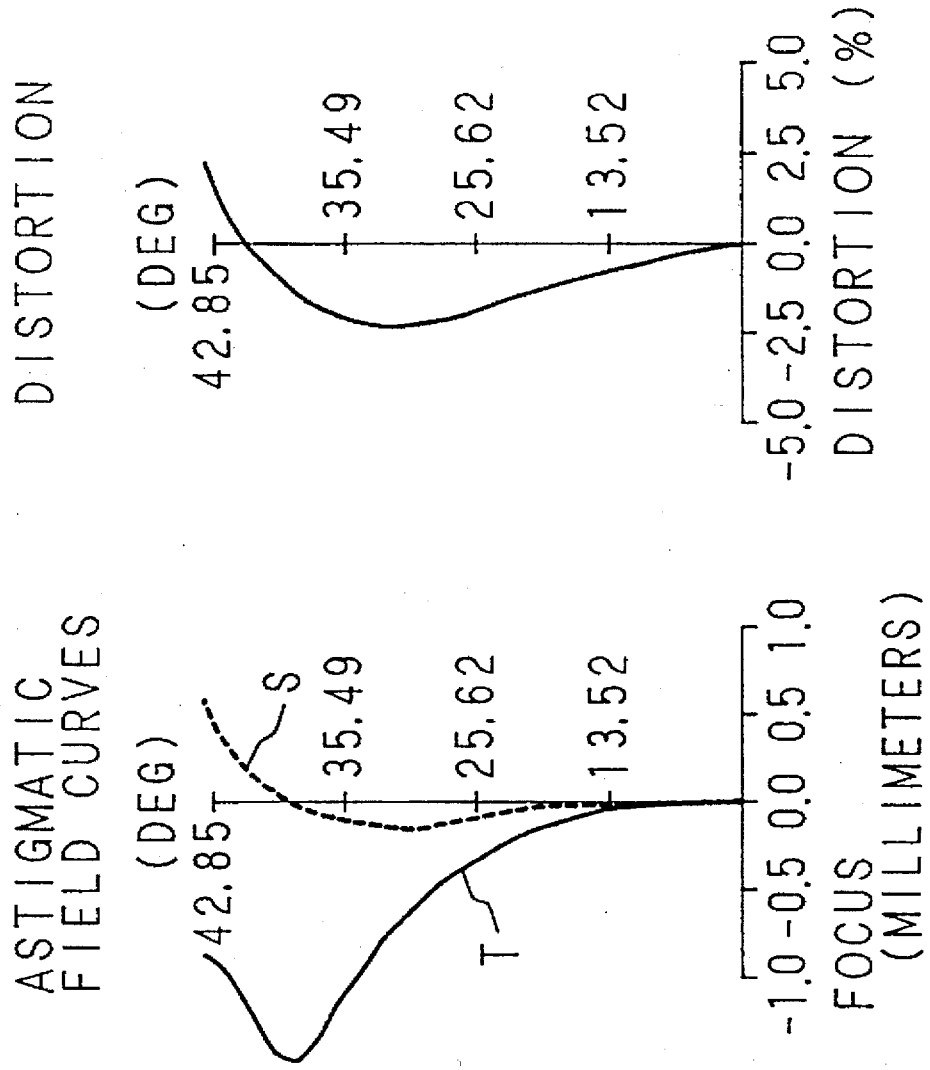
Fig. 5I(b) ASTIGMATIC FIELD CURVES
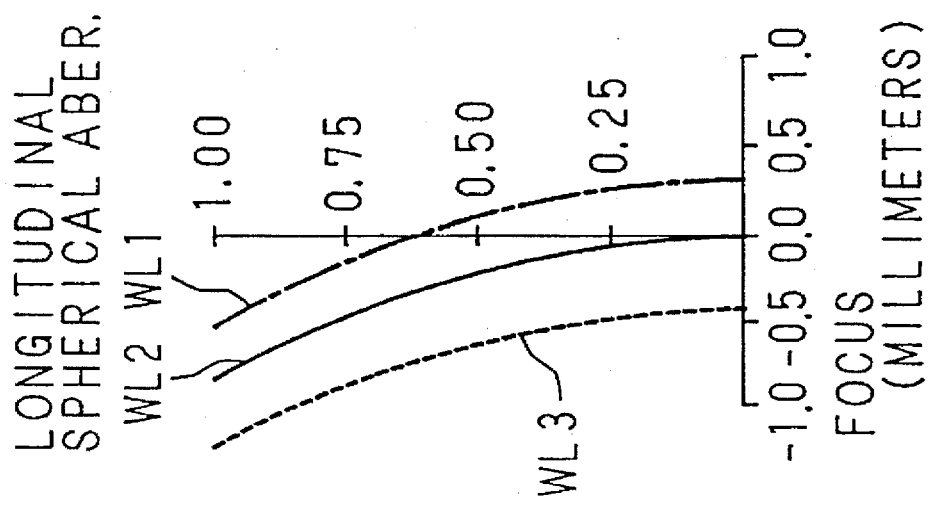
Fig. 5I(a) LONGITUDINAL SPHERICAL ABER.

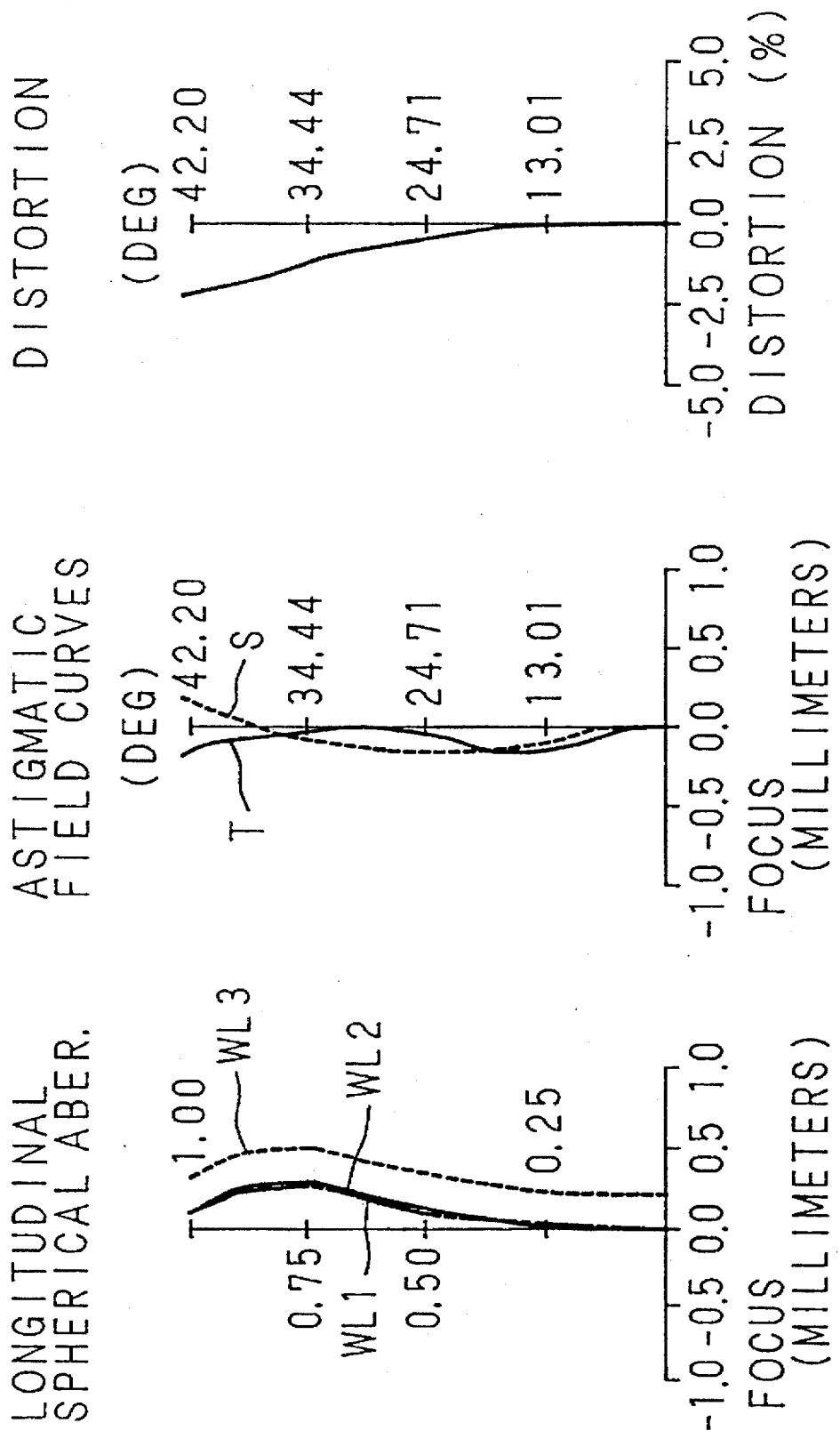

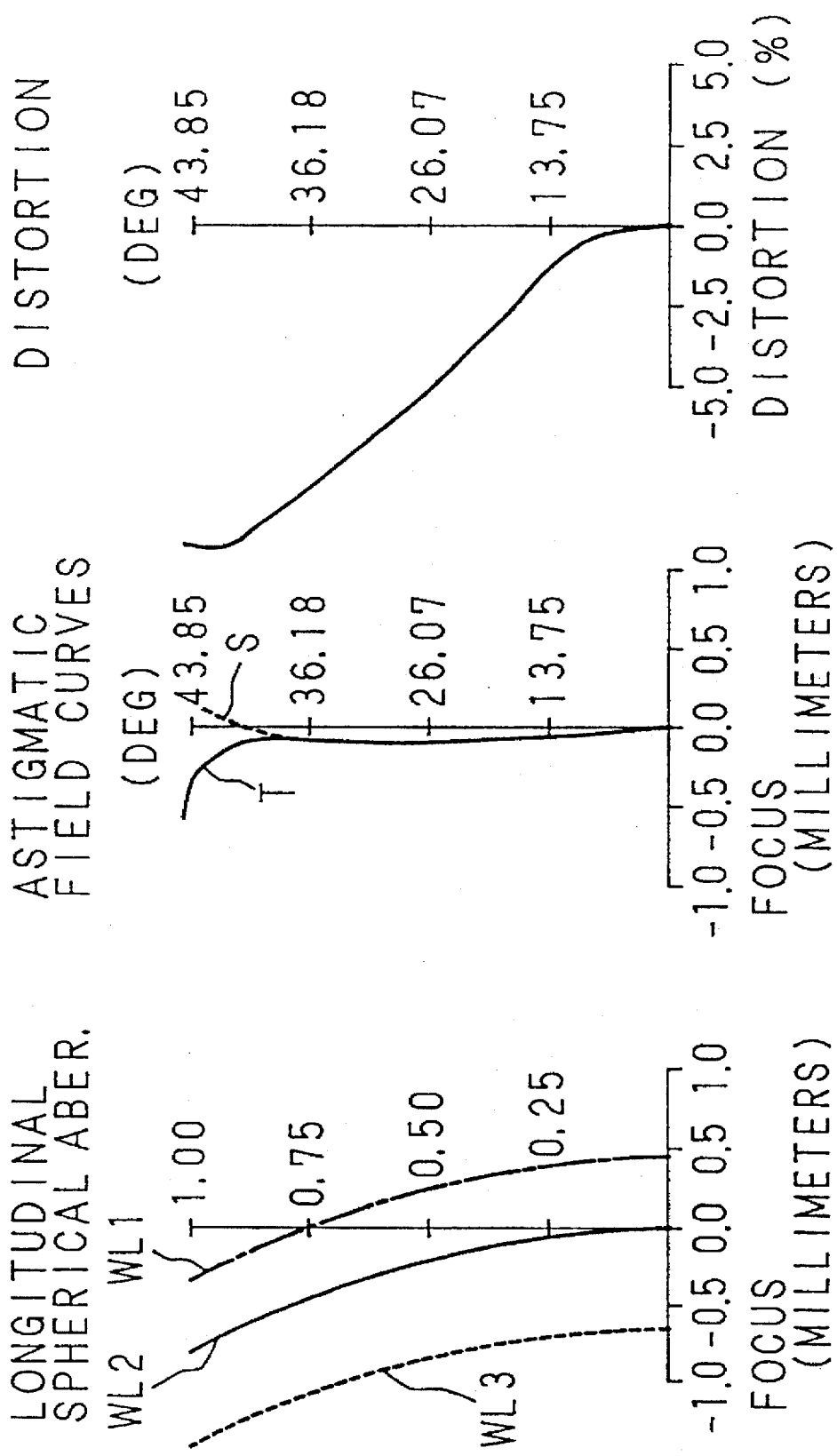

LONGITUDINAL SPHERICAL ABER.
WL2 WL1
1.00
0.75
0.50
0.25
-1.0 -0.5 0.0 0.5 1.0
FOCUS (MILLIMETERS)
WL3

Fig. 54(b)

ASTIGMATIC FIELD CURVES
(DEG)
44.95
S
37.18
26.94
14.28
T
-1.0 -0.5 0.0 0.5 1.0
FOCUS (MILLIMETERS)

Fig. 54(c)

DISTORTION
(DEG)
44.95
37.18
26.94
14.28
-5.0 -2.5 0.0 2.5 5.0
DISTORTION (%)

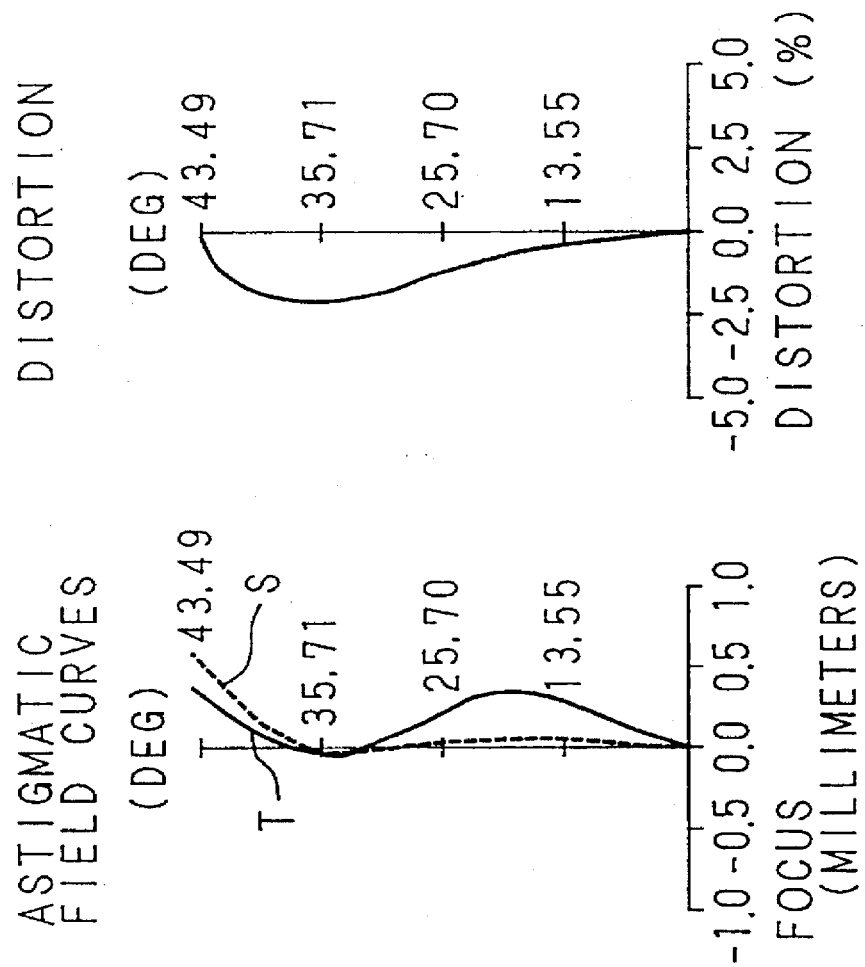

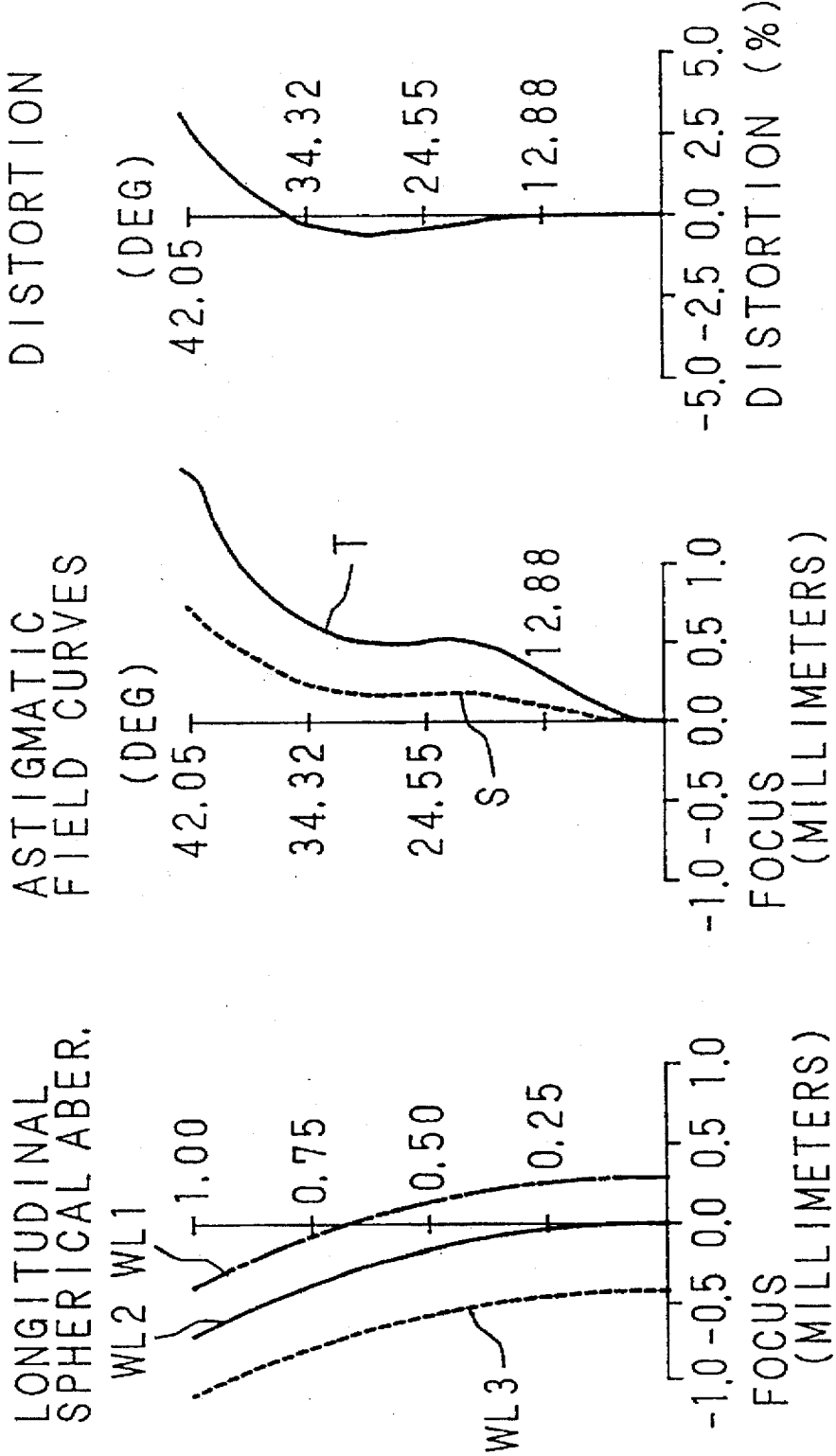

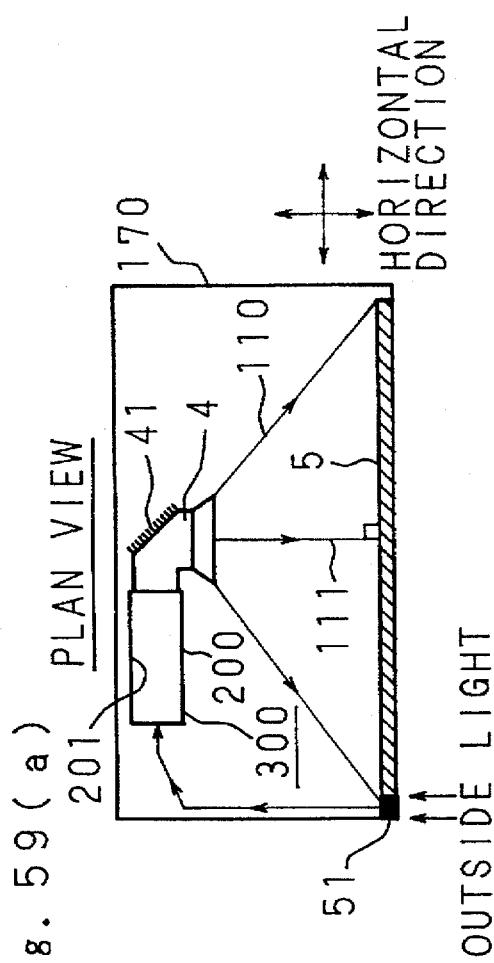
Fig.59(a) PLAN VIEW
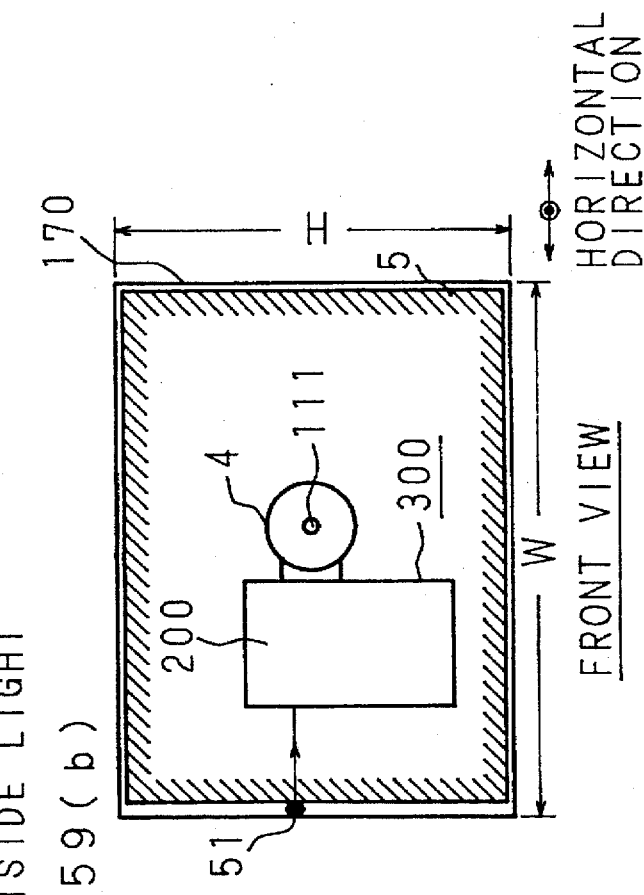
Fig.59(b) FRONT VIEW
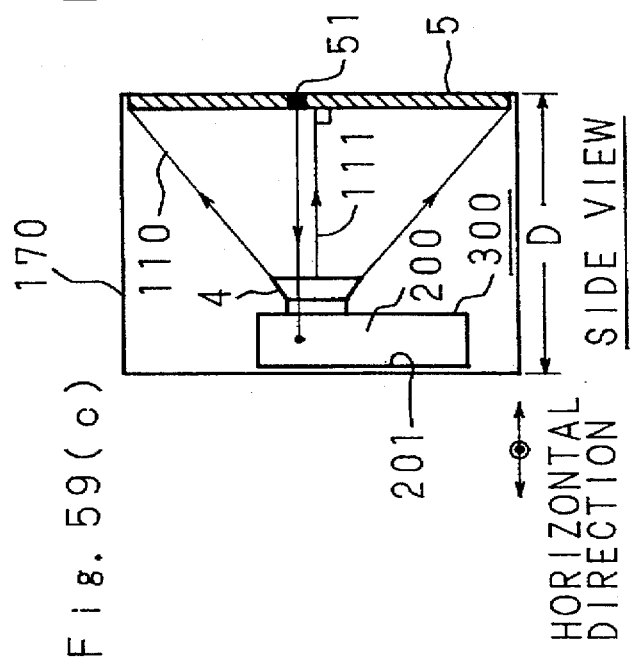
Fig.59(c) SIDE VIEW

PROJECTION-TYPE APPARATUS

This application is a divisional of application Ser. No. 07/998,948, filed on Dec. 30, 1992, and now U.S. Pat. No. 5,442,484, the entire contents of which are hereby incorporated by reference.

BACKGROUND OF THE INVENTION

1. Field of the Invention

This invention relates a projection lens which allows production of a small size projection-type display apparatus, a projection-type display apparatus using the projection lens, and a projection-type display apparatus capable of changing the contrast and the luminance.

2. Description of Related Art

FIG. 1 is a diagram showing an optical system of a conventional projection-type display apparatus using liquid crystal panels, which apparatus is disclosed, for example, in Japanese Patent Application Laid-Open No. 1-120192. In this figure, indicated at 1 is a light source including a lamp 120 and a reflecting mirror 130. The light source 1 emits an illumination beam 2. As a lamp 120 is used, for example, a white light source such as a metal halide lamp, a xenon lamp, and a halogen lamp. A reflecting surface of the reflecting mirror 130 is typically a paraboloid or spherical surface, and a luminescence center of the lamp 120 is positioned at a focus position of the paraboloid or a center of curvature of the spherical surface as well known. Along an emitting direction of the illumination beam 2 are arranged a dichroic mirror 14B which reflects a blue light while allowing green and red lights to transmit therethrough, a dichroic mirror 14G which reflects the green light while allowing the red light to transmit therethrough, and a mirror 11a for reflecting the light entirely. A mirror 11c for reflecting the light entirely is arranged in a reflecting direction of the dichroic mirror 14B, and a liquid crystal panel 3B is arranged in a reflecting direction of the mirror 11c. A liquid crystal panel 3G is arranged in a reflecting direction of the dichroic mirror 14G. A mirror 11b for reflecting the light entirely is arranged in a reflecting direction of the mirror 11a, and a liquid crystal panel 3R is arranged in a reflecting direction of the mirror 11b. A drive circuit for causing an image to be displayed on the liquid crystal panels 3R, 3G, 3B is unillustrated. A dichroic prism 15 which selectively reflects the red and blue lights and selectively allows the green light to transmit therethrough is arranged and surrounded by these liquid crystal panels 3R, 3G, 3B. A projection lens 4 is arranged in an emitting direction of the dichroic prism 15. The respective members constituting the optical system before the projection lens 4 are held in a casing 200, and the casing 200 and the projection lens 4 constitute a projector 300.

An operation of the projector 300 will be described next. The illumination beam 2 emitted from the light source 1 is separated into lights of three primary colors, namely red, green, and blue, by the dichroic mirrors 14B and 14G, and the respective color lights are reflected by the mirrors 11a, 11b, 11c and projected on the liquid crystal panels 3R, 3G, 3B for displaying monochromatic images corresponding to the respective primary colors. The lights modulated by the images formed on the liquid crystal panels 3R, 3G, 3B are combined into a single beam again by the dichroic prism 15. The combined single beam is converted into a projected light 110 by the projection lens 4 to be projected on a screen as described later. The projection lens 4 is required to correct various aberrations in order to obtain a satisfactory projected image, and includes a combination of a plurality of single lenses (not shown). The projected image on the screen is focused by driving a part of lens elements constituting the projection lens 4 or the entire projection lens 4 along an optical axis.

FIG. 2 is a diagram showing an optical system of another conventional projection-type display apparatus using the liquid crystal panels, which apparatus is disclosed, for example, in Japanese Patent Application Laid-Open No. 1-157688. In this figure, indicated at 131 is a condenser lens provided at the front portion of a light source 1. In this example, the light source 1 includes a lamp 120, a reflecting mirror 130, and the condenser lens 131. Other construction is same as the aforementioned prior art (see FIG. 1), and no description will be given thereon by giving like reference numerals to like parts. Further, since the operation of this display apparatus is similar to the one of the aforementioned prior art, description thereof is omitted.

As a projection-type display apparatus, there have been conventionally known a projection-type display apparatus of the front system by which the projected light emitted from the projection lens is formed as an image on a reflection type screen, and a projection-type display apparatus of the rear system in which a projector is accommodated in a cabinet and the projected light is formed as an image on a translucent screen. FIG. 3 shows a construction of a projection-type display apparatus of the rear system disclosed in Japanese Utility Model Application Laid-Open No. 1-115778. In this figure, indicated at 170 is a cabinet for accommodating a projector 300 including a casing 200 and a projection lens 4. The projector 300 has a configuration similar to that of the projector 300 in FIGS. 1 or 2. In the casing 200 are held an optical system (not shown) including from a light source 1 to a dichroic prism 15. On a side wall of the cabinet 170 is arranged a translucent screen 5. In the cabinet 170 are arranged bent mirrors 150 and 160 for introducing a projected light 110 emitted from the projection lens 4 to the screen 5.

An operation of the apparatus shown in FIG. 3 will be described next. The projected light 110 emitted from the projection lens 4 is formed as an enlarged image on the screen 5 after being reflected by the bent mirrors 150 and 160. The bent mirrors 150 and 160 are employed to bend an optical path extending from a leading end of the projection lens 4 to the screen 5 so as to accommodate the optical system in the cabinet 170 in a compact manner. A viewer 400 views the enlarged image from a direction opposite to the projector 300 relative to the screen 5.

In the projection-type display apparatus of the rear system, a portion 171 below the screen 5 is large in the cabinet 170 since the bent mirror, 150 and the projector 300 are accommodated below the screen 5 as shown in FIG. 3. In view of this, it has been difficult to reduce the height H of the optical projection set. Thus, there has been adopted a method of projecting the projected light 110 directly behind the screen by omitting the bent mirrors 150 and 160 from the optical system so as to set the height H substantially equal to the level of the screen 5. In this case, the problem is such that the depth D of the set is increased to thereby increase an installation area of the cabinet 170.

In addition to the above, it has been effective to shorten a projection distance (length of a central beam from an emitting end of the projection lens 4 to the screen 5) in order to make the set small size. Accordingly, there has been adopted a method of widening an angular field of the projection lens 4. However, if a divergent angle of the projected light 110 is widened by widening the angular field of the projection lens 4, the large size bent mirror 150 is inevitably required. Thus, there has been a limit in reducing the height H of the set.

Conventionally, there has been a demand to view an image of the increased luminance since the projected image becomes relatively dark and hard to see when the luminance on the screen surface is high due to the external light. Conversely, when the luminance of the external light is low, there has been a demand to view an image by improving the contrast (particularly lowering the luminance of a black level) while suppressing the luminance of the projected image. However, the conventional projection-type display apparatuses are not provided with a function of automatically adjusting the luminance and the contrast according to the illuminated state of the place where the apparatus is installed.

SUMMARY OF THE INVENTION

It is an object of the invention to provide a retro-focus type lens which can be applied to a small size projection-type display apparatus and in which a bent mirror can be built.

It is another object of the invention to provide a small size projection-type display apparatus having reduced depth and height.

It is still another object of the invention to provide a small size projection-type display apparatus which is substantially as large as a screen when viewed from the front and has a reduced depth.

It is further another object of the invention to provide a multi-vision projection-type display apparatus having a small depth in which a plurality of projectors for use in a small size projection-type display apparatus are arranged in rows and columns.

It is another object of the invention to provide a projection-type display apparatus capable of changing a contrast ratio and luminance of a projected image in the case where a device having a function of switching a state between a transparent state and a scattering state according to the brightness of the image is used as an image display device.

It is still another object of the invention to provide a projection-type display apparatus capable of automatically changing a contrast ratio and/or luminance of a projected image according to the brightness of an external light available where the apparatus is installed.

A retro-focus type lens according to the first invention comprises from a large conjugate side a first lens group having a negative refracting power, a second lens group having a positive refracting power which is spaced away from the first lens group at an air interval D1, and a third lens group having a positive refracting power, wherein the following conditions are satisfied when focal lengths of the first lens group, the second lens group, the third lens group, and a total lens system are assumed respectively as f1, f2, f3, and f:

$1.8 < D1/f < 3.0$ $1.1 < f2/f3 < 1.6$ $1.5 < |f1|/f < 2.3.$

In the first invention, mirror means for bending an optical path may be inserted between the first lens group and the second lens group. Also, in the first invention, diaphragm means may be arranged in the vicinity of the second lens group and a focal point of the third lens group on the large conjugate side. Further, in the first invention, diaphragm means may be arranged in the vicinity of the second lens group and a focal point of the third lens group on the large conjugate side, and an aperture diameter of the diaphragm means may be adjustable. Moreover, in the first invention, diaphragm means may be arranged in the vicinity of the second lens group and a focal point of the third lens group on the large conjugate side; and motor means may be provided to cause an aperture diameter of the diaphragm means to vary. Furthermore, in the first invention, a lens element on the small conjugate side may be an aspherical lens out of those constituting the third lens group. Also, in the first invention, a lens element on the small conjugate side may be an aspherical lens out of those constituting the third lens group, and the following condition may be satisfied when focal lengths of the aspherical lens and the total lens system are assumed respectively as f4 and f: $|f4|/f > 10$. Further, in the first invention, a lens element on the large conjugate side may be an aspherical lens out of those constituting the first lens group. Moreover, in the first invention, a lens element on the large conjugate side may be an aspherical lens out of those constituting the first lens group, and the following condition may be satisfied when focal lengths of the aspherical lens and the total lens system are assumed respectively as f5 and f: $|f5|/f > 100$. Furthermore, in the first invention, a lens element on the small conjugate side out of those constituting the first lens group and a lens element constituting the second lens group may be both aspherical lenses. Also, in the first invention, an aberration correction may be carried out in a state where a parallel plane plate formed of plastic material in not less than 90% of its thickness is inserted between the third lens group and an image surface on a small conjugate side. Further, in the first invention, diaphragm means may be arranged in the vicinity of the second lens group and a focal point of the third lens group on the large conjugate side, the second lens group may be moved along an optical axis to change the focal length of the total lens system, and the first lens group, the second lens group, and the third lens group may be integrally moved along the optical axis to change a projection magnification while compensating for a shift of the image surface. Moreover, in the first invention, diaphragm means may be arranged in the vicinity of the second lens group and a focal point of the third lens group on the large conjugate side, the second lens group may be moved along the optical axis to change the focal length of the total lens system, and the projection magnification is changed while compensating for the shift of the image surface by integral movement of the first lens group, the second lens group, and the third lens group along the optical axis in combination with movement of the first lens group along the optical axis.

With the retro-focus type lens of the first invention, there can be obtained a projection lens having the following performances required for a liquid crystal projection-type display apparatus:

(A) A sufficient interval required to insert the mirror can be attained between the first lens group and the second lens group;

(B) A relatively long back focal length can be attained because of a retro-focus type construction;

(C) Since a satisfactory telecentric characteristic can be obtained despite a wide-angle lens, an off-axis beam becomes substantially parallel with the optical axis on the liquid crystal panel side, thereby eliminating an influence of incidence-angle dependency of a color-composition system; and (D) A satisfactory peripheral illuminance ratio can be obtained despite the wide-angle lens.

Further, in the first invention, an angle of view is widened by introducing aspherical lenses as the lens element of the first lens group on the screen side or the lens element of the third lens group on the image surface side, thereby correcting the off-axis aberration, particularly the distortion and the astigmatism, satisfactorily. Also, by introducing aspherical lenses as the lens element of the first lens group on the image surface side and the lens element of the second lens group, the on-axis aberration and the off-axis aberration can be corrected in highly well-balanced manner. In addition, since an effective diameter of the lens is relatively small, the aspherical surfaces can be formed easily. If the parallel plane plate formed of plastic material in most of its thickness is inserted between the third lens group and the image surface so as to correct the aberration supposing that the dichroic prism for color composition is formed of plastic material such as PMMA, the projection-type display apparatus using this retro-focus type lens can be produced light weighted and inexpensively. Moreover, the focal length of the total lens system is changed by making the second lens group movable along the optical axis. The shift of the image surface resulting from the varied focal length is compensated for by the integral movement of the first, second, and third lens groups along the optical axis, and thereby the projection lens serves as a zoom lens and is capable of adjusting the size of the projected image finely.

In a projection-type display apparatus according to the second invention, a first mirror is built in a projection lens, a portion of the projection means before the first mirror is mounted at a left side or a right side from a center of the screen when viewed from the front of the apparatus, and the projected light from the projection lens is reflected in a substantially vertical direction by the first mirror and then bent in a substantially horizontal direction by a second mirror so as to be incident upon a screen. Also, in the second invention, when the optical path is bent in the vertical direction by the first mirror, a direction of the image display device corresponding to the horizontal direction of the screen may be caused to coincide with a direction of a center ray of an exiting light from the projection lens according to rotation of a display direction of the image display device to be displayed as the horizontal direction on the screen.

According to the second invention, unlike the conventional apparatuses, since most of the projection means is accommodated at the right side or left side when viewed from the front center of the screen, and the optical path is bent on the plane when viewed from the front of the apparatus and on the plane when viewed from a lateral direction of the apparatus, the height and the depth of the apparatus can be reduced at the same time. In addition, since the first mirror is built in the projection lens, the first mirror is not to become large in size even if a wide-angle projection lens is used.

A projection-type display apparatus according to the third invention comprises first and second mirrors similar to those of the second invention. A casing for accommodating an optical system of projection means before a projection lens is arranged on a left side or right side from the center of a screen when viewed from the front of the apparatus. An optical system of the projection means before the first mirror is arranged on a plane perpendicular to a center ray of an exiting light from the projection lens, and an angle defined between a bottom portion of the casing provided substantially in parallel with the plane where the optical system is arranged and a bottom portion of a cabinet for accommodating the casing is set within a specified angle range. In the third invention, the angle defined by these bottom portions is set 20° or smaller.

According to the third invention, the casing for holding an optical system of the projection means before the projection lens is accommodated at the right side or left side from the front center of the screen when viewed from the front center, the optical system is held on the plane parallel with the bottom surface of the projection means in the casing, and the bottom surface of the casing can be arranged in suitable angular relation with the bottom surface of the cabinet for holding the entire apparatus. Accordingly, the height and the depth of the apparatus can be reduced at the same time. In addition, since the first mirror is built in the projection lens, the first mirror is not to become large in size even if a wide-angle projection A projection-type display apparatus according to the fourth invention comprises a mirror provided in a projection lens of projection means, the mirror being adapted to bend an optical path. A center ray of a projected light exiting from the projection lens is bent in a substantially vertical direction by the mirror so as to be incident upon a translucent screen. An optical system of the projection means before the mirror is arranged on a plane substantially perpendicular to the center ray of an exiting light from the projection lens. A bottom portion of the casing for holding the optical system, provided substantially in parallel with the plane where the optical system is arranged, is substantially parallel with the screen. In the fourth invention, it may be appropriate to array a plurality of projection means in rows and columns and to form a unit image by a projected light of each projection means, so that adjoining unit images are arrayed close to one another.

According to the fourth invention, the projected light to be incident upon the screen is bent in the horizontal direction by the mirror built in the projection lens, and the optical system before the projection lens is arranged on the plane substantially parallel with the screen. Accordingly, the depth of the apparatus can be reduced while making the front dimensions of the apparatus substantially equal to the dimensions of the screen. In addition, since the mirror is built in the projection lens, the mirror is not to become large in size even if a wide-angle projection lens is used unlike a case where the mirror is arranged after the lens. Further according to the fourth invention, since the front dimensions of the apparatus can be made substantially equal to the dimensions of the screen as described above, there can be realized a multi-vision projection-type display apparatus having a small depth and small joining lines between adjoining unit images by arranging a plurality of projection means in rows and columns and arraying the unit images formed by the projected lights from the respective projection means closely in rows and columns.

In the second, third, or fourth invention, a dichroic prism formed of plastic material for combining lights of three primary colors may be arranged before the projection lens.

If the dichroic prism for color composition is formed of plastic material such as PMMA, the apparatus can be produced light weighted and inexpensively compared to the one including the conventional dichroic prism formed of known glass material.

Further, in the second, third, or fourth invention, a zoom lens capable of adjusting the projection magnification may be used as the projection lens.

By using the zoom lens capable of finely adjusting the projection magnification, the dimensional ratio of a periodic structure of the screen to that of the projected image on the liquid crystal panel is made variable. Accordingly, the moire superimposed on the projected image can be adjusted to a low level of visibility where the moire practically causes no problem. Further, by using the zoom lens as the projection lens of each projection means constituting the multi-vision projection-type display apparatus, the projection magnification of the respective projection means can be adjusted at the same value even if there is some difference in the projection magnification between unit images due to a manufacturing error of lenses and an arrangement error of optical parts.

A projection-type display apparatus according to the fifth invention includes an image display device provided with such a function that a state thereof is switched between a scattering state and a transparent state according to the brightness of a displayed image, and diaphragm means for restricting a recipient angle of a beam exiting from the image display device, an aperture diameter thereof being controllable.

According to the fifth invention, since the diaphragm means whose aperture diameter is changeable is provided within the projection lens and the recipient angle of the exiting light from the image display device in which the scattering/transparent states are switched is changeable, the contrast ratio and the luminance of the projected image can be adjusted in accordance with the desire of viewers, and new functions which cannot be found in the conventional projection-type display apparatuses can be added.

A projection-type display apparatus according to the sixth invention detects an illuminated state of a place where the apparatus is installed, and changes an aperture diameter of the diaphragm means for restricting a recipient angle of a beam exiting from an image display device and/or a drive power of a lamp for illuminating the image display device according to the detected illuminated state. In the sixth invention, the image display device may be provided with such a function that a state thereof is switched between a scattering state and a transparent state according to the brightness of a displayed image.

According to the sixth invention, since the aperture diameter of the diaphragm means within the projection lens is controlled according to the brightness of the external light, the recipient angle of the beam exiting from the image display device having the states switchable between the scattering state and the transparent state is made variable. Thus, the contrast ratio and the luminance of the projected image can be automatically adjusted to satisfactory levels when the external light changes. Further, since the drive power of the lamp for illuminating the image display device is variable according to the brightness of the external light, the luminance and the contrast ratio of the projected image can be adjusted automatically independently when the external light changes. Thus, new functions which cannot be found in the conventional projection-type display apparatuses can be added to the display apparatus according to the invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

The present invention will become more fully understood from the detailed description given hereinbelow and the accompanying drawings which are given by way of illustration only, and thus are not limitative of the present invention, and wherein:

BRIEF DESCRIPTION OF THE DRAWINGS

FIG. 28 is a sectional view showing a retro-focus type lens according to the first invention (embodiment 25);

FIGS. 31(a)–(c), hereinafter collectively referred to as FIG. 31, are diagrams showing various aberrations of the retro-focus type lens according to the first invention (embodiment 2);

FIGS. 32(a)–(c), hereinafter collectively referred to as FIG. 32, are diagrams showing various aberrations of the retro-focus type lens according to the first invention (embodiment 3);

FIGS. 33(a)–(c), hereinafter collectively referred to as FIG. 33, are diagrams showing various aberrations of the retro-focus type lens according to the first invention (embodiment 4);

FIGS. 34(a)–(c), hereinafter collectively referred to as FIG. 34, are diagrams showing various aberrations of the retro-focus type lens according to the first invention (embodiment 5);

FIGS. 36(a)–(c), hereinafter collectively referred to as FIG. 36, are diagrams showing various aberrations of the retro-focus type lens according to the first invention (embodiment 7);

FIGS. 37(a)–(c), hereinafter collectively referred to as FIG. 37, are diagrams showing various aberrations of the retro-focus type lens according to the first invention (embodiment 8);

FIGS. 38(a)–(c), hereinafter collectively referred to as FIG. 38, are diagrams showing various aberrations of the retro-focus type lens according to the first invention (embodiment 9);

FIGS. 39(a)–(c), hereinafter collectively referred to as FIG. 38, are diagrams showing various aberrations of the retro-focus type lens according to the first invention (embodiment 10);

FIGS. 40(a)–(c), hereinafter collectively referred to as FIG. 40, are diagrams showing various aberrations of the retro-focus type lens according to the first invention (embodiment 11);

FIGS. 41(a)–(c), hereinafter collectively referred to as FIG. 41, are diagrams showing various aberrations of the retro-focus type lens according to the first invention (embodiment 12);

FIGS. 42(a)–(c), hereinafter collectively referred to as FIG. 42, are diagrams showing various aberrations of the retro-focus type lens according to the first invention (embodiment 13);

FIGS. 44(a)–(c), hereinafter collectively referred to as FIG. 44, are diagrams showing various aberrations of the retro-focus type lens according to the first invention (embodiment 15);

FIGS. 45(a)–(c), hereinafter collectively referred to as FIG. 45, are diagrams showing various aberrations of the retro-focus type lens according to the first invention (embodiment 16);

FIGS. 47(a)–(c), hereinafter collectively referred to as FIG. 47, are diagrams showing various aberrations of the retro-focus type lens according to the first invention (embodiment 18);

FIGS. 48(a)–(c), hereinafter collectively referred to as FIG. 48, are diagrams showing various aberrations of the retro-focus type lens according to the first invention (embodiment 19);

FIGS. 49(a)–(c), hereinafter collectively referred to as FIG. 49, are diagrams showing various aberrations of the retro-focus type lens according to the first invention (embodiment 20);

FIGS. 50(a)–(c), hereinafter collectively referred to as FIG. 50, are diagrams showing various aberrations of the retro-focus type lens according to the first invention (embodiment 21);

FIGS. 51(a)–(c), hereinafter collectively referred to as FIG. 51, are diagrams showing various aberrations of the retro-focus type lens according to the first invention (embodiment 22);

FIGS. 52(a)–(c), hereinafter collectively referred to as FIG. 52, are diagrams showing various aberrations of the retro-focus type lens according to the first invention (embodiment 23);

FIGS. 53(a)–(c), hereinafter collectively referred to as FIG. 53, are diagrams showing various aberrations of the retro-focus type lens according to the first invention (embodiment 24);

FIGS. 54(a)–(c), hereinafter collectively referred to as FIG. 54, are diagrams showing various aberrations of the retro-focus type lens according to the first invention (embodiment 25);

FIGS. 55(a)–(c), hereinafter collectively referred to as FIG. 55, are diagrams showing various aberrations of the retro-focus type lens according to the first invention (embodiment 25);

FIGS. 56(a)–(c), hereinafter collectively referred to as FIG. 56, are diagrams showing various aberrations of the retro-focus type lens according to the first invention (embodiment 25);

FIGS. 59(a), 59(b) and 59(c) are overall construction diagrams of a projection-type display apparatus according to the fourth invention and the sixth invention;

DESCRIPTION OF THE PREFERRED EMBODIMENTS

Hereafter, the invention will be described in detail with reference to the drawings illustrating embodiments thereof.

<First Invention>

A wide-angle projection lens is necessary in order to realize a small size liquid crystal projection-type display apparatus of the rear system. A wide-angle lens for use in a single lens reflex camera has been conventionally known as a lens to obtain a wide-angle image. However, as a projection lens for use in the liquid crystal projection-type display apparatus according to the invention, the following specifications are additionally considered for the wide-angle lens for use in the single lens reflex camera.

(A) The wide-angle lens is so constructed as to attain a sufficient air interval in a lens system to insert a mirror therein.

(B) A wide-angle lens is capable of attaining a long back focal length in order to insert a dichroic prism for color composition.

(C) A color shade is generated when a chief ray of an off-axis beam is inclined relative to the dichroic prism. In the case where an illumination beam is a parallel beam (telecentric illumination), an off-axis F-number is increased and a peripheral light amount is reduced equivalently when the chief ray of the off-axis beam on the liquid crystal panel side is inclined. Thus, as the projection lens, the chief ray of the off-axis beam on the liquid crystal panel side is parallel with an optical axis of the lens (telecentric characteristic).

(D) Despite the wide-angle lens, a sufficient peripheral illuminance ratio can be attained.

The projection lens according to the invention satisfies the above requirements and provides a lens construction having a sufficient resolving power, and further provides a zoom lens construction capable of reducing the moire of a projected image and finely adjusting an image size by minutely changing a projection magnification.

Figure 1:
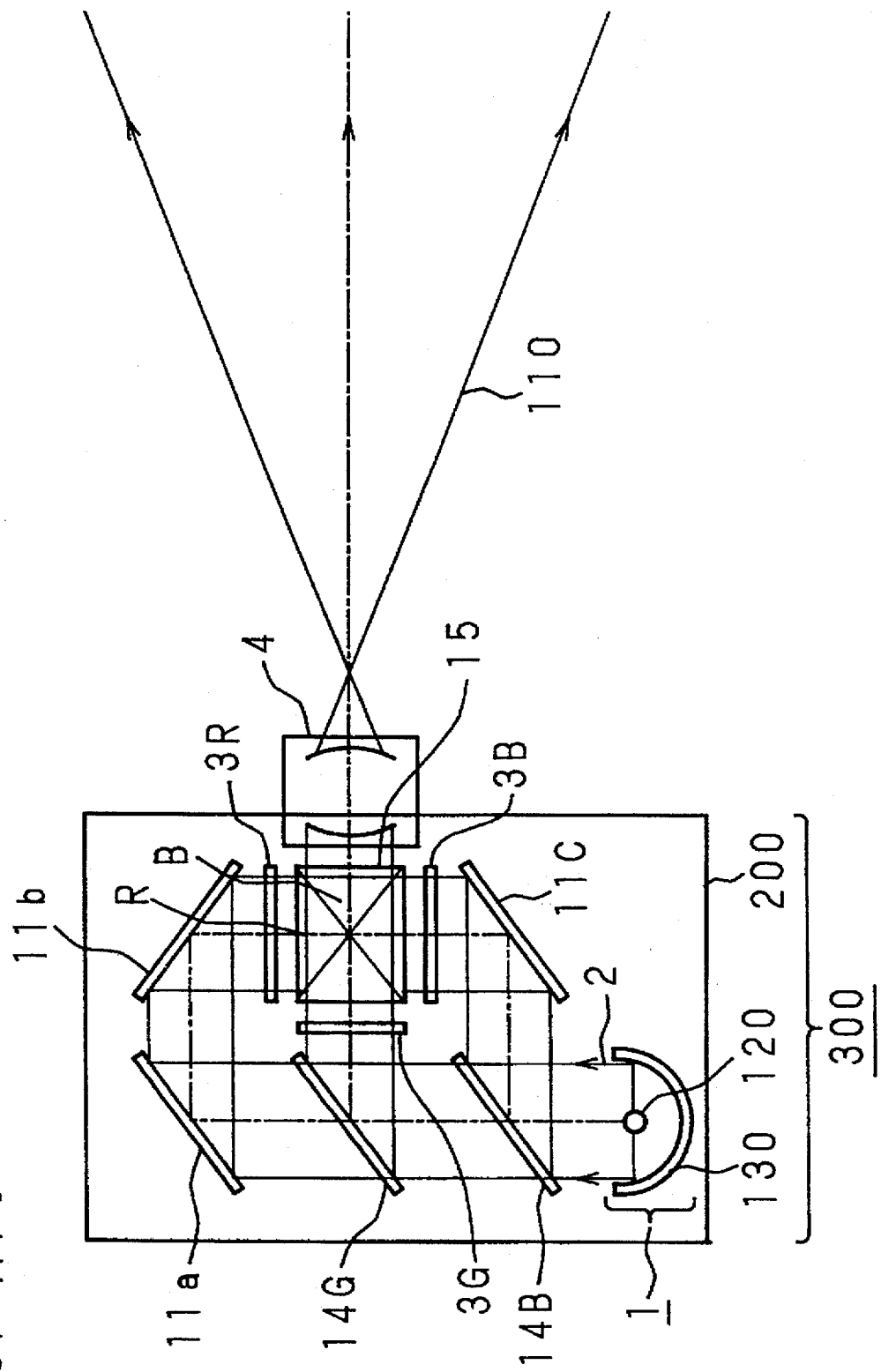
FIG. 1 is a construction diagram of a projector for use in a liquid crystal projection-type display apparatus of the prior art.
Figure 2:
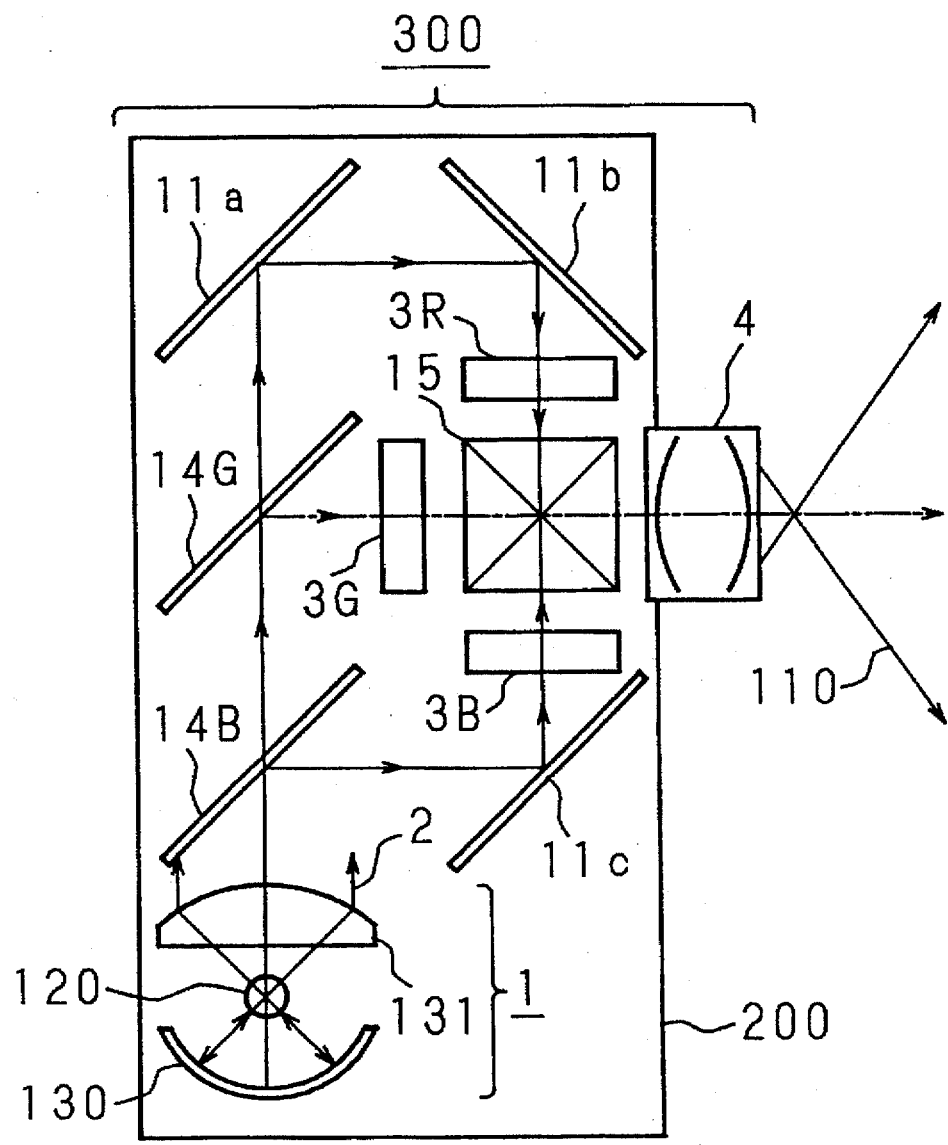
FIG. 2 is a construction diagram of a projector for use in a liquid crystal projection-type display apparatus of the prior art.
Figure 3:
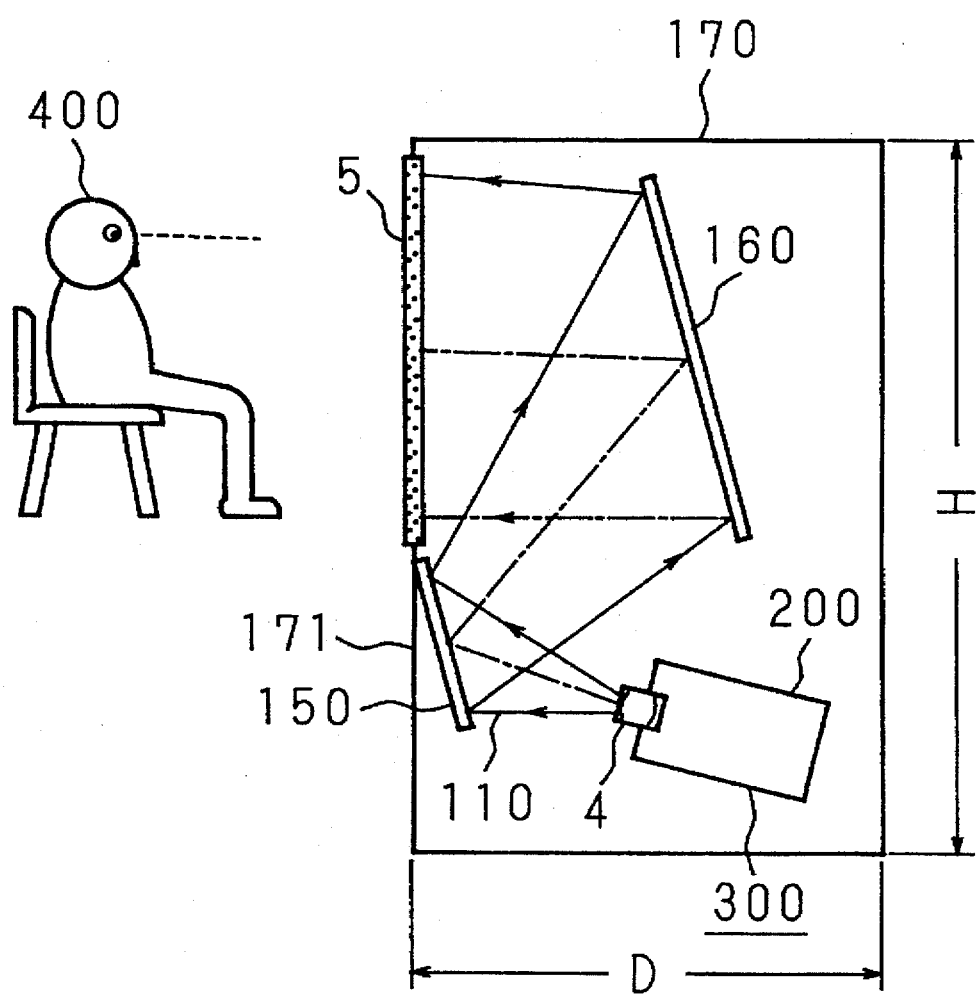
FIG. 3 is a construction diagram of a liquid crystal projection-type display apparatus of the prior art.

Hereafter, the projection lens according to the invention will be described with reference to the drawings. FIGS. 4 to 29(a)–(c) are sectional views of lenses corresponding to representative constructions out of numerical embodiments of the invention to be described later. Though unillustrated, it is assumed that a screen is provided at the left side of FIGS. 4, 6, 7, 9, 11, 13, 15, 17, 19, 21, 22, 23, 24, 26, 27, and 28 and at an upper side of FIGS. 5, 8, 10, 12, 14, 16, 18, 20, 25, and 29(a)–(c). Indicated at G1 is a first lens group located on the screen side (large conjugate side) and having a negative refracting power, at G2 a second lens group having a positive refracting power, at G3 a third lens group located at the side of the liquid crystal panel 3 (small conjugate side) and having the positive refracting power. The second lens group G2 has a diaphragm AST in the vicinity of the side of the liquid crystal panel 3 and a focal point of the third lens group G3 on the screen side. Further, between the third lens group G3 and the liquid crystal panel 3 is provided a parallel plane plate L9 (L9 and L10 in FIG. 21) having an optical width of the width of the dichroic prism 15 plus the width of a cover glass (not shown) of the liquid crystal panel 3 in FIGS. 1 or 2 showing the prior art.

Figure 4:
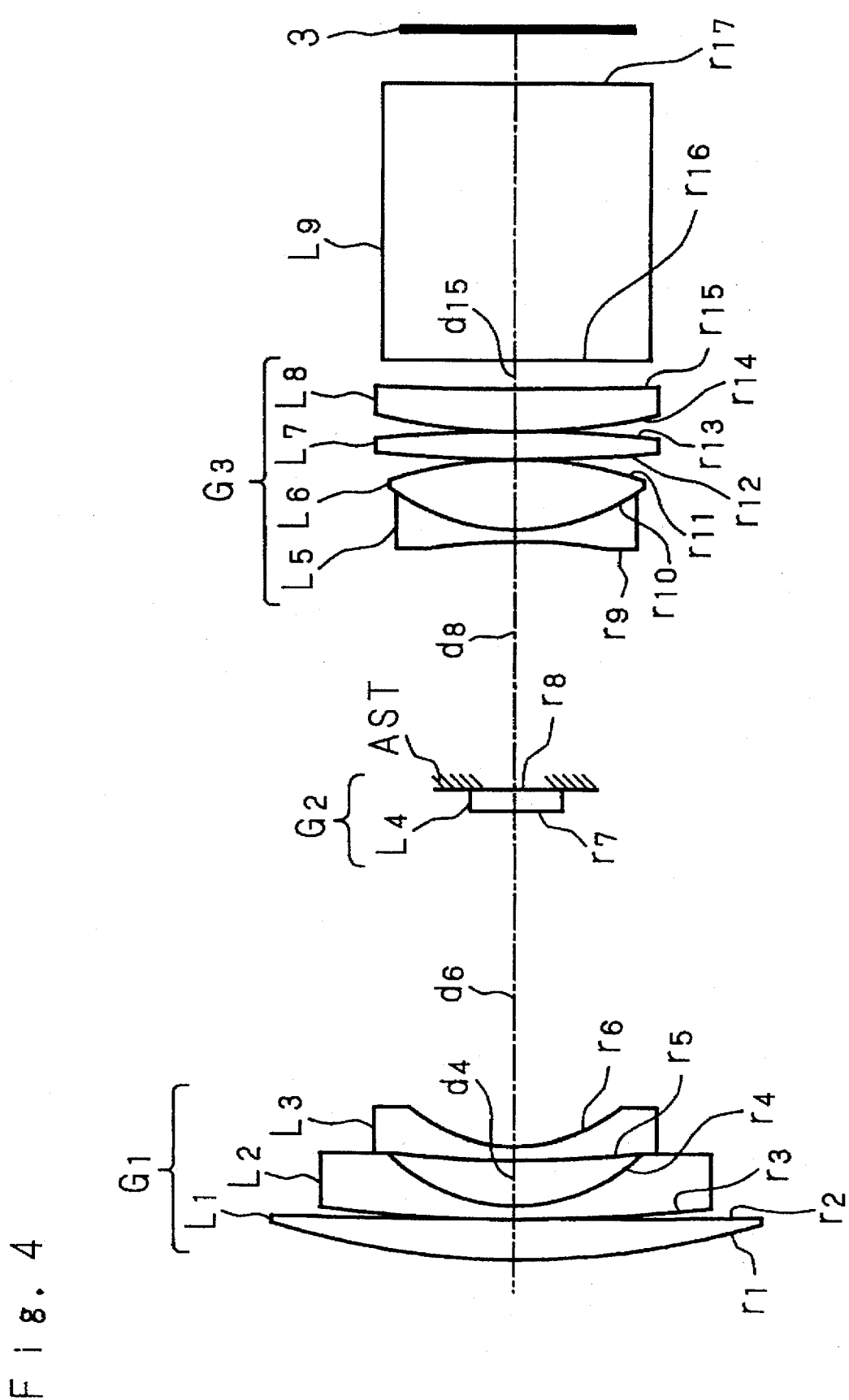
FIG. 4 is a sectional view showing a retro-focus type lens according to the first invention (embodiment 1)
Figure 5:
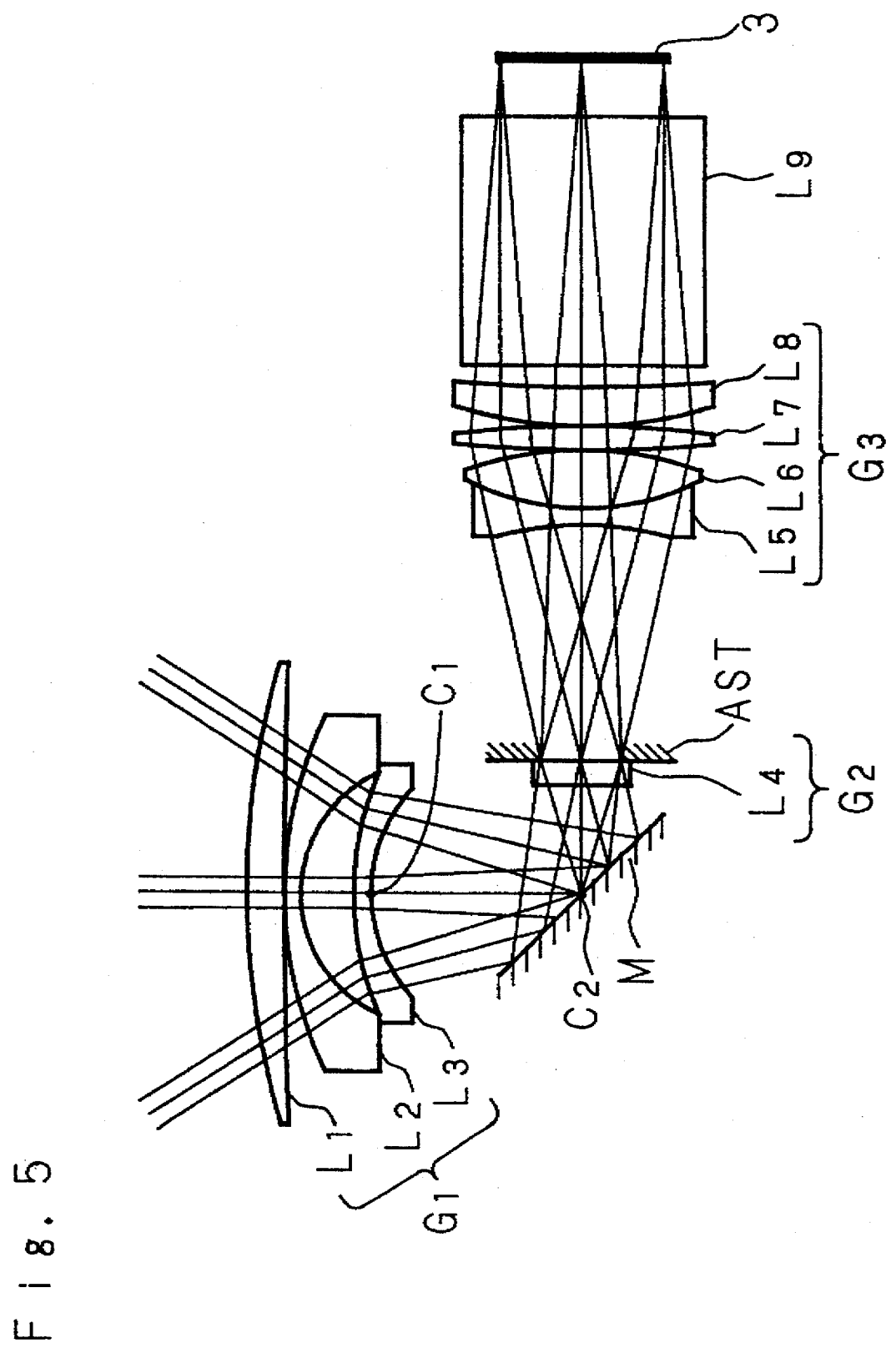
FIG. 5 is a sectional view showing a retro-focus type lens according to the first invention (embodiment 1)
Figure 6:
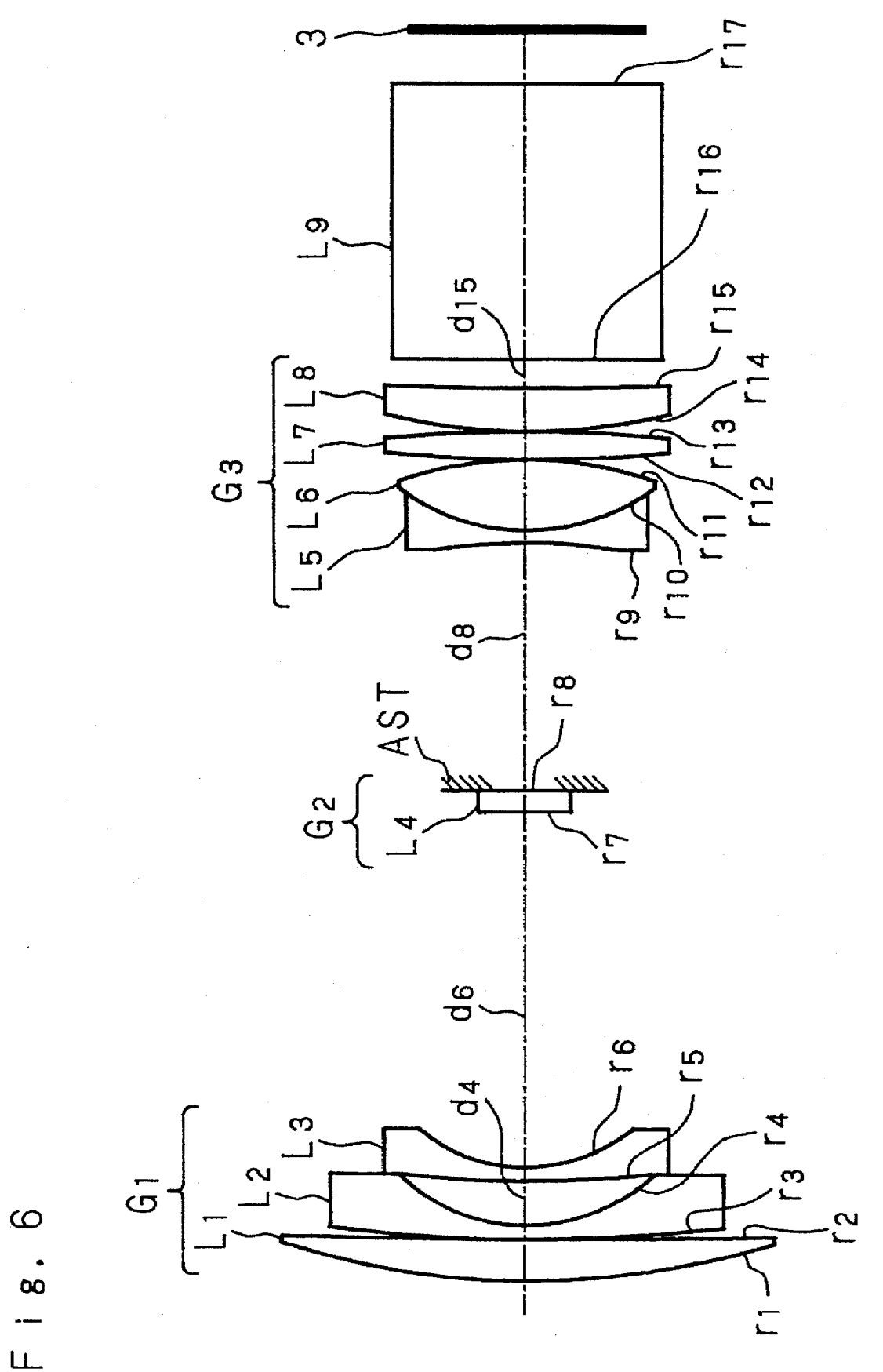
FIG. 6 is a sectional view showing a retro-focus type lens according to the first invention (embodiment 2)
Figure 7:
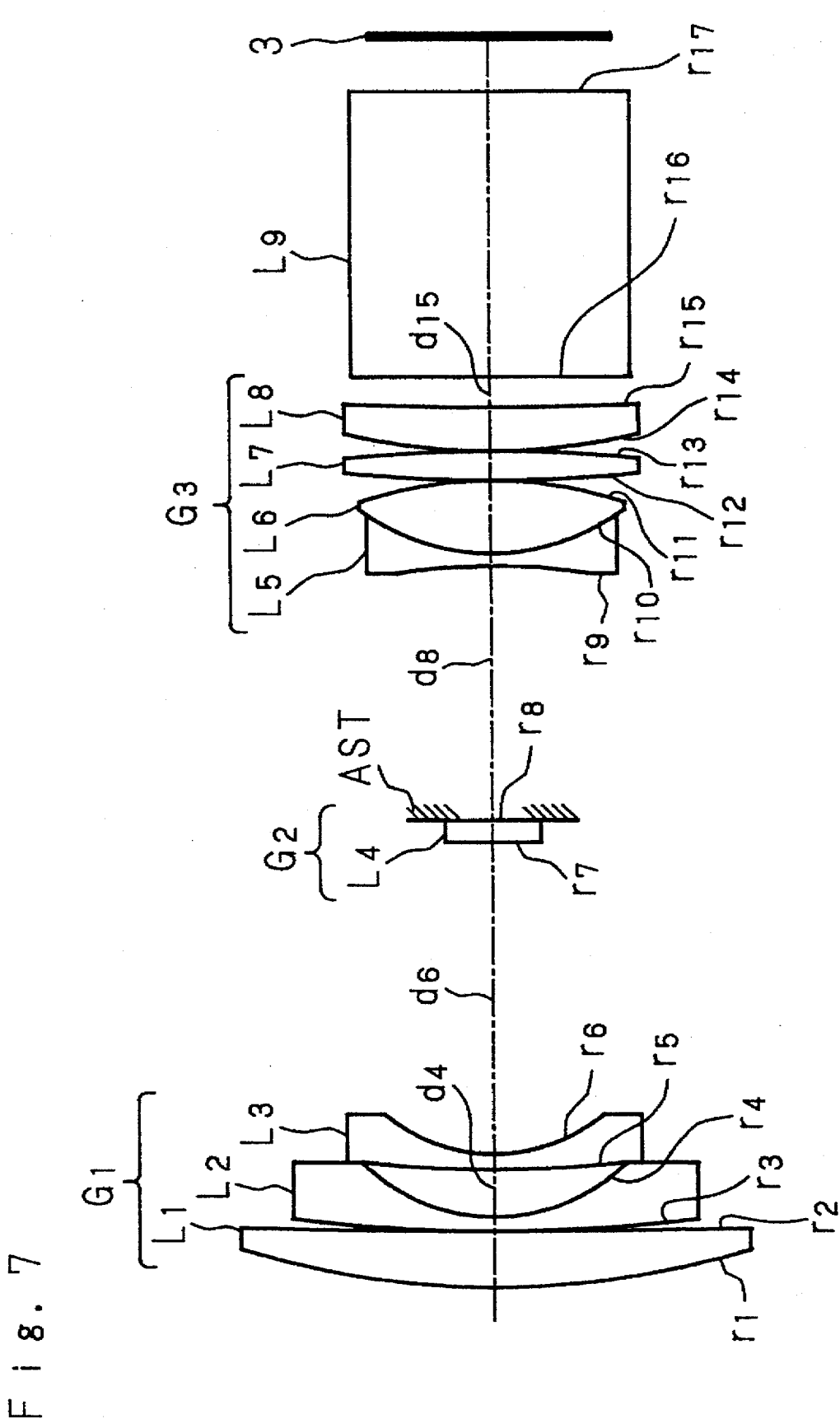
FIG. 7 is a sectional view showing a-retro-focus type lens according to the first invention (embodiment 3)
Figure 8:
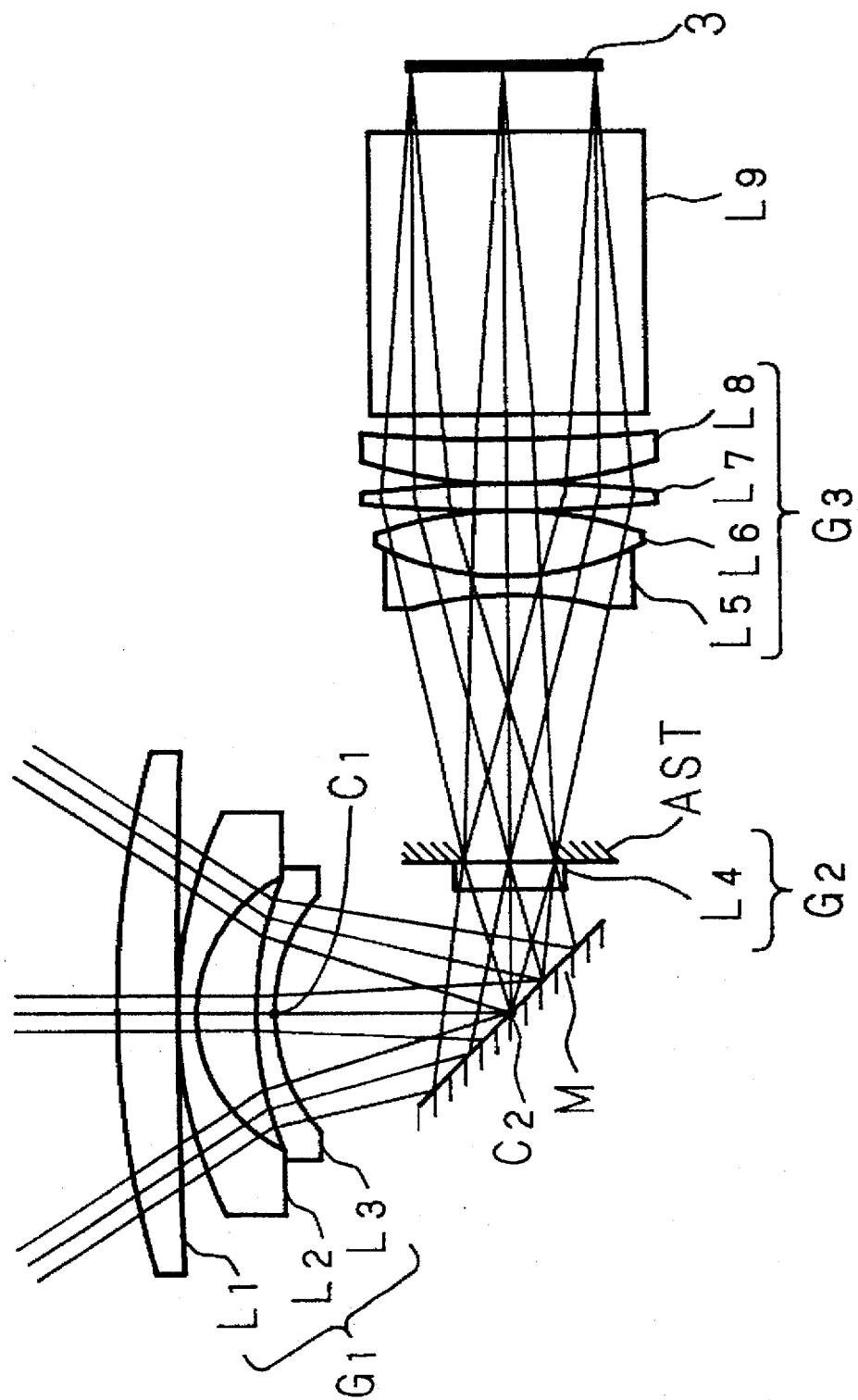
FIG. 8 is a sectional view showing a retro-focus type lens according to the first invention (embodiment 3)
Figure 9:
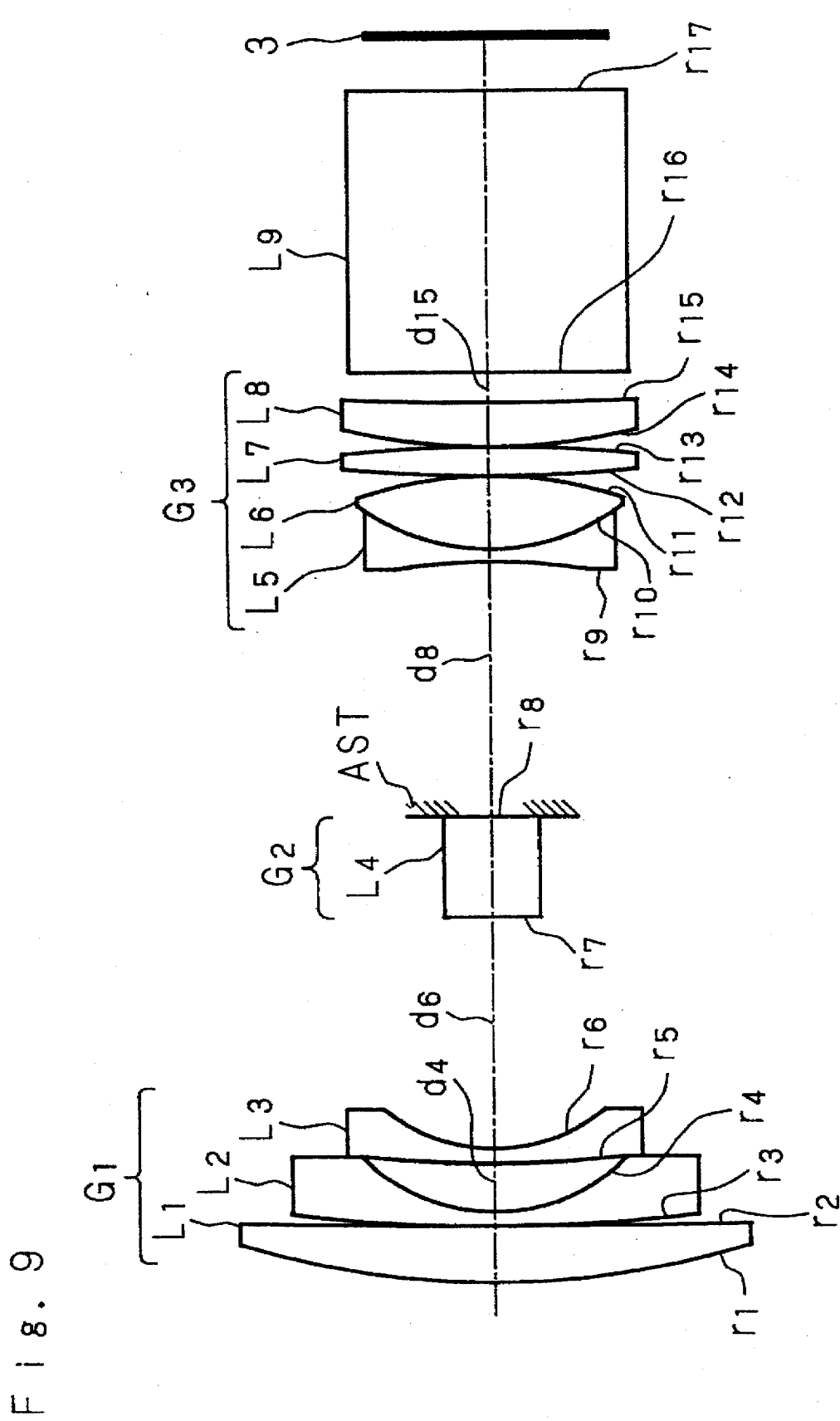
FIG. 9 is a sectional view showing a retro-focus type lens according to the first invention (embodiment 4)
Figure 10:
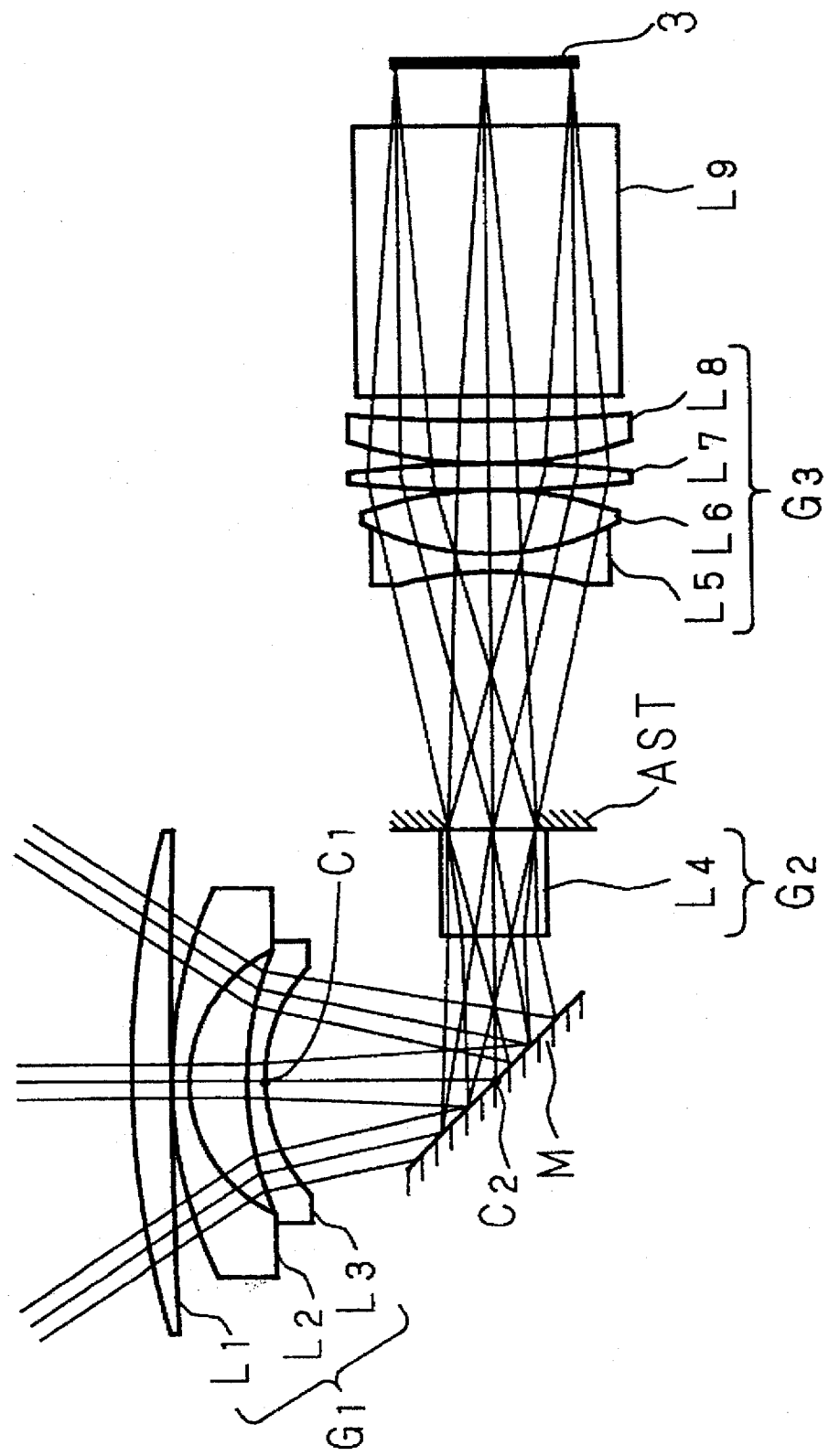
FIG. 10 is a sectional view showing a retro-focus type lens according to the first invention (embodiment 4)
Figure 11:
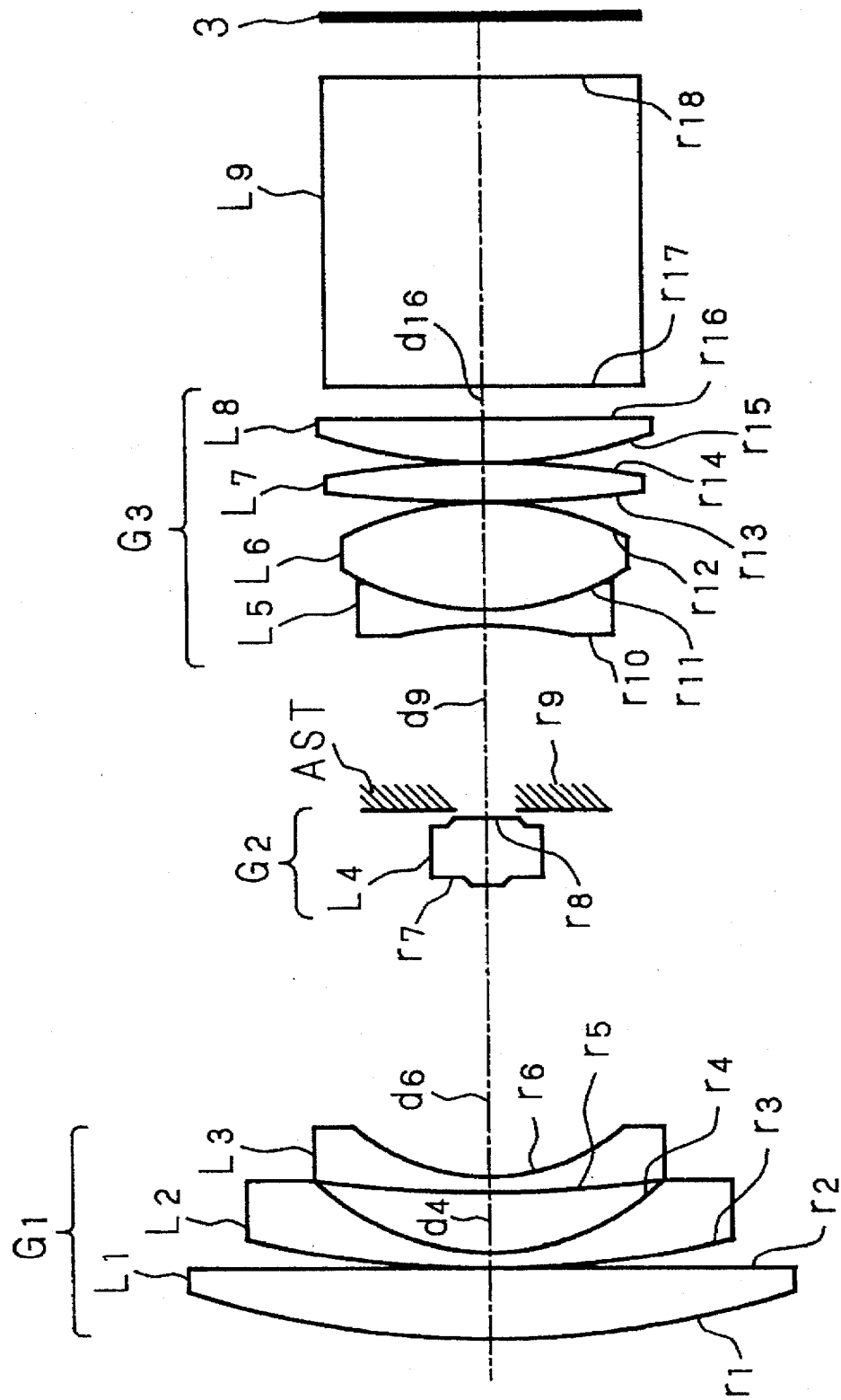
FIG. 11 is a sectional view showing a retro-focus type lens according to the first invention (embodiment 5)
Figure 12:
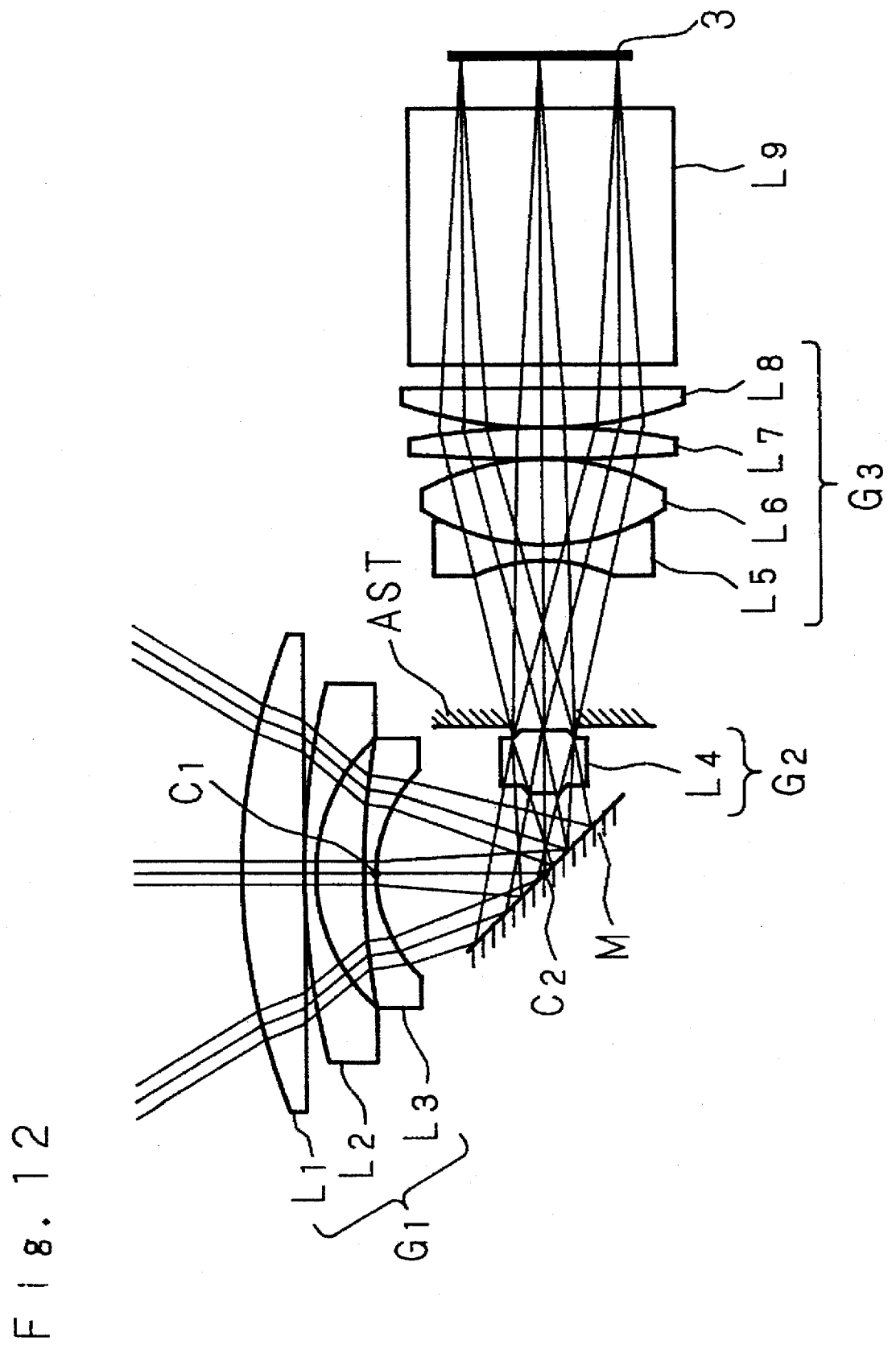
FIG. 12 is a sectional view showing a retro-focus type lens according to the first invention (embodiment 5)
Figure 13:
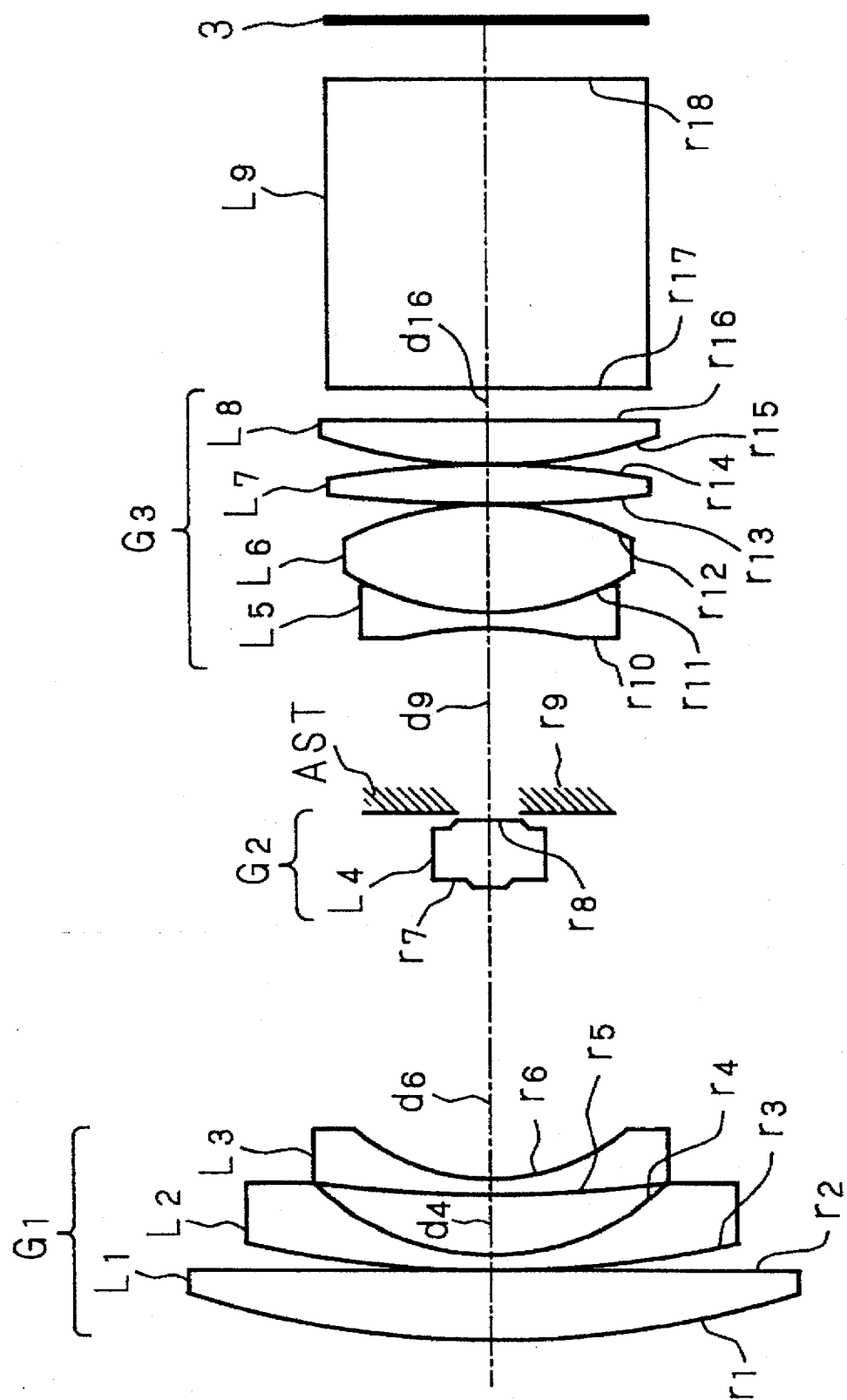
FIG. 13 is a sectional view showing a retro-focus type lens according to the first invention (embodiment 6)
Figure 14:
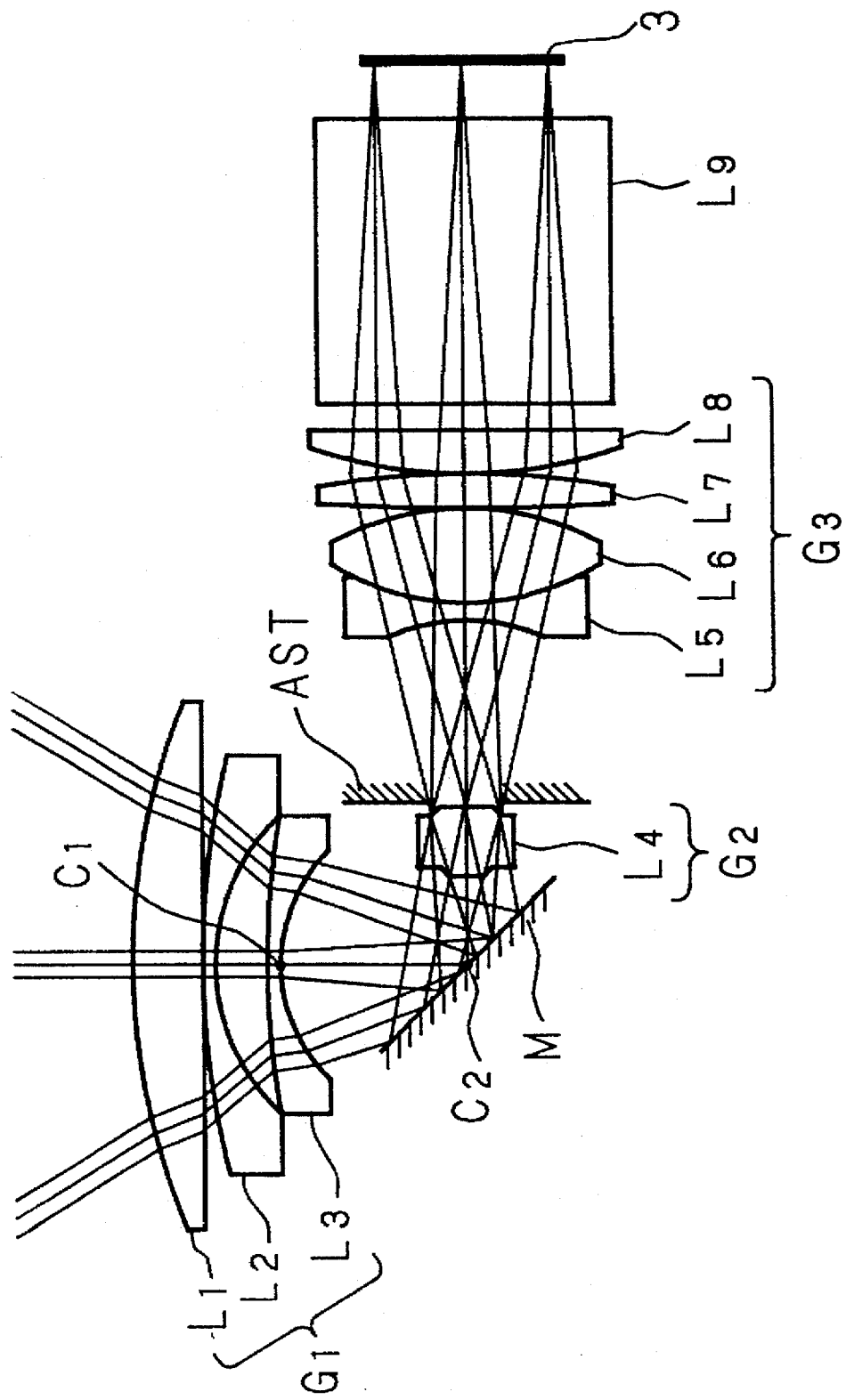
FIG. 14 is a sectional view showing a retro-focus type lens according to the first invention (embodiment 6)
Figure 15:
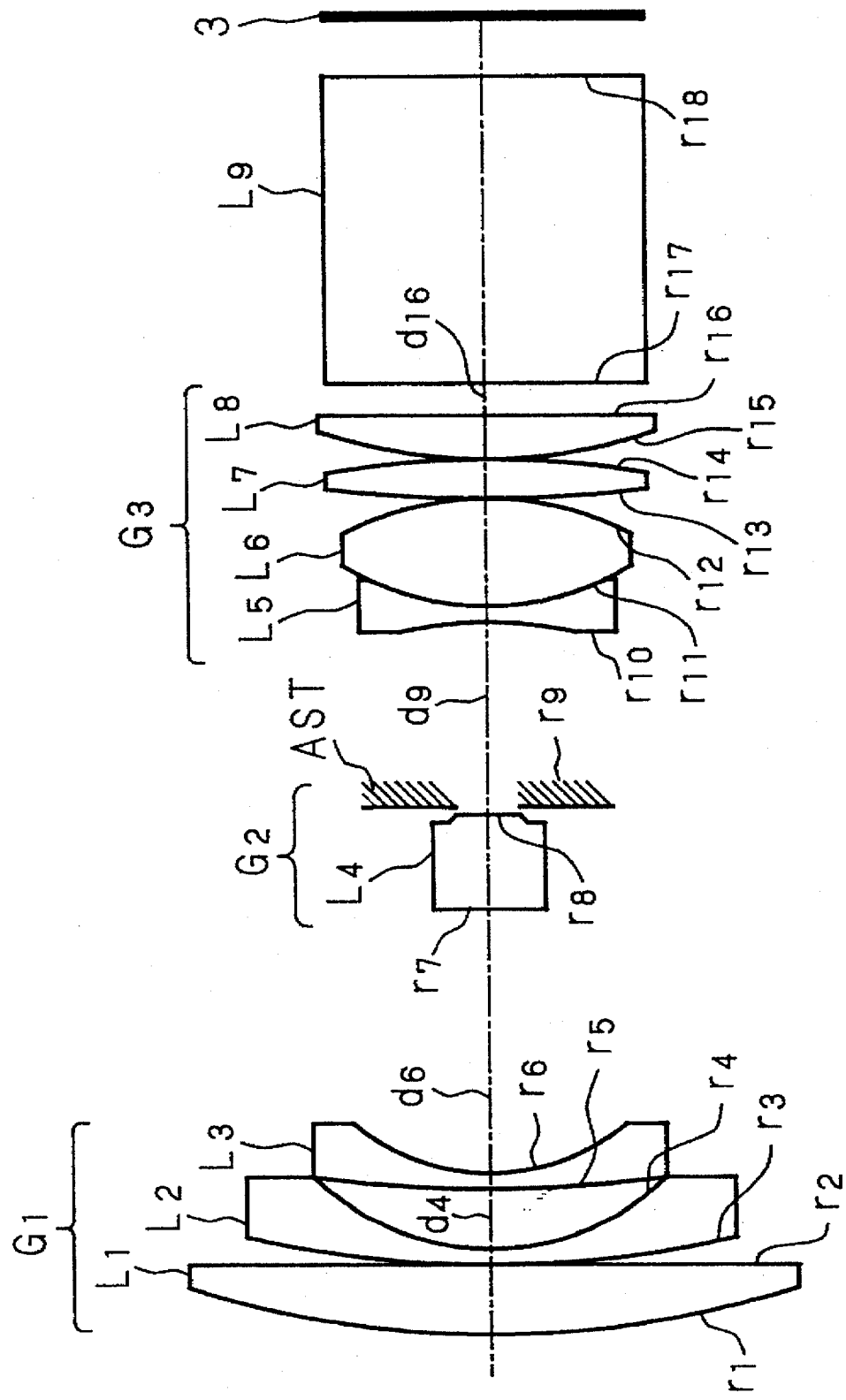
FIG. 15 is a sectional view showing a retro-focus type lens according to the first invention (embodiment 7)
Figure 16:
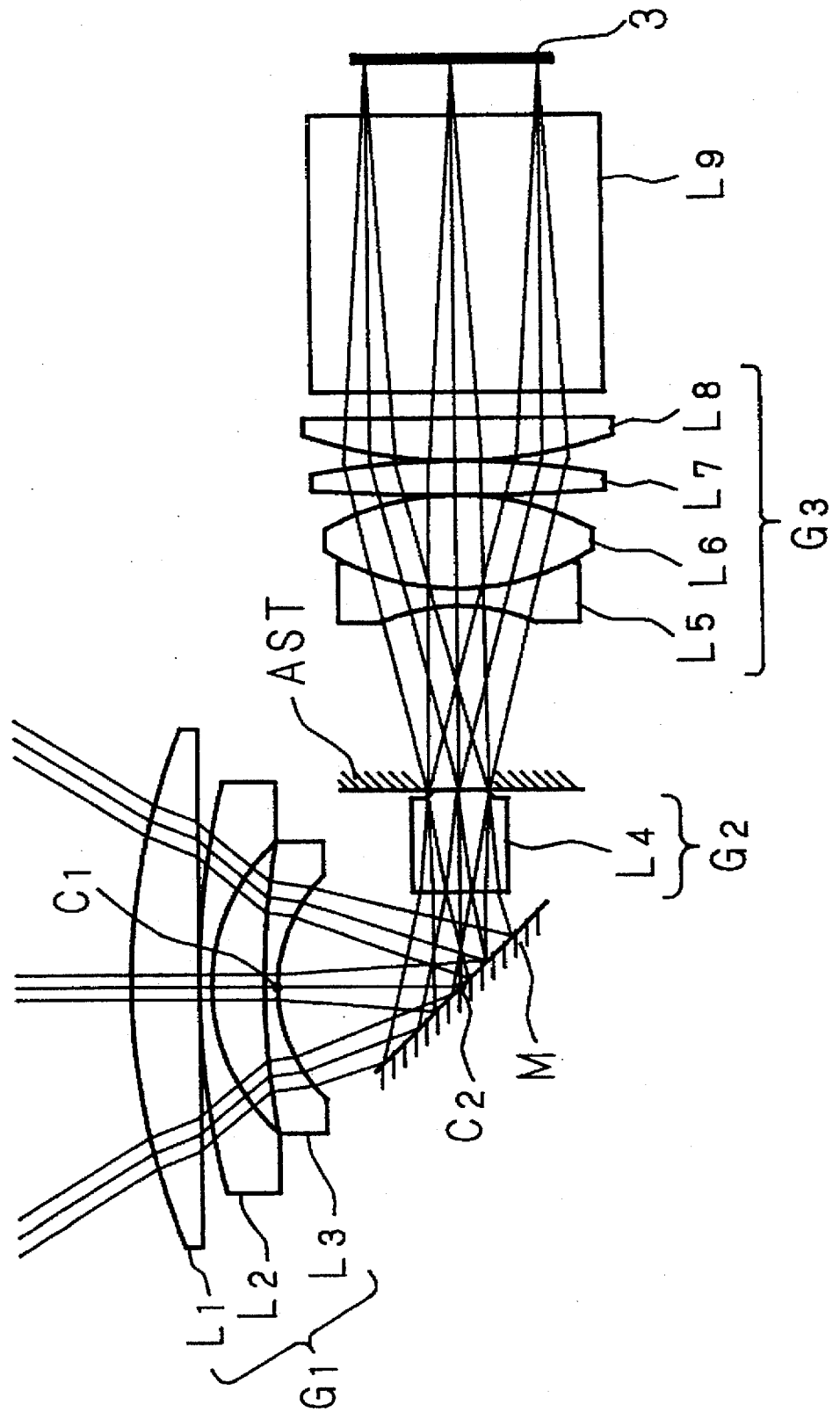
FIG. 16 is a sectional view showing a retro-focus type lens according to the first invention (embodiment 7)
Figure 17:
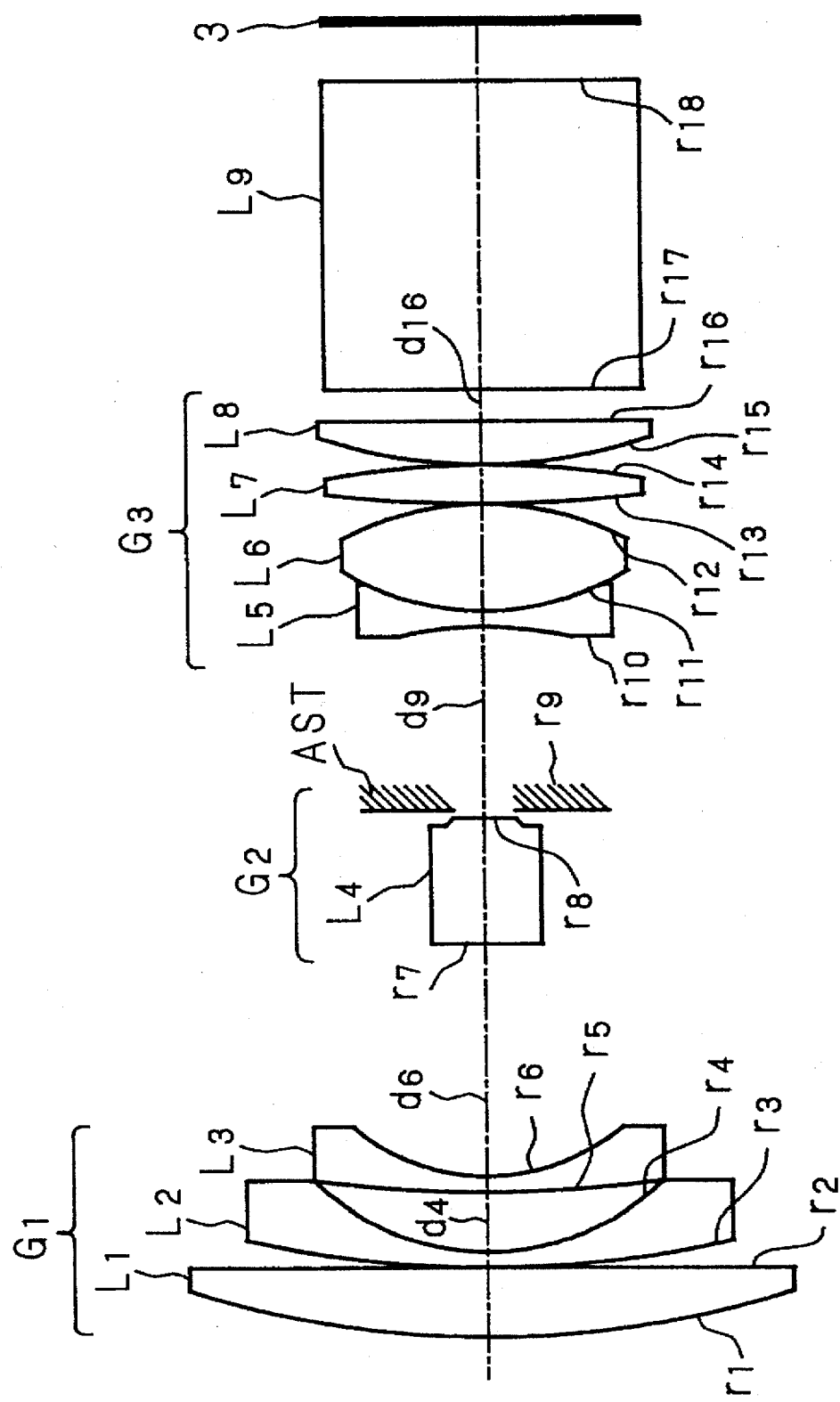
FIG. 17 is a sectional view showing a retro-focus type lens according to the first Invention (embodiment 8)
Figure 18:
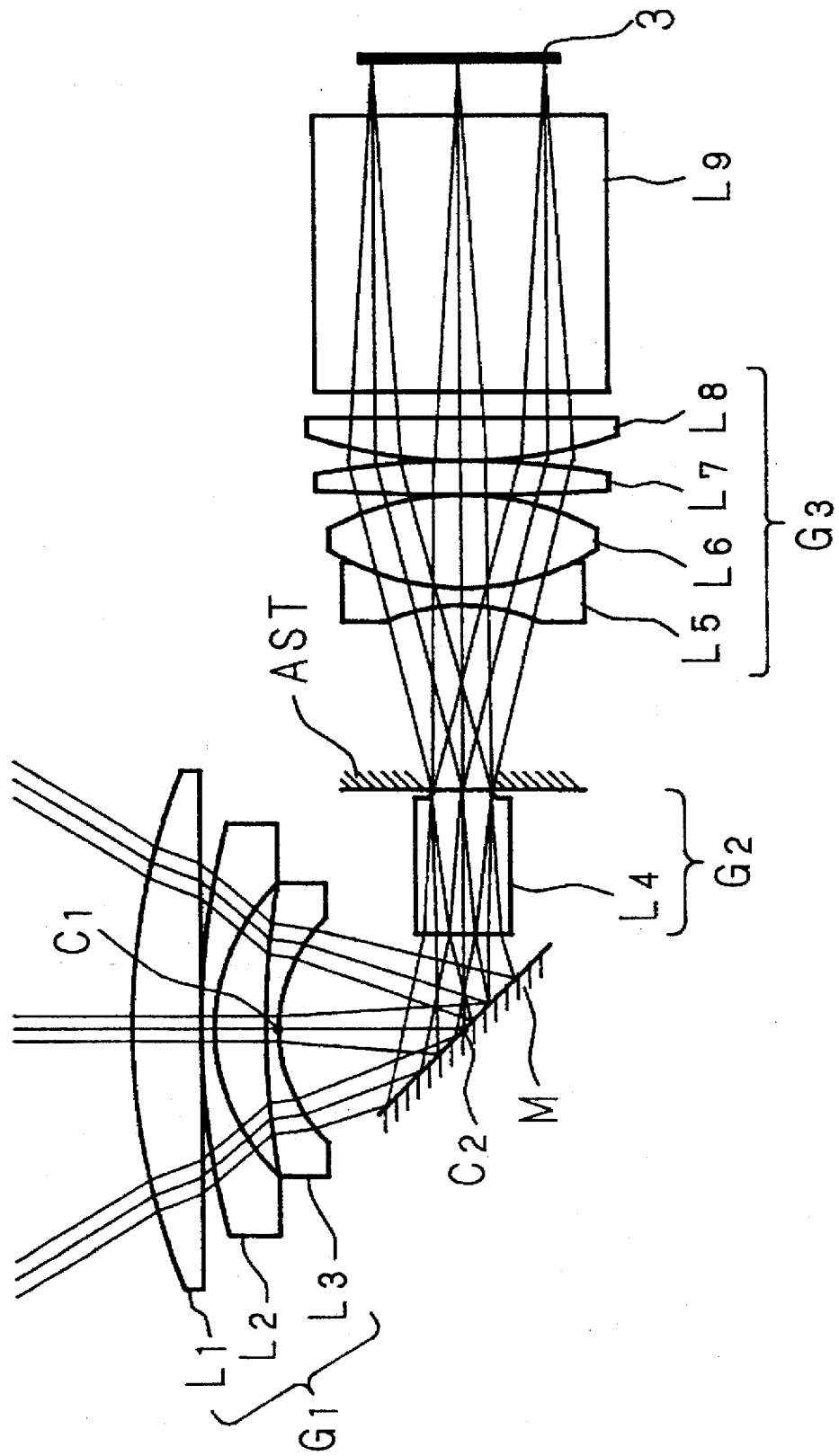
FIG. 18 is a sectional view showing a retro-focus type lens according to the first invention (embodiment 8)
Figure 19:
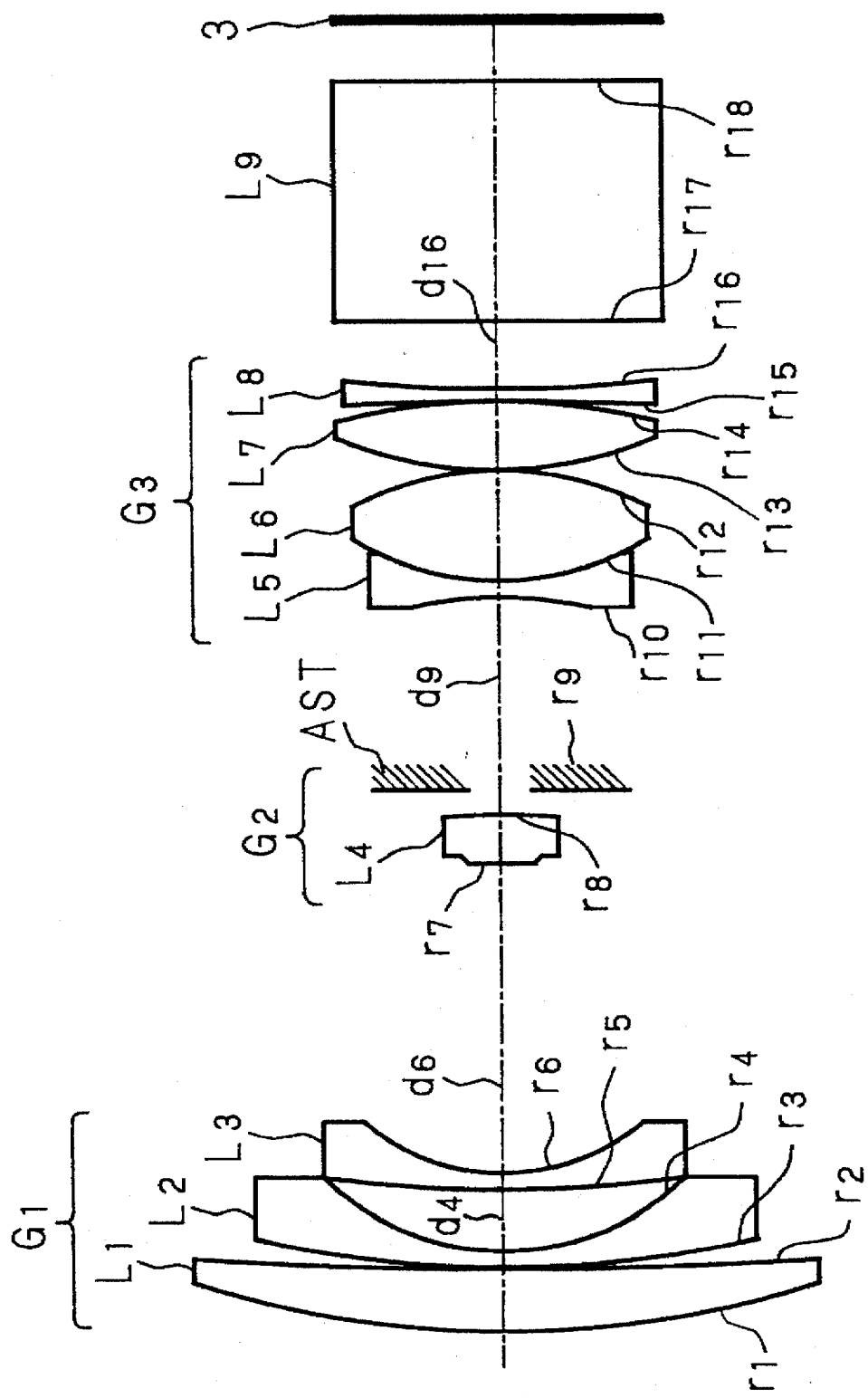
FIG. 19 is a sectional view showing a retro-focus type lens according to the first invention (embodiments 9 to 12, 14 to 20)
Figure 20:
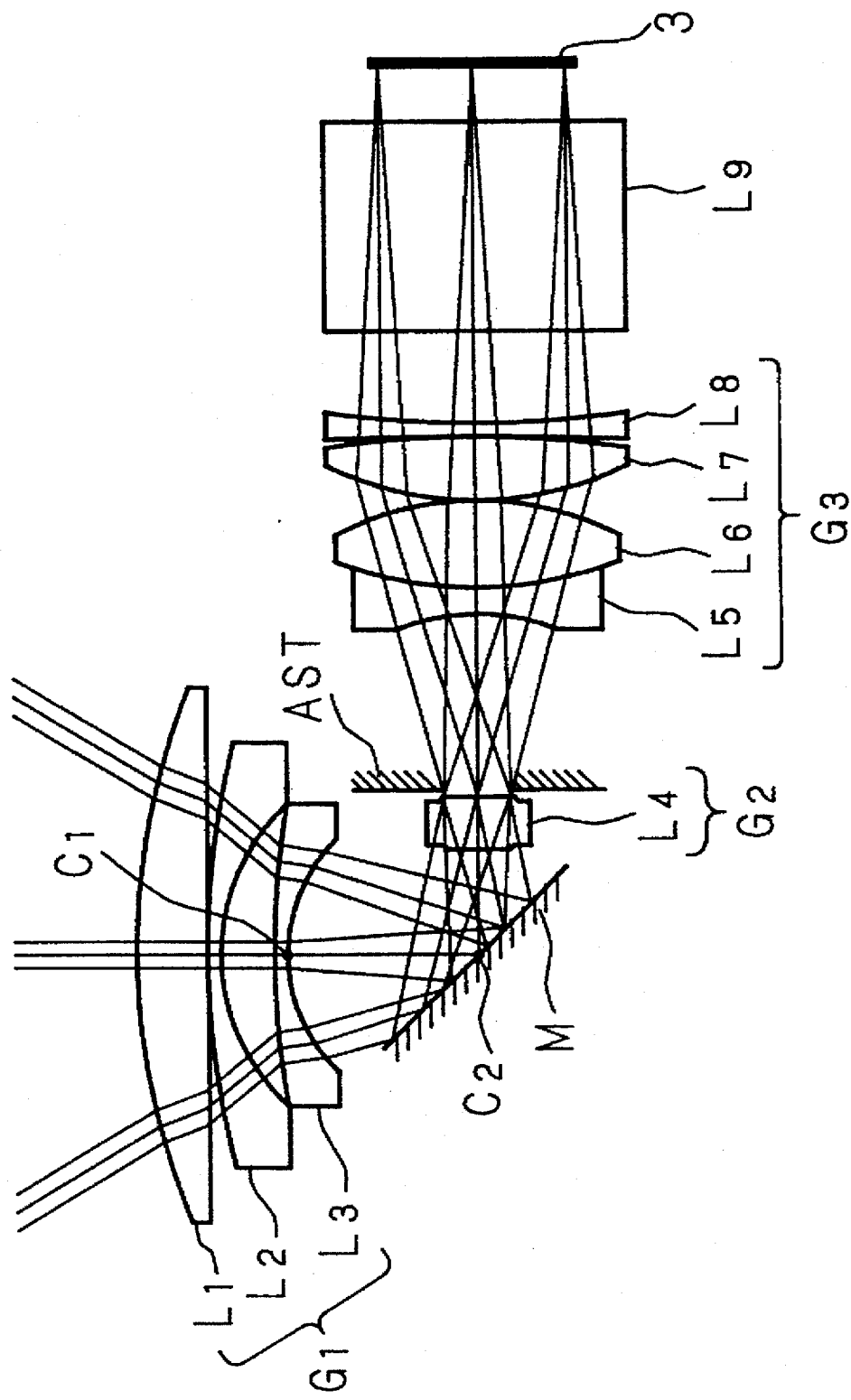
FIG. 20 is a sectional view showing a retro-focus type lens according to the first invention (embodiments 9 to 12, 14 to 20)
Figure 21:
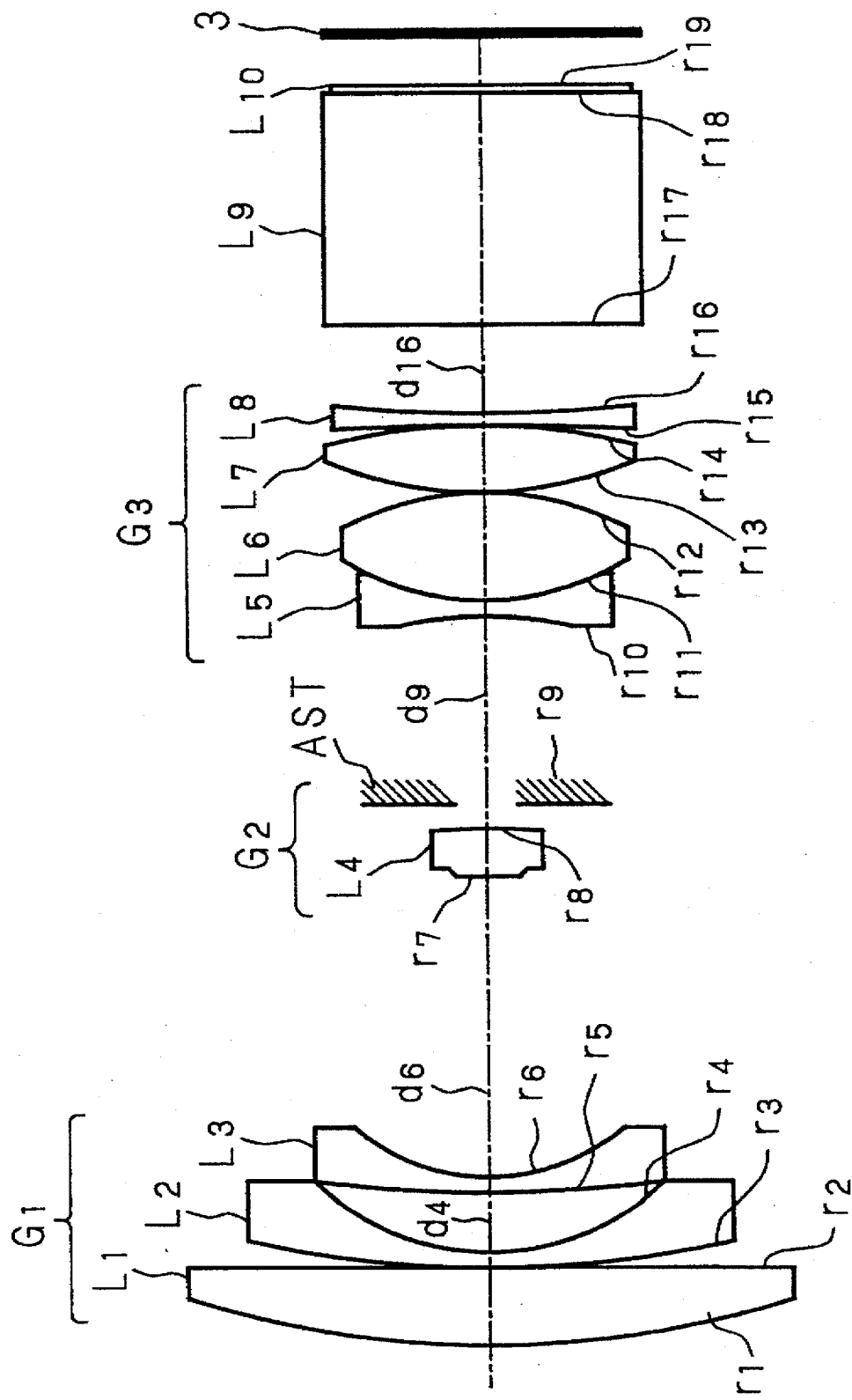
FIG. 21 is a sectional view showing a retro-focus type lens according to the first invention (embodiment 13)
Figure 22:
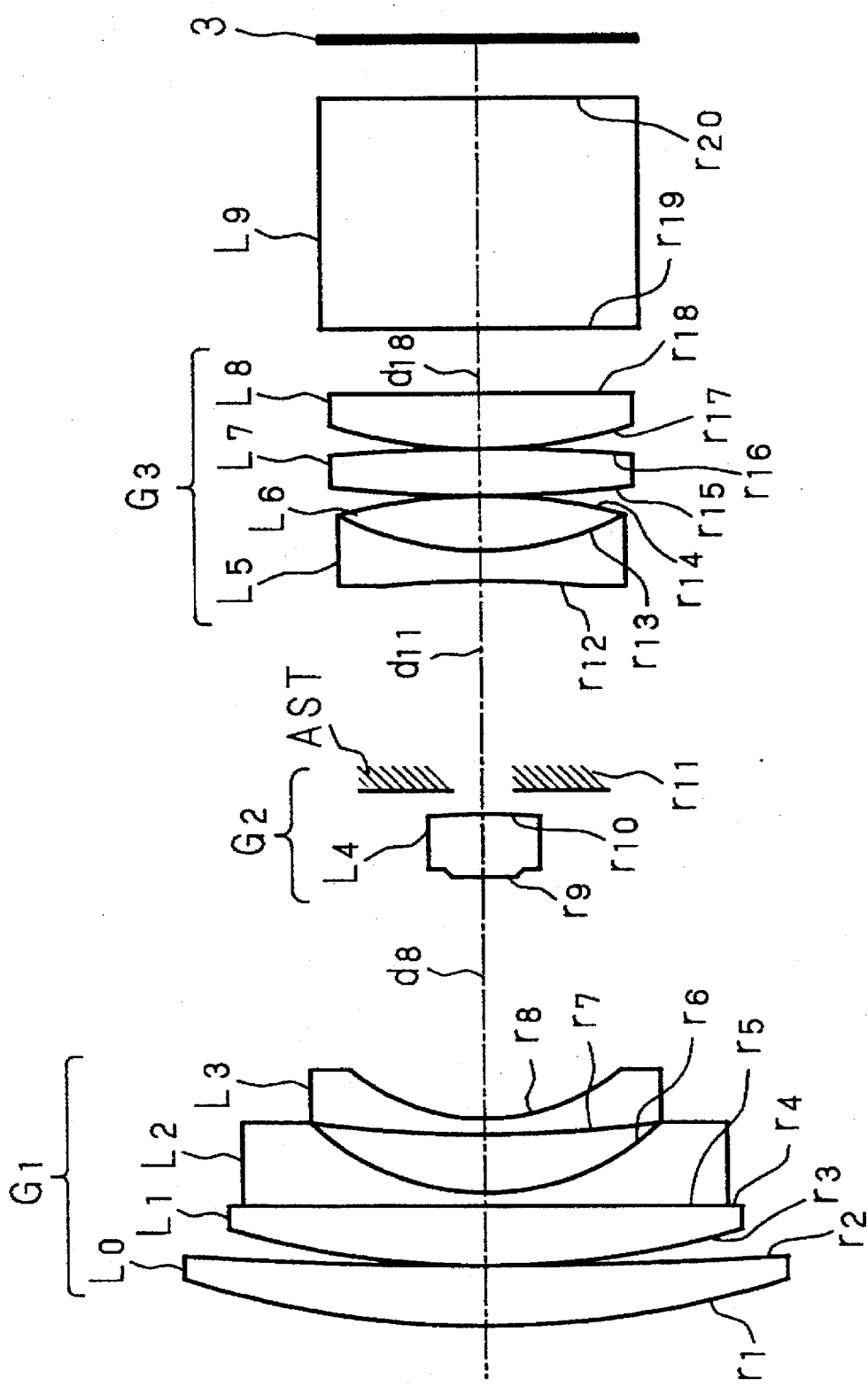
FIG. 22 is a sectional view showing a retro-focus type lens according to the first invention (embodiments 21, 22)
Figure 23:
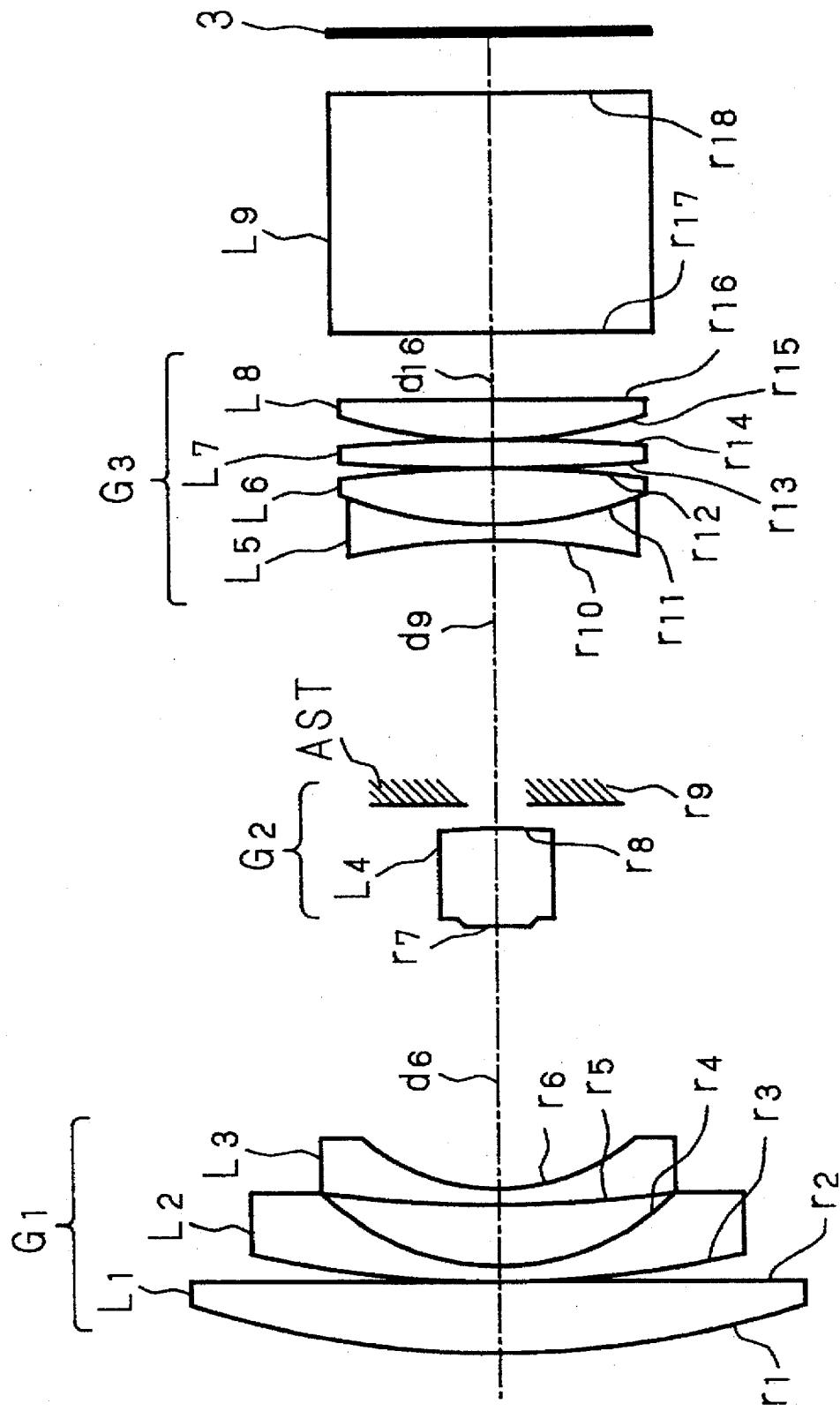
FIG. 23 is a sectional view showing a retro-focus type lens according to the first invention (embodiment 23)
Figure 24:
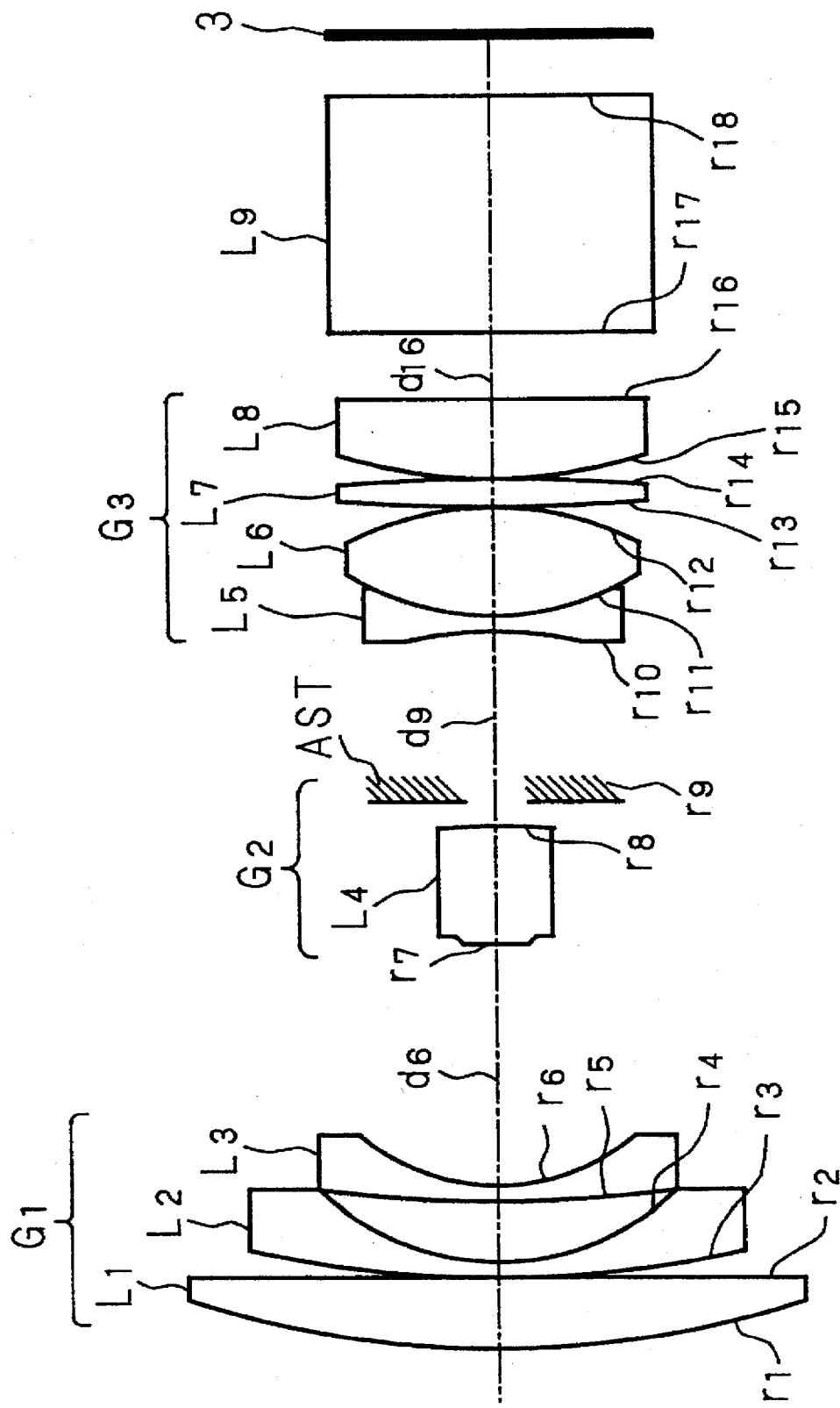
FIG. 24 is a sectional view showing a retro-focus type lens according to the first invention (embodiment 24)
Figure 25:
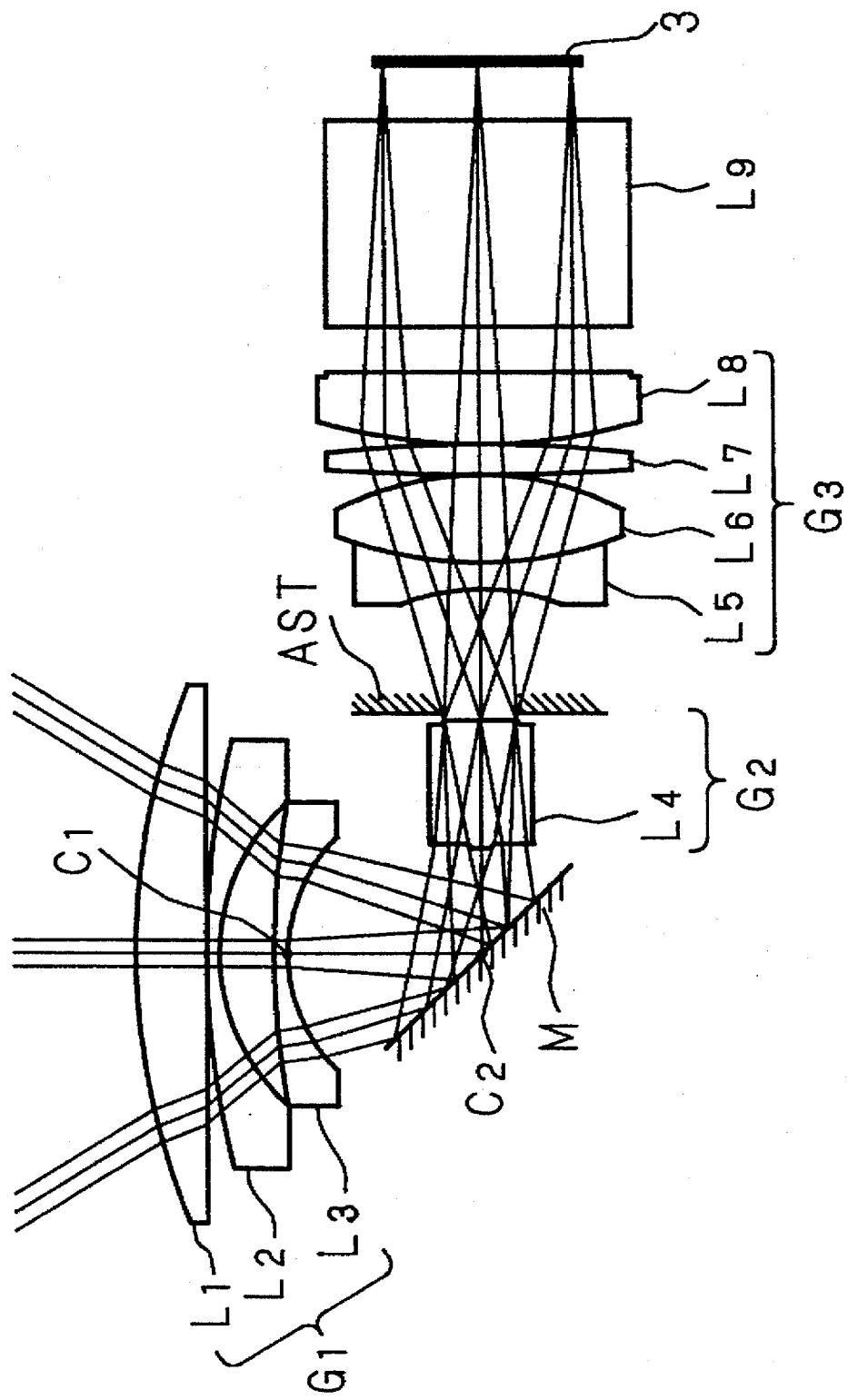
FIG. 25 is a sectional view showing a retro-focus type lens according to the first invention (embodiment 24)

FIGS. 4 and 5 show an embodiment 1. FIG. 5 shows a state where a mirror M inclined at 45° is inserted in the same lens system as in FIG. 4. FIG. 6 is a sectional view of a lens of an embodiment 2; FIGS. 7 and 8 are sectional views of a lens of an embodiment 3; FIGS. 9 and 10 are sectional views of a lens of an embodiment 4; FIGS. 11 and 12 are sectional views of a lens of an embodiment 5; FIGS. 13 and 14 are sectional view of a lens of an embodiment 6; FIGS. 15 and 16 are sectional views of a lens of an embodiment 7; FIGS. 17 and 18 are sectional views of a lens of an embodiment 8; FIGS. 19 and 20 are sectional views of a lens of embodiments 9 to 12, 14 to 20; FIG. 21 is a sectional views of a lens of an embodiment 13, FIG. 22 is a sectional view of a lens of embodiments 21, 22; FIG. 23 is a sectional view of a lens of an embodiment 23; FIGS. 24 and 25 are sectional views of a lens an embodiment 24; and FIGS. 26 to 29 are sectional views of a lens of an embodiment 25.

<Construction of Lens Groups>

(Embodiments 1 to 8) (See FIGS. 4, 6, 7, 9, 11, 13, 15, 17)

The first lens group G1 includes a first lens element L1 having the positive refracting power and a convex surface on the large conjugate side, a second lens element L2 having the negative refracting power and directing a strong concave surface to the small conjugate side, and a third lens element L3 having the negative refracting power and directing a strong concave surface to the small conjugate side. The second lens group G2 includes a fourth leis element L4 having the positive refracting power, and the diaphragm AST is provided in the vicinity of the small conjugate side and the focal point of the third lens group G3 on the large conjugate side. The third lens group G3 includes a fifth lens element L5 having the negative refracting power and a concave surface on the small conjugate side, a sixth lens element L6 having the positive refracting power and a convex surface on the large conjugate side which is joined with the lens element L5, seventh and eighth lens elements L7, L8 having the positive refracting power.

(Embodiments 9 to 20) (See FIGS. 19 and 21)

The construction of the first lens group G1 and the second lens group G2 are same as the embodiments 1 to 8. The third lens group G3 includes a fifth lens element L5 having the negative refracting power and a concave surface on the small conjugate side, a sixth lens element L6 having the positive refracting power and a convex surface on the large conjugate side which is joined with the lens element L5, a seventh lens element L7 having the positive refracting power, and an aspherical eighth lens element L8 whose center portion has the weak refracting power and whose peripheral portion has the strong negative refracting power.

(Embodiments 21, 22) (See. FIG. 22)

Compared to the construction of the embodiments 1 to 20, the construction of the first lens group G1 includes additionally an aspherical lens element L0 whose center portion has the weak refracting power on the large conjugate side, and whose peripheral portion has the strong positive refracting power. The construction of the second lens group G2 is same as in the embodiments 1 to 20. Similar to the embodiments 1 to 20, the third lens group G3 includes fifth and sixth lens elements L5, L6, and spherical lens elements L7, L8 having the positive refracting power.

(Embodiment 23) (See FIG. 23)

The construction of the first lens group G1 is same as in the embodiments 1 to 20 except that a third lens element L3 is an aspherical lens. The construction of the second lens group G2 is same as in the embodiments 1 to 20 except that a fourth lens element L4 is an aspherical lens. The construction of the third lens group G3 is same as in the embodiments 21, 22.

(Embodiment 24) (See FIG. 24)

The construction of the first lens group G1 and the second lens group G2 is same as in the embodiments 1 to 20. The construction of the third lens group G3 is same as in the embodiments 21, 22.

Figure 26:
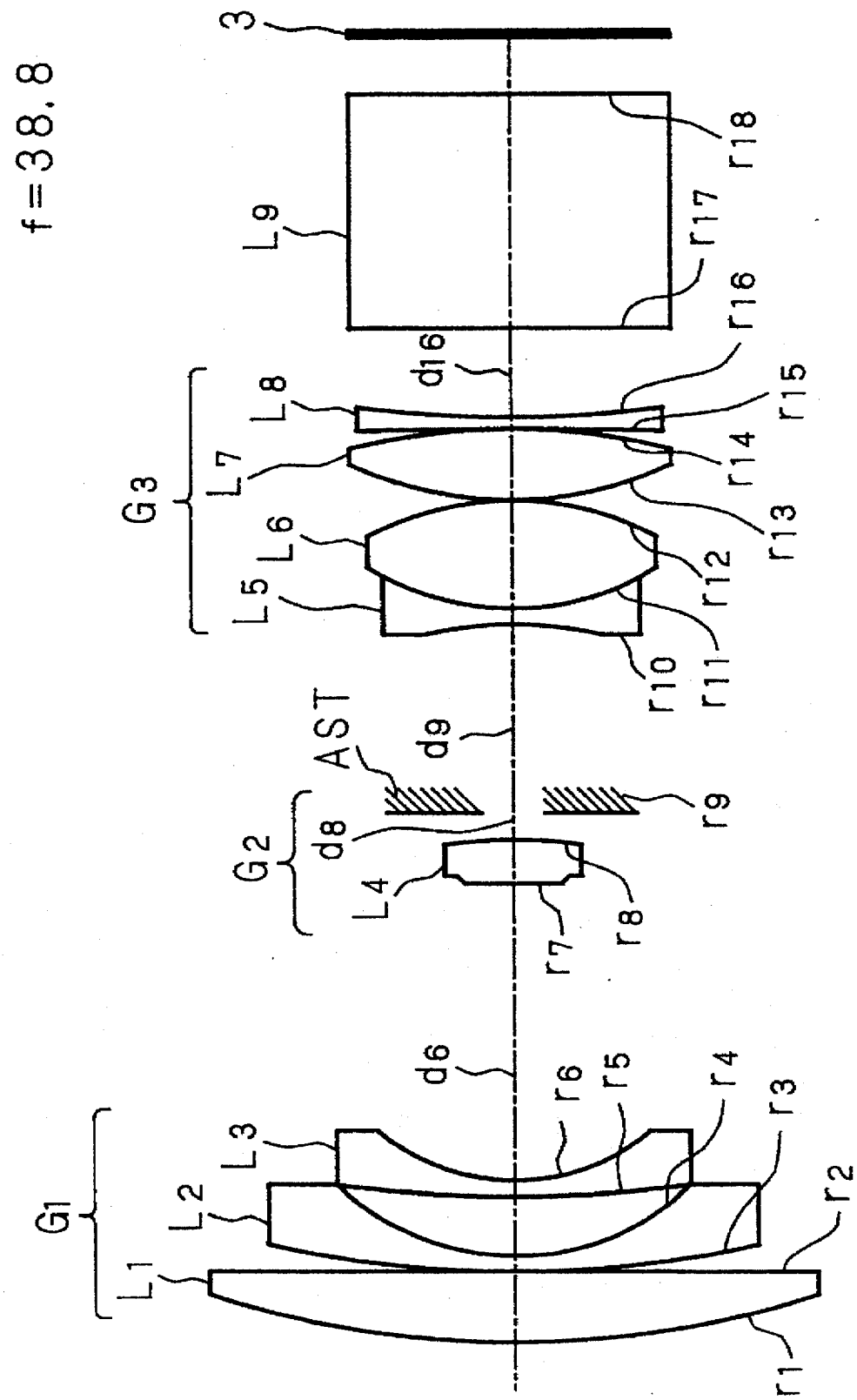
FIG. 26 is a sectional view showing a retro-focus type lens according to the first invention (embodiment 25)
Figure 27:
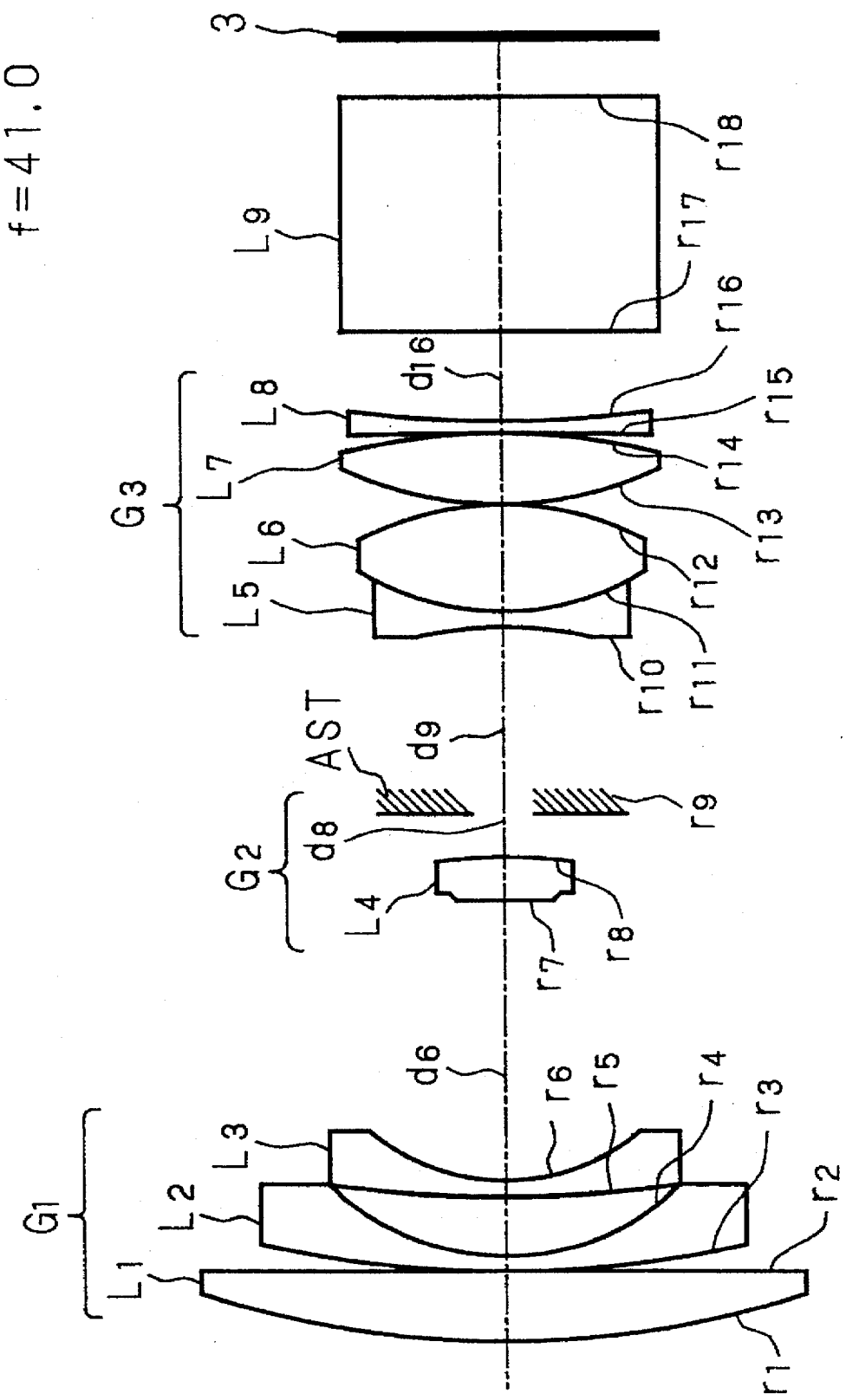
FIG. 27 Is a sectional view showing a retro-focus type lens according to the first invention (embodiment 25)

(Embodiment 25) (See FIGS. 26 to 28)

The construction of the first to third lens groups G1 to G3 are same as in the embodiments 1 to 20. However, in this embodiment, a lens is a zoom lens capable of finely adjusting the projection magnification. Thus, the focal length of the total lens system is made variable by moving a lens element L4 of the second lens group G2 along the optical axis, and movement of the image surface caused by the varied focal length is compensated for by movement of the first to third lens groups G1 to G3 along the optical axis.

As seen from the above, in the respective embodiments, the first lens group G1 having the negative refracting power and the second lens group G2 and the third lens group G3 having the positive refracting power are combined to construct the retro-focus type lens, and there is attained such a sufficiently long back focal length to insert the thick parallel plane plate L9 ( L9, L10 in the embodiment 13 shown in FIG. 21) after the third lens group G3 and to provide proper air intervals before and after the parallel plane plate L9. Further, the diaphragm AST is arranged in the vicinity of the focal point of the third lens group G3 on the screen side (on the large conjugate side), thereby realizing a telecentric construction in which an off-axis chief ray becomes substantially parallel with the optical axis on the side of the liquid crystal panel 3 (on the small conjugate side). Moreover, a large air interval is attained between the first lens group G1 and the second lens group G2, thereby allowing the mirror M to be inserted in that air interval.

In order to achieve the aforementioned specifications (A) to (D) of the projection lens, the lens system according to the invention satisfies the following conditional equations on the assumption that the focal lengths of the first, second, third lens groups G1, G2, G3, and the total lens system are f1, f2, f3, f, and the air interval between the first lens group G1 and the second lens group G2 is D1.

$$1.8 < D1/f < 3.0 \quad (1)$$

$$1.1 < f2/f3 < 1.6 \quad (2)$$

$$1.5 < |f1|/f < 2.3 \quad (3)$$

Description will be given on the meanings of upper and lower limit values of the above conditional equations. First of all, in the equation (1) for determining a ratio of the air interval between the first lens group G1 and the second lens group G2 to the focal length of the total lens system, if the ratio is in excess of the upper limit value of the equation (1), it is advantageous in inserting the mirror M. However, this in turn makes an outside diameter of the first lens group G1 larger and makes the length of the lens system unnecessarily long. Conversely, if the ratio is below the lower limit value of the equation (1), it becomes difficult to insert the mirror M. Further, in order to satisfy a required projection angle, the negative refracting power of the first lens group G1 becomes too strong, thereby making it difficult to correct an oblique aberration.

In the condition of the equation (2) for determining a ratio of the focal length of the second lens group G2 to that of the third lens group G3, if the ratio is in excess of the upper limit value of the equation (2), a positive refracting-power sharing of the third lens group G3 becomes too strong compared to the second lens group G2. Thus, if the off-axis chief ray is made substantially parallel with the optical axis on the small conjugate side, a large distortion is generated in the shape of a barrel off the optical axis when viewed at the small conjugate side, and it is difficult to correct that distortion. Conversely, if the ratio is below the lower limit value of the equation (2), a positive refracting-power sharing of the third lens group G3 becomes too weak compared to the second lens group G2. Accordingly, the construction of the retro-focus type lens becomes weak, thereby making it difficult to attain the long back focal length.

The equation (3) determines a ratio of the focal length of the first lens group G1 to that of the total lens system. If the ratio is in excess of the upper limit value of the equation (3), a negative refracting-power sharing of the first lens group G1 becomes too weak. Accordingly, the construction of the retro-focus type lens becomes weak, thereby making it difficult to attain the long back focal length. In order to attain the refracting power of the first lens group G1 and the long back focal length in a state where the ratio is in excess of the upper limit value of the equation (3), it is necessary to space the first lens group G1 and the second lens group G2 apart by an unnecessary long distance. This is not preferable since the entire length of the lens system is increased and the outside diameter of the first lens group G1 becomes larger accordingly. Conversely, if the ratio is below the lower limit value of the equation (3), the negative refracting power of the first lens group G1 becomes too strong, with the result that a large astigmatism is generated off the optical axis, thereby making it difficult to correct the astigmatism.

There will be shown numerical embodiments according to the invention. Meanings of symbols used in TABLE-1 to TABLE-25 showing the numerical embodiments are as follows. It will be appreciated that the focal lengths and the magnifications are values on an e line (546.1 nm).

f: focal length of the entire projection lens system

θ: projection half-angle (on the large conjugate side)

F: effective F-number (on the small conjugate side) at a standard projection magnification β: standard projection magnification f1: focal length of the first lens group G1 f2: focal length of the second lens group G2 f3: focal length of the third lens group G3 f4: focal length of the aspherical lens L8 (Embodiments 9 to 20, 25)

f5: focal length of the aspherical lens L0 (Embodiments 21, 22)

D1: air interval between the first lens group G1 and the second lens group G2 m: surface number sequentially counted from the screen side ri: radius of curvature of the i-th lens surface counted from the screen side di: thickness of the i-th lens element and air interval counted from the screen side ni: refractive index of the i-th lens element counted from the screen side at a wavelength of 546.1 nm (on the e line) (TABLE-1 to TABLE-8; Embodiments 1 to 8)

ni: refractive index of the i-th lens element counted from the screen side at a wavelength of 587.6 nm (on a d line) (TABLE-9 to TABLE-25; Embodiments 9 to 25)

v: Abbe number of the i-th lens element counted from the screen side

AST: aperture plane

Further, it is understood that the shape of the aspherical surface indicated at * in TABLES-9 to 25 is expressed by the following equations (4), (5) in a rectangular coordinate system (X, Y, Z) wherein a center of the surface is set as an origin and the optical axis is set as a Z-axis, when r denotes a center radius of curvature, K denotes a conic constant, A4, A6, A8, and A10 denote fourth, sixth, eighth, and tenth order polynomial deformation terms.

$$Z = \frac{\theta^2/r}{1+[1-(1+K)\theta^2/r^2]^{1/2}} + \sum_{i=2}^{5} A2i\theta^{2i} \quad (4)$$

$$\theta = \sqrt{X^2 + Y^2} \quad (5)$$

<First Invention, Embodiment 1>

FIG. 4 shows an embodiment 1. Numerical data of this embodiment are shown in TABLE-1. FIG. 5 shows an example in which the bent mirror M inclined at 45° is inserted in the same construction as in FIG. 4 and the light beam is caused to pass the lens system. In FIG. 5, a distance between a center (C1) of the last surface of the first lens group G1 and a center (C2) of the mirror M is set at 44.06 mm. The diaphragm AST is arranged in close contact with the small. conjugate side surface of lens element L4 constituting the second lens group G2. It can be seen from FIG. 5 that a sufficient air interval is attained to insert the mirror M between the first lens group G1 and the second lens group G2. There was obtained the peripheral illuminance ratio of 84.6% at a maximum projection half-angle (41.60°) because of effects of the off-axis pupil aberration. Generally, the peripheral illuminance ratio of 30% is required in the projection-type display apparatus. The above value is sufficiently high compared to this value. Further, the oblique angle of the chief ray was 0.3° or smaller. It can be also seen from FIG. 5 that the oblique angle of the off-axis beam with respect to the optical axis becomes smaller in an interior of the lens system than on the screen side (on the large conjugate side). Accordingly, the mirror M is allowed to be smaller sized than a case where it is arranged outside the projection lens (on the screen side).

TABLE 1

(EMBODIMENT 1)
f = 24.00 θ = 41.60° F = 4.5 β = 23.5
f1 = −41.35 f2 = 78.82 f3 = 64.78 D1 = 65.61
D1/f = 2.73 f2/f3 = 1.22 | f1 |/f = 1.72

| m | r i | d i | n i | v i |
|---|---|---|---|---|
| 1 | 139.17585 | 8.90 | 1.69980 | 55.5 |
| 2 | 1401.53292 | 0.10 | | |
| 3 | 132.10005 | 3.00 | 1.61686 | 37.0 |
| 4 | 32.25716 | 10.94 | | |
| 5 | 164.89057 | 3.00 | 1.64129 | 55.5 |
| 6 | 35.81876 | 65.61 | | |
| 7 | 134.01990 | 4.10 | 1.81264 | 25.5 |
| 8 | −120.99001 | 47.31 | | AST |
| 9 | −104.18790 | 2.57 | 1.81264 | 25.5 |
| 10 | 40.63287 | 13.71 | 1.73234 | 54.7 |
| 11 | −70.25245 | 0.10 | | |
| 12 | 172.28250 | 4.96 | 1.69980 | 55.5 |
| 13 | −275.26863 | 0.10 | | |
| 14 | 75.80423 | 7.84 | 1.69980 | 55.5 |
| 15 | 219.60430 | 5.00 | | |
| 16 | INF | 51.00 | 1.51872 | 64.2 |
| 17 | INF | | | |

<First Invention, Embodiment 2>

FIG. 6 shows an embodiment 2. Numerical data of this embodiment are shown in TABLE-2. In this embodiment, a spacing d6 (=D1) between the first lens group G1 and the second lens group G2 is set at 68.93 mm, thereby providing an air interval larger than the one in the embodiment 1 by 3.32 mm. Accordingly, there is no problem in inserting the mirror M.

TABLE 2

(EMBODIMENT 2)
f = 24.00 θ = 41.56° F = 4.5 β = 23.5
f1 = −42.27 f2 = 79.73 f3 = 66.10 D1 = 68.93
D1/f = 2.87 f2/f3 = 1.21 | f1 |/f = 1.76

| m | r 1 | d 1 | n i | v 1 |
|---|---|---|---|---|
| 1 | 138.07949 | 8.90 | 1.69980 | 55.5 |
| 2 | 1129.63736 | 0.10 | | |
| 3 | 117.39695 | 2.01 | 1.61686 | 37.0 |
| 4 | 32.01591 | 11.58 | | |
| 5 | 165.64017 | 2.01 | 1.64129 | 55.5 |
| 6 | 36.43719 | 68.93 | | |
| 7 | 145.52849 | 4.10 | 1.81264 | 25.5 |
| 8 | −115.30880 | 48.14 | | AST |
| 9 | −101.53291 | 2.57 | 1.81264 | 25.5 |
| 10 | 41.07525 | 13.71 | 1.73234 | 54.7 |
| 11 | −70.47261 | 0.10 | | |
| 12 | 142.18918 | 4.96 | 1.69980 | 55.5 |
| 13 | −440.96858 | 0.10 | | |
| 14 | 79.84551 | 7.84 | 1.69980 | 55.5 |
| 15 | 259.57190 | 5.00 | | |
| 16 | INF | 51.00 | 1.51872 | 64.2 |
| 17 | INF | | | |

<First Invention, Embodiment 3>

FIG. 7 shows an embodiment 3. Numerical data of this embodiment are shown in TABLE-3. In this embodiment, the spacing d6 (=D1) between the first lens group G1 and the second lens group G2 is set at 53.83 mm, thereby providing the air interval smaller than the one in the embodiment 1 by 11.78 mm. FIG. 8 shows an example in which the bent mirror M inclined at 45° is inserted in the same construction as in FIG. 7 and the light beam is caused to pass the lens system. In FIG. 8, the distance between the center (C1) of the last surface of the first lens group G1 and the center (C2) of the mirror M is set at 34.6 mm. The diaphragm AST is arranged in close contact with the small conjugate side surface of lens element L4 constituting the second lens group G2. It can he seen from FIG. 8 that the mirror M can be easily inserted between the first lens group G1 and the second lens group G2.

TABLE 3

(EMBODIMENT 3)
f = 25.01 θ = 40.64° F = 4.5 β = 23.5
f1 = −39.74 f2 = 73.44 f3 = 61.20 D1 = 53.83
D1/f = 2.15 f2/f3 = 1.20 | f1 |/f = 1.59

| m | r i | d i | n i | v i |
|---|---|---|---|---|
| 1 | 146.47790 | 8.90 | 1.69980 | 55.5 |
| 2 | −9528.73000 | 0.10 | | |
| 3 | 166.98639 | 3.00 | 1.61686 | 37.0 |
| 4 | 29.32481 | 6.68 | | |
| 5 | 77.99256 | 3.00 | 1.64129 | 55.5 |
| 6 | 30.44297 | 53.83 | | |
| 7 | 442.15849 | 4.10 | 1.81264 | 25.5 |
| 8 | −68.70715 | 45.61 | | AST |
| 9 | −101.08267 | 2.57 | 1.81264 | 25.5 |
| 10 | 40.44856 | 13.71 | 1.73234 | 54.7 |
| 11 | −61.07050 | 0.10 | | |
| 12 | 409.67064 | 4.96 | 1.69980 | 55.5 |
| 13 | −163.35741 | 0.10 | | |
| 14 | 95.94786 | 7.84 | 1.69980 | 55.5 |
| 15 | 688.57440 | 5.00 | | |
| 16 | INF | 51.00 | 1.51872 | 64.2 |
| 17 | INF | | | |

<First Invention, Embodiment 4>

FIG. 9 shows an embodiment 4. Numerical data of this embodiment are shown in TABLE-4. In this embodiment, the spacing d6 (=D1) between the first lens group G1 and the second lens group G2 is set at 47.65 mm, thereby providing the air interval smaller than the one in the embodiment 1 by 17.96 mm. FIG. 10 shows an example in which the bent mirror M inclined at 45° is inserted in the same construction as in FIG. 9 and the light beam is caused to pass the lens system. In FIG. 10, the distance between the center (C1) of the last surface of the first lens group G1 and the center (C2) of the mirror M is set at 28.5 mm. The diaphragm AST is arranged in close contact with the small conjugate side surface of lens element L4 constituting the second lens group G2. It can be seen from FIG. 10 that the mirror M can be mounted between the first lens group G1 and the second lens group G2 in a compact manner.

TABLE 4

(EMBODIMENT 4)
f = 23.83 θ = 41.94° F = 4.5 β = 23.5
f1 = −38.88 f2 = 74.83 f3 = 60.55 D1 = 47.65
D1/f = 2.00 f2/f3 = 1.24 | f1 |/f = 1.63

| m | r i | d i | n i | v i | |
|---|---|---|---|---|---|
| 1 | 142.84549 | 8.90 | 1.69980 | 55.5 | |
| 2 | 2664.39249 | 0.10 | | | |
| 3 | 142.87467 | 3.00 | 1.61686 | 37.0 | |
| 4 | 30.66992 | 7.58 | | | |
| 5 | 92.27039 | 3.00 | 1.64129 | 55.5 | |
| 6 | 29.69118 | 47.65 | | | |
| 7 | 555.51124 | 21.91 | 1.81264 | 25.5 | |
| 8 | −67.07983 | 44.63 | | | AST |
| 9 | −100.21012 | 2.57 | 1.81264 | 25.5 | |
| 10 | 42.13455 | 13.71 | 1.73234 | 54.7 | |
| 11 | −63.35782 | 0.10 | | | |
| 12 | 410.78378 | 4.96 | 1.69980 | 55.5 | |
| 13 | −132.22409 | 0.10 | | | |
| 14 | 118.11951 | 7.84 | 1.69980 | 55.5 | |
| 15 | INF | 5.00 | | | |
| 16 | INF | 51.00 | 1.51872 | 64.2 | |
| 17 | INF | | | | |

<First Invention, Embodiment 5>

FIG. 11 shows an embodiment 5. Numerical data of this embodiment are shown in TABLE-5. FIG. 12 shows an example in which the mirror M inclined at 45° is inserted in the same construction as in FIG. 11 and the light beam is caused to pass the lens system. In FIG. 12, the distance between a center (C1) of the last surface of the first lens group G1 and a center (C2) of the mirror M is set at 37.00 mm. The diaphragm AST is arranged behind the small conjugate side surface of lens element L4 constituting the second lens group G2 away therefrom by 1 mm (the ninth surface in TABLE-5). It can be seen from FIG. 12 that a sufficient air interval is attained to insert the mirror M between the first lens group G1 and the second lens group G2. There was obtained the peripheral luminance ratio of 81% at a maximum half-angle of view (43.30°) because of effects of the off-axis pupil aberration. Generally, the peripheral luminance ratio of 30% is required in the projection-type display apparatus. The above value is sufficiently high compared to this value. Further, the oblique angle of the chief ray was 0.6° or smaller. It can be also seen from FIG. 12 that the oblique angle of the off-axis beam with respect to the optical axis becomes smaller than the outgoing beam does on the screen side (on the large conjugate side) in an interior of the lens system. Accordingly, the mirror M is allowed to have a smaller size than a case where it is arranged outside the projection lens (on the screen side).

TABLE 5

(EMBODIMENT 5)
f = 24.00 θ= 43.30° F = 4.5 β = 23.5
f1 = −42.27 f2 = 73.40 f3 = 58.09 D1 = 55.45
D1/f = 2.31 f2/f3 = 1.26 | f1 |/f = 1.76

| m | r i | d i | n i | v i | |
|---|---|---|---|---|---|
| 1 | 134.00000 | 12.00 | 1.69980 | 55.5 | |
| 2 | 852.40000 | 0.20 | | | |
| 3 | 130.40000 | 3.00 | 1.61686 | 37.0 | |
| 4 | 33.75800 | 11.25 | | | |
| 5 | 122.00000 | 3.00 | 1.64129 | 55.5 | |
| 6 | 32.15000 | 55.45 | | | |
| 7 | 148.00000 | 10.00 | 1.81264 | 25.5 | |
| 8 | −96.89200 | 1.00 | | | |
| 9 | INF | 35.85 | | | AST |
| 10 | −73.90000 | 3.00 | 1.81264 | 25.5 | |
| 11 | 39.40000 | 18.00 | 1.73234 | 54.7 | |
| 12 | −62.25000 | 0.20 | | | |
| 13 | 297.80000 | 6.05 | 1.69980 | 55.5 | |
| 14 | −165.07000 | 0.20 | | | |
| 15 | 87.20200 | 7.60 | 1.69980 | 55.5 | |
| 16 | INF | 5.00 | | | |
| 17 | INF | 51.00 | 1.51872 | 64.2 | |
| 18 | INF | | | | |

<First Invention, Embodiment 6>

FIG. 13 shows an embodiment 6. Numerical data of this embodiment are shown in TABLE-6. FIG. 14 shows an example in which the mirror M inclined at 45° is inserted in the same construction as in FIG. 13 and the light beam is caused to pass the lens system. In FIG. 14, the distance between the center (C1) of the last surface of the first lens group G1 and the center (C2) of the mirror M is set at 37.00 mm. The diaphragm AST is arranged behind the small conjugate side surface of lens element L4 constituting the second lens group G2 away therefrom by 1 mm (the ninth surface in TABLE-6). It can be seen from FIG. 14 that a sufficient air interval is provided to insert the mirror M between the first lens group G1 and the second lens group G2.

TABLE 6

(EMBODIMENT 6)
f = 24.00 θ = 43.15° F = 4.5 β = 23.5
f1 = −42.38 f2 = 73.60 f3 = 58.04 D1 = 55.49
D1/f = 2.31 f2/f3 = 1.27 | f1 |/f = 1.77

| m | r i | d i | n i | v i | |
|---|---|---|---|---|---|
| 1 | 133.71183 | 12.00 | 1.69980 | 55.5 | |
| 2 | 897.73287 | 0.20 | | | |
| 3 | 131.74787 | 3.00 | 1.61686 | 37.0 | |
| 4 | 33.61126 | 11.25 | | | |
| 5 | 121.13110 | 3.00 | 1.64129 | 55.5 | |
| 6 | 32.31767 | 55.49 | | | |
| 7 | 148.79356 | 10.00 | 1.81264 | 25.5 | |
| 8 | −96.99648 | 1.00 | | | |
| 9 | INF | 35.81 | | | AST |
| 10 | −73.31168 | 3.03 | 1.81264 | 25.5 | |
| 11 | 39.37385 | 18.00 | 1.73234 | 54.7 | |
| 12 | −61.28330 | 0.20 | | | |
| 13 | 297.62443 | 6.07 | 1.69980 | 55.5 | |
| 14 | −170.03076 | 0.20 | | | |
| 15 | 87.18402 | 7.64 | 1.69980 | 55.5 | |
| 16 | INF | 5.00 | | | |
| 17 | INF | 51.00 | 1.51872 | 64.2 | |
| 18 | INF | | | | |

<First Invention, Embodiment 7>

FIG. 15 shows an embodiment 7. Numerical data of this embodiment are shown in TABLE-7. In this embodiment, the spacing d6 (=D1) between the first lens group G1 and the second lens group G2 is set at 50.44 mm, thereby providing the air interval smaller than the one in the embodiment 5 by 5.01 mm. FIG. 16 shows an example in which the mirror M inclined at 45° is inserted in the same construction as in FIG. 15 and the light beam is caused to pass the lens system. In FIG. 16, the distance between the center (C1) of the last surface of the first lens group G1 and the center (C2) of the mirror M is set at 32.0 mm. The diaphragm AST is arranged in close contact with the small conjugate side surface of lens element L4 constituting the second lens group G2 (the ninth surface in TABLE-7). It can be seen from FIG. 16 that the mirror M can be inserted easily between the first lens group G1 and the second lens group G2.

TABLE 7

(EMBODIMENT 7)
$f = 24.00$  $\theta = 43.28°$  $F = 4.5$  $\beta = 23.5$
$f1 = -38.93$  $f2 = 71.91$  $f3 = 61.38$  $D1 = 50.44$
$D1/f = 2.10$  $f2/f3 = 1.17$  $|f1|/f = 1.62$

| m | ri | di | ni | vi | |
|---|---|---|---|---|---|
| 1 | 136.53513 | 12.00 | 1.69980 | 55.5 | |
| 2 | 980.12571 | 0.09 | | | |
| 3 | 129.33447 | 3.00 | 1.61686 | 37.0 | |
| 4 | 31.19552 | 9.79 | | | |
| 5 | 94.73813 | 3.00 | 1.64129 | 55.5 | |
| 6 | 29.10866 | 50.44 | | | |
| 7 | 671.82960 | 16.86 | 1.81264 | 25.5 | |
| 8 | −63.28762 | 0.00 | | | |
| 9 | INF | 41.47 | | | AST |
| 10 | −100.80370 | 3.03 | 1.81264 | 25.5 | |
| 11 | 40.30690 | 18.00 | 1.73234 | 54.7 | |
| 12 | −63.45385 | 0.10 | | | |
| 13 | 705.07045 | 6.07 | 1.69980 | 55.5 | |
| 14 | −133.81413 | 0.10 | | | |
| 15 | 117.24205 | 7.64 | 1.69980 | 55.5 | |
| 16 | INF | 5.00 | | | |
| 17 | INF | 51.00 | 1.51872 | 64.2 | |
| 18 | INF | | | | |

<First Invention, Embodiment 8>

FIG. 17 shows an embodiment 8. Numerical data of this embodiment are shown in TABLE-8. In this embodiment, the spacing d6 (=D1) between the first lens group G1 and the second lens group G2 is set at 45.13 mm, thereby providing the air interval smaller than the one in the embodiment 5 by 10.32 mm. FIG. 18 shows an example in which the mirror M inclined at 45° is inserted in the same construction as in FIG. 17 and the light beam is caused to pass the lens system. In FIG. 18, the distance between the center (C1) of the last surface of the first lens group G1 and the center (C2) of the mirror M is set at 28.0 mm. The diaphragm AST is arranged in close contact with the small conjugate side surface of lens element L4 constituting the second lens group G2 (the ninth surface in TABLE-8). It can be seen from FIG. 18 that the mirror M can be mounted between the first lens group G1 and the second lens group G2 in a compact manner.

TABLE 8

(EMBODIMENT 8)
$f = 24.00$  $\theta = 43.29°$  $F = 4.5$  $\beta = 23.5$
$f1 = -39.98$  $f2 = 72.76$  $f3 = 61.57$  $d1 = 45.13$
$D1/f = 1.88$  $f2/f3 = 1.18$  $|f1|/f = 1.62$

| m | ri | di | ni | vi | |
|---|---|---|---|---|---|
| 1 | 135.58642 | 12.00 | 1.69980 | 55.5 | |
| 2 | 874.87963 | 0.09 | | | |
| 3 | 126.83461 | 2.84 | 1.61686 | 37.0 | |
| 4 | 30.51499 | 10.38 | | | |

TABLE 8-continued (EMBODIMENT 8)
$f = 24.00$  $\theta = 43.29°$  $F = 4.5$  $\beta = 23.5$
$f1 = -39.98$  $f2 = 72.76$  $f3 = 61.57$  $d1 = 45.13$
$D1/f = 1.88$  $f2/f3 = 1.18$  $|f1|/f = 1.62$

| m | ri | di | ni | vi | |
|---|---|---|---|---|---|
| 5 | 98.05461 | 2.84 | 1.64129 | 55.5 | |
| 6 | 30.15873 | 45.13 | | | |
| 7 | 723.13709 | 27.18 | 1.81264 | 25.5 | |
| 8 | −63.30892 | 0.00 | | | |
| 9 | INF | 41.97 | | | AST |
| 10 | −109.36421 | 3.03 | 1.81264 | 25.5 | |
| 11 | 40.89621 | 18.00 | 1.73234 | 54.7 | |
| 12 | −66.03057 | 0.10 | | | |
| 13 | 569.43909 | 6.07 | 1.69980 | 55.5 | |
| 14 | −131.03458 | 0.10 | | | |
| 15 | 124.74636 | 7.64 | 1.69980 | 55.5 | |
| 16 | INF | 5.00 | | | |
| 17 | INF | 51.00 | 1.51872 | 64.2 | |
| 18 | INF | | | | |

<First Invention, Embodiment 9>

FIG. 19 shows an embodiment 9. Numerical data of this embodiment are shown in TABLE-9. FIG. 20 shows an example in which the mirror M inclined at 45° is inserted in the same construction as in FIG. 19 and the light beam is caused to pass the lens system. In FIG. 20, the distance between a center (C1) of the last surface of the first lens group G1 and a center (C2) of the mirror M is set at 60.0 mm. The diaphragm AST is arranged behind the small conjugate side surface of lens element L4 constituting the second lens group G2 away therefrom by 3.3 mm (the ninth surface in TABLE-9). It can be seen from FIG. 20 that a sufficient air interval is attained to insert the mirror M between the first lens group G1 and the second lens group G2. The oblique angle of the chief ray was 1° or smaller, thus a satisfactory telecentric characteristic can be obtained. It can be also seen from FIG. 20 that the oblique angle of the off-axis beam with respect to the optical axis becomes smaller than the outgoing beam does on the screen side (on the large conjugate side) in an interior of the lens system. Accordingly, the mirror M is allowed to have a smaller size than a case where it is arranged outside the projection lens (on the screen side). There is obtained the peripheral illuminance ratio of 55% at a maximum projection half-angle because of effects of the off-axis pupil aberration. Generally, the peripheral luminance ratio of 30% is required in the projection-type display apparatus. The above value is sufficiently satisfactory compared to this value. Further, the aspherical lens element L8 has a weak power at the center thereof and a strong negative power at a peripheral portion thereof, thereby being capable of correcting the negative distortion at the peripheral portion when viewed on the side of the liquid crystal panel 3 and the higher-order astigmatism in a well-balanced manner.

In a construction including embodiments 10 to 20, and 25 wherein the aspherical lens is included as the last lens element L8 of the third lens group G3, it is preferable that a ratio of the focal length f4 of the lens element L8 to the focal length f of the total lens system satisfies a relationship defined by the following equation (6):

$$|f4|/f > 10 \qquad (6).$$

If the ratio is in excess of the lower limit value of the equation (6), an on-axis refracting power of the a spherical lens element L8 becomes too strong. Thus, if the lens element L8 is formed of plastic material, a problem of defocusing of the projected image cannot be ignored which is caused by a change of the environment such as the temperature and the humidity.

TABLE 9

(EMBODIMENT 9)

$f = 41.02\ \theta = 43.35°\ F. = 4.5\ \beta = 14.5$
$f1 = -83.85\ f2 = 118.52\ f3 = 88.30\ D1 = 95.00$
$D1/f = 2.32\ f2/f3 = 1.34\ |f1|/f2 = 2.04$
$f4 = -1718.07\ |f4|/f = 41.88$

| m | ri | di | ni | vi | |
|---|---|---|---|---|---|
| 1 | 209.28882 | 18.00 | 1.69680 | 55.5 | |
| 2 | 740.90423 | 0.20 | | | |
| 3 | 190.31778 | 5.00 | 1.61293 | 37.0 | |
| 4 | 59.32194 | 21.02 | | | |
| 5 | 338.42940 | 4.00 | 1.63854 | 55.4 | |
| 6 | 69.63940 | 95.00 | | | |
| 7 | 320.89460 | 14.00 | 1.69894 | 30.1 | |
| 8 | −110.81612 | 3.30 | | | |
| 9 | INF | 55.46 | | | AST |
| 10 | −60.17964 | 10.33 | 1.84666 | 23.8 | |
| 11 | 162.62940 | 26.00 | 1.69680 | 55.5 | |
| 12 | −59.95669 | 0.20 | | | |
| 13 | 126.56120 | 23.00 | 1.62299 | 58.1 | |
| 14 | −141.09431 | 0.20 | | | |
| 15 | −515.53888 | 3.00 | 1.49154 | 57.8 | * |
| 16 | −1317.55068 | 20.00 | | | * |
| 17 | INF | 71.00 | 1.51680 | 64.2 | |
| 18 | INF | | | | |

| <Polynominal Deformation Terms> | | | |
|---|---|---|---|
| m | K | A4 | A6 |
| 15 | 101.211102 | 0.253221E-7 | 0.666013E-10 |
| 16 | −2000.000000 | 0.389066E-6 | 0.45766E-10 |

| <Polynominal Deformation Terms> | | |
|---|---|---|
| m | A8 | A10 |
| 15 | 0.925652E-14 | 0.720830E-17 |
| 16 | 0.361257E-13 | 0.444744E-17 |

<First Invention, Embodiments 10 to 12>

Numerical data of embodiments 10 to 12 are shown in TABLES-10 to 12. Sectional views showing lens systems of the respective embodiments are substantially similar to FIG. 19 showing the embodiment 9. In these embodiments, the air interval about the same as the one in the embodiment 9 is attained between the first lens group G1 and the second lens group G2, and accordingly there is no problem in inserting the mirror M.

TABLE 10

(EMBODIMENT 10)

$f = 41.01\ \theta = 43.25°\ F = 4.5\ \beta = 14.5$
$f1 = -78.55\ f2 = 116.78\ f3 = 92.35\ D1 = 95.00$
$D1/f = 2.32\ f2/f3 = 1.26\ |f1|/f = 1.92$
$f4 = -1846.54\ |f4|/f = 45.03$

| m | ri | di | ni | vi | |
|---|---|---|---|---|---|
| 1 | 214.09482 | 18.00 | 1.69680 | 55.5 | |
| 2 | 910.92980 | 0.10 | | | |
| 3 | 193.62553 | 5.00 | 1.61293 | 37.0 | |
| 4 | 56.62424 | 21.52 | | | |
| 5 | 358.74711 | 4.00 | 1.63854 | 55.4 | |
| 6 | 68.54356 | 95.00 | | | |
| 7 | 275.62302 | 14.00 | 1.69894 | 30.1 | |
| 8 | −114.80012 | 3.31 | | | |
| 9 | INF | 60.70 | | | AST |

TABLE 10-continued (EMBODIMENT 10)

| m | ri | di | ni | vi | |
|---|---|---|---|---|---|
| 10 | −56.84164 | 4.34 | 1.84666 | 23.8 | |
| 11 | 191.34903 | 26.00 | 1.69680 | 55.5 | |
| 12 | −57.44741 | 0.10 | | | |
| 13 | 122.68404 | 23.00 | 1.62299 | 58.1 | |
| 14 | −141.10233 | 0.10 | | | |
| 15 | −509.36767 | 3.00 | 1.49154 | 57.8 | * |
| 16 | −1156.99893 | 20.00 | | | * |
| 17 | INF | 71.00 | 1.51680 | 64.2 | |
| 18 | INF | | | | |

| <Polynominal Deformation Terms> | | | |
|---|---|---|---|
| m | K | A4 | A6 |
| 15 | 102.52516 | 0.343121E-7 | 0.765024E-10 |
| 16 | −2000.000000 | 0.405307E-6 | 0.541539E-10 |

| <Polynominal Deformation Terms> | | |
|---|---|---|
| m | A8 | A10 |
| 15 | 0.105031E-13 | 0.924494E-17 |
| 16 | 0.534341E-13 | 0.534341E-17 |

TABLE 11

(EMBODIMENT 11)

$f = 41.02\ \theta = 43.31°\ F. = 4.5\ \beta = 14.5$
$f1 = -80.97\ f2 = 117.92\ f3 = 90.62\ D1 = 95.00$
$D1/f = 2.32\ f2/f3 = 1.30\ |f1|/f = 1.97$
$f4 = -1836.13\ |f4|/f = 44.76$

| m | ri | di | ni | vi | |
|---|---|---|---|---|---|
| 1 | 207.13526 | 18.00 | 1.69680 | 55.5 | |
| 2 | 758.25591 | 0.10 | | | |
| 3 | 185.17029 | 5.00 | 1.61293 | 37.0 | |
| 4 | 58.14060 | 22.16 | | | |
| 5 | 469.20601 | 4.00 | 1..62854 | 55.4 | |
| 6 | 71.34215 | 95.00 | | | |
| 7 | 278.16884 | 14.00 | 1.69894 | 30.1 | |
| 8 | −115.96523 | 3.31 | | | |
| 9 | INF | 58.35 | | | AST |
| 10 | 57.07889 | 5.68 | 1.84666 | 23.8 | |
| 11 | 186.26313 | 26.16 | 1.69680 | 55.5 | |
| 12 | −57.43884 | 0.10 | | | |
| 13 | 123.85803 | 23.00 | 1.62299 | 58.1 | |
| 14 | −141.04934 | 0.10 | | | |
| 15 | −508.72473 | 3.00 | 1.49154 | 57.8 | * |
| 16 | −1162.01899 | 20.00 | | | * |
| 17 | INF | 71.00 | 1.51680 | 64.2 | |
| 18 | INF | | | | |

| <Polynominal Deformation Terms> | | | |
|---|---|---|---|
| m | K | A4 | A6 |
| 15 | 102.60548 | 0.326666E-7 | 0.760660E-10 |
| 16 | −2000.000000 | 0.408050E-6 | 0.535449E-10 |

| <Polynominal Deformation Terms> | | |
|---|---|---|
| m | A8 | A10 |
| 15 | 0.105266E-13 | 0.918507E-17 |
| 16 | 0.445331E-13 | 0.517802E-17 |

TABLE 12

(EMBODIMENT 12)

f = 41.01  θ= 43.25°  F. = 4.5  β = 14.5
f1 = −77.81  f2 = 116.41  f3 = 92.57  D1 = 95.00
D1/f = 2.32  f2/f3 = 1.26  lf1l/f = 1.90
f4 = −1987.38  lf4l/f = 48.46

| m | ri | di | ni | νi | |
|---|---|---|---|---|---|
| 1 | 218.48840 | 17.00 | 1.69680 | 55.5 | |
| 2 | 1028.03053 | 0.10 | | | |
| 3 | 196.04580 | 5.00 | 1.61293 | 37.0 | |
| 4 | 57.99843 | 21.50 | | | |
| 5 | 425.30204 | 4.00 | 1.63854 | 55.4 | |
| 6 | 68.23706 | 95.00 | | | |
| 7 | 240.48781 | 14.00 | 1.69894 | 30.1 | |
| 8 | −121.43348 | 3.31 | | | |
| 9 | INF | 60.91 | | | AST |
| 10 | −56.74421 | 3.91 | 1.84666 | 23.8 | |
| 11 | 192.38945 | 26.00 | 1.69680 | 55.5 | |
| 12 | −57.85630 | 0.10 | | | |
| 13 | 120.39684 | 23.00 | 1.62299 | 58.1 | |
| 14 | −141.16501 | 0.10 | | | |
| 15 | −510.31629 | 3.00 | 1.49154 | 57.8 | * |
| 16 | −1065.78653 | 20.00 | | | * |
| 17 | INF | 71.00 | 1.51680 | 64.2 | |
| 18 | INF | | | | |

<Polynominal Deformation Terms>

| m | K | A4 | A6 |
|---|---|---|---|
| 15 | 102.380758 | 0.34951E-7 | 0.760766E-10 |
| 16 | −2000.000000 | 0.403383E-6 | 0.559040E-10 |

<Polynominal Deformation Terms>

| m | A8 | A10 |
|---|---|---|
| 15 | 0.102687E-14 | 0.926386E-17 |
| 16 | 0.461159E-13 | 0.554591E-17 |

<First Invention, Embodiment 13>

FIG. 21 is a sectional view showing a lens system of an embodiment 13. Numerical data of this embodiment are shown in TABLE-13. In this embodiment as well, the air interval about the same as the one in the embodiment 9 is attained between the first lens group G1 and the second lens group G2, thereby allowing the mirror M to be inserted. Further, in this embodiment, the aberration is corrected in a state where a PMMA resin plate L9 having the thickness of 70 mm and a glass plate L10 (BSC7: manufactured by HOYA Kabushiki Kaisha) having the thickness of 1 mm are inserted as a parallel plane plate arranged after the third lens group G3. This supposes that the dichroic prism for color composition is formed of the PMMA resin to be described later in relation to the fourth invention. Further, the glass plate having the thickness of 1 mm supposes a glass substrate for enclosing the liquid crystal in the liquid crystal panel.

The retro-focus type lens according to the invention is capable of correcting the aberrations satisfactorily even if the dichroic prism is formed of plastic material as in this embodiment, and contributes to realization of low cost and light weighted projection-type display apparatuses. Since the parallel plane plate L9 equivalent to the dichroic prism has no refracting power, a change in the refractive index of the plastic material due to the change in the environment such as the temperature and the humidity does not give a large influence on the defocusing of the projected image. Besides PMMA, as plastic material can be used, for example, PC, ZEONEX (manufactured by Nippon Zeon Kabushiki Kaisha), OZ1000 (manufactured by Hitachi Kasei Kogyo Kabushiki Kaisha), ARTON (manufactured by Nippon Gohsei Gomu Kabushiki Kaisha), and APO (Mitsui Sekiyu Kagaku Kogyo Kabushiki Kaisha). Although the thickness of the plastic parallel plane plate L9 is set at 70 mm in this embodiment, it is adjustable according to the screen size of the liquid crystal panel 3 as will be clear from FIGS. 1 and 2 showing the conventional projection-type display apparatuses. Accordingly, even if the thickness of the parallel plane plate L9 is set at 70 mm or smaller (e.g., about 15 to 70 mm), the aberration correction can be carried out sufficiently by the construction similar to the lens system of this embodiment. Further, even if the thickness of the parallel plane plate L9 is in excess of 70 mm, the aberrations can be corrected in a similar manner so long as there is no problem in arranging the liquid crystal panel 3. In other words, even if the parallel plane plate is formed of plastic material in 90% of its entire thickness, the retro-focus type lens according to the invention is capable of correcting the aberrations sufficiently.

TABLE 13

(EMBODIMENT 13)

f = 41.00  θ= 43.34°  F. = 4.5  β = 14.5
f1 = −84.12  f2 = 119.57  f3 = 88.29  D1 = 95.00
D1/f = 2.32  f2/f3 = 1.35  lf1l/f2 = 2.05
f4 = −1703.02  lf4l/f = 41.54

| m | ri | di | ni | νi | |
|---|---|---|---|---|---|
| 1 | 208.10985 | 18.00 | 1.69680 | 55.5 | |
| 2 | 760.71289 | 0.20 | | | |
| 3 | 193.50540 | 5.00 | 1.61293 | 37.0 | |
| 4 | 59.27085 | 21.03 | | | |
| 5 | 342.67312 | 4.00 | 1.63854 | 55.4 | |
| 6 | 70.22761 | 95.00 | | | |
| 7 | 334.13001 | 14.00 | 1.69894 | 30.1 | |
| 8 | −110.66841 | 3.30 | | | |
| 9 | INF | 54.88 | | | AST |
| 10 | −61.04168 | 11.64 | 1.84666 | 23.8 | |
| 11 | 158.38334 | 26.00 | 1.69680 | 55.5 | |
| 12 | −60.48160 | 0.20 | | | |
| 13 | 128.04196 | 23.00 | 1.62299 | 58.1 | |
| 14 | −141.07358 | 0.20 | | | |
| 15 | −517.11596 | 3.00 | 1.49154 | 57.8 | * |
| 16 | −1346.4762 | 20.00 | | | * |
| 17 | INF | 70.00 | 1.49154 | 57.8 | |
| 18 | INF | 1.00 | 1.51680 | 64.2 | |
| 19 | INF | | | | |

<Polynominal Deformation Terms>

| m | K | A4 | A6 |
|---|---|---|---|
| 15 | 100.776415 | 0.283045E-7 | 0.646495E-10 |
| 16 | −2000.000000 | 0.380230E-6 | 0.447362E-10 |

<Polynominal Deformation Terms>

| m | A8 | A10 |
|---|---|---|
| 15 | 0.912131E-14 | 0.686409E-17 |
| 16 | 0.344526E-13 | 0.432562E-17 |

<First Invention, Embodiments 14 to 20>

Numerical data of embodiments 14 to 20 are shown in TABLES-14 to 20. The lens systems of these embodiments are unillustrated since sectional views showing the same are analogous to FIG. 19 showing the embodiment 9. In these embodiments as well, the air interval about the same as the one in the embodiment 9 is attained between the first lens group G1 and the second lens group G2, thereby creating no problem in inserting the mirror M.

TABLE 14

(EMBODIMENT 14)

f = 41.02  θ= 43.41° F. = 4.5  β = 14.5
f1 = −80.79  f2 = 131.75  f3 = 90.42  D1 = 93.00
D1/f = 2.27  f2/f3 = 1.46  |f1|/f = 1.97
f4 = −813.27  |f4|/f = 19.83

| m | ri | di | ni | vi | |
|---|---|---|---|---|---|
| 1 | 247.63993 | 17.00 | 1.69680 | 55.5 | |
| 2 | 869.53816 | 0.10 | | | |
| 3 | 180.49687 | 5.00 | 1.61293 | 37.0 | |
| 4 | 59.15650 | 21.82 | | | |
| 5 | 394.02309 | 4.00 | 1.63854 | 55.4 | |
| 6 | 71.68554 | 93.00 | | | |
| 7 | 779.91992 | 14.00 | 1.80518 | 25.5 | |
| 8 | −123.10690 | 11.71 | | | |
| 9 | INF | 62.12 | | | AST |
| 10 | −61.94791 | 2.80 | 1.80518 | 25.5 | |
| 11 | 132.49952 | 25.50 | 1.71300 | 53.9 | |
| 12 | −60.68283 | 0.10 | | | |
| 13 | 128.02330 | 24.23 | 1.67790 | 55.5 | |
| 14 | −144.33425 | 0.12 | | | |
| 15 | −545.16245 | 3.58 | 1.49154 | 57.8 | * |
| 16 | −1525.448159 | 20.00 | | | * |
| 17 | INF | 71.00 | 1.51680 | 64.2 | |
| 18 | INF | | | | |

| <Polynominal Deformation Terms> | | | |
|---|---|---|---|
| m | K | A4 | A6 |
| 15 | 102.000000 | −0.135920E-6 | 0.544483E-10 |
| 16 | −2000.000000 | 0.395527E-6 | 0.129353E-10 |

| | <Polynominal Deformation Terms> | |
|---|---|---|
| m | A8 | A10 |
| 15 | 0.511768E-14 | 0.424992E-17 |
| 16 | 0.257261E-13 | 0.592184E-17 |

TABLE 15

(EMBODIMENT 15)

f = 41.00  θ= 43.46° F = 4.5  β= 14.5
f1 = −85.37  f2 = 139.19  f3 = 88.93  D1 = 95.00
D1/f = 2.32  f2/f3 = 1.57  |f1|/f = 2.08
f4 = −1997.50  |f4|/f = 48.72

| m | ri | di | ni | vi | |
|---|---|---|---|---|---|
| 1 | 223.60991 | 18.00 | 1.69680 | 55.5 | |
| 2 | 815.85357 | 0.20 | | | |
| 3 | 218.87795 | 5.00 | 1.61293 | 37.0 | |
| 4 | 60.82318 | 21.82 | | | |
| 5 | 427.20443 | 4.00 | 1.63854 | 55.4 | |
| 6 | 78.31506 | 95.00 | | | |
| 7 | 1842.49361 | 14.00 | 1.80518 | 25.5 | |
| 8 | −120.09981 | 12.00 | | | |
| 9 | INF | 62.60 | | | AST |
| 10 | −74.15737 | 3.00 | 1.80518 | 25.5 | |
| 11 | 112.57176 | 26.00 | 1.71300 | 53.9 | |
| 12 | −63.64452 | 0.20 | | | |
| 13 | 173.92879 | 23.00 | 1.67790 | 55.5 | |
| 14 | −137.91210 | 0.20 | | | |
| 15 | −519.52669 | 3.00 | 1.49154 | 57.8 | * |
| 16 | −1100.36498 | 20.00 | | | * |
| 17 | INF | 71.00 | 1.51680 | 64.2 | |
| 18 | INF | | | | |

| <Polynominal Deformation Terms> | | | |
|---|---|---|---|
| m | K | A4 | A6 |
| 15 | 90.479412 | 0.943206E-8 | 0.289802E-10 |
| 16 | −2000.000000 | 0.246380E-6 | 0.380317E-10 |

| | <Polynominal Deformation Terms> | |
|---|---|---|
| m | A8 | A10 |
| 15 | 0.547844E-14 | 0.566579E-17 |
| 16 | 0.206938E-13 | 0.367889E-17 |

TABLE 16

(EMBODIMENT 16)

f = 41.00  θ= 43.35° F = 4.5  β = 14.5
f1 = −84.86  f2 = 135.66  f3 = 87.65  D1 = 95.00
D1/f = 2.32  f2/f3 = 1.55  |f1|/f = 2.07
f4 = −1662.67  |f4|/f = 40.55

| m | ri | di | ni | vi | |
|---|---|---|---|---|---|
| 1 | 257.41023 | 12.84 | 1.69680 | 55.5 | |
| 2 | 1130.80334 | 0.10 | | | |
| 3 | 179.27669 | 2.80 | 1.61293 | 37.0 | |
| 4 | 61.14283 | 20.93 | | | |
| 5 | 318.65098 | 2.80 | 1.63854 | 55.4 | |
| 6 | 70.92954 | 95.00 | | | |
| 7 | 615.02360 | 8.00 | 1.80518 | 25.5 | |
| 8 | −133.53002 | 14.15 | | | |
| 9 | INF | 61.07 | | | AST |
| 10 | 60.41649 | 2.80 | 1.80518 | 25.5 | |
| 11 | 149.20663 | 22.88 | 1.71300 | 53.9 | |
| 12 | −58.65602 | 0.10 | | | |
| 13 | 128.37404 | 19.03 | 1.67790 | 55.5 | |
| 14 | −152.80432 | 0.10 | | | |
| 15 | −722.06424 | 3.00 | 1.49154 | 57.8 | * |
| 16 | −6019.57696 | 20.00 | | | * |
| 17 | INF | 71.00 | 1.51680 | 64.2 | |
| 18 | INF | | | | |

| <Polynominal Deformation Terms> | | | |
|---|---|---|---|
| m | K | A4 | A6 |
| 15 | 199.700459 | 0.963286E-7 | 0.470225E-10 |
| 16 | −1000.000000 | 0.333081E-6 | 0.343574E-10 |

| | <Polynominal Deformation Terms> | |
|---|---|---|
| m | A8 | A10 |
| 15 | 0.668325E-14 | 0.736259E-17 |
| 16 | 0.293414E-13 | 0.449826E-17 |

TABLE 17

(EMBODIMENT 17)

f = 41.00  θ= 43.30° F. = 4.5  β = 14.5
f1 = −81.76  f2 = 129.91  f3 = 89.73  D1 = 93.00
D1/f = 2.27  f2/f3 = 1.45  |f1|/f = 1.99
f4 = −829.17  |f4|/f = 20.22

| m | ri | di | ni | vi |
|---|---|---|---|---|
| 1 | 241.86167 | 17.00 | 1.69680 | 55.5 |
| 2 | 1042.70429 | 0.20 | | |
| 3 | 197.11785 | 5.00 | 1.61293 | 37.0 |
| 4 | 60.44744 | 21.03 | | |
| 5 | 352.58126 | 4.00 | 1.63854 | 55.4 |
| 6 | 69.85648 | 93.00 | | |
| 7 | 637.35510 | 14.00 | 1.80518 | 25.5 |
| 8 | −125.28619 | 11.45 | | |

TABLE 17-continued (EMBODIMENT 17)

| m | ri | di | ni | vi | |
|---|---|---|---|---|---|
| 9 | INF | 59.18 | | | AST |
| 10 | −60.25897 | 3.00 | 1.80518 | 25.5 | |
| 11 | 132.82538 | 25.50 | 1.71300 | 53.9 | |
| 12 | −58.94358 | 0.20 | | | |
| 13 | 120.98851 | 22.00 | 1.65020 | 55.7 | |
| 14 | −145.87655 | 0.20 | | | |
| 15 | −713.93564 | 3.00 | 1.52540 | 56.3 | * |
| 16 | −1131.46191 | 20.00 | | | * |
| 17 | INF | 71.00 | 1.51680 | 64.2 | |
| 18 | INF | | | | |

<Polynominal Deformation Terms>

| m | K | A4 | A6 |
|---|---|---|---|
| 15 | 200.952916 | −0.106096E-6 | 0.589142E-10 |
| 16 | 404.800069 | 0.374221E-6 | 0.190386E-10 |

<Polynominal Deformation Terms>

| m | A8 | A10 |
|---|---|---|
| 15 | 0.736031E-14 | 0.701461E-17 |
| 16 | 0.310185E-13 | 0.670009E-17 |

TABLE 18

(EMBODIMENT 18)

$f = 41.00$ $\theta = 43.33°$ $F. = 4.5$ $\beta = 14.5$
$f1 = -82.33$ $f2 = 131.31$ $f3 = 89.29$ $D1 = 93.00$
$D1/f = 2.27$ $f2/f3 = 1.47$ $|f1|/f2 = 2.01$
$f4 = -878.85$ $|f4|/f = 21.44$

| m | ri | di | ni | vi | |
|---|---|---|---|---|---|
| 1 | 246.28621 | 17.00 | 1.69680 | 55.5 | |
| 2 | 1088.41351 | 0.20 | | | |
| 3 | 206.70541 | 5.00 | 1.61293 | 37.0 | |
| 4 | 61.27672 | 20.63 | | | |
| 5 | 342.37105 | 4.00 | 1.63854 | 55.4 | |
| 6 | 69.56946 | 93.00 | | | |
| 7 | 718.53096 | 14.00 | 1.80518 | 25.5 | |
| 8 | −124.22263 | 12.71 | | | |
| 9 | INF | 58.98 | | | AST |
| 10 | −60.81688 | 3.00 | 1.80518 | 25.5 | |
| 11 | 134.68545 | 25.50 | 1.71300 | 53.9 | |
| 12 | −58.81675 | 0.20 | | | |
| 13 | 128.92691 | 22.00 | 1.67790 | 55.5 | |
| 14 | −152.22962 | 0.20 | | | |
| 15 | −717.64984 | 3.21 | 1.52540 | 56.3 | * |
| 16 | −1312.42964 | 20.00 | | | * |
| 17 | INF | 71.00 | 1.51680 | 64.2 | |
| 18 | INF | | | | |

<Polynominal Deformation Terms>

| m | K | A4 | A6 |
|---|---|---|---|
| 15 | 200.354009 | 0.110832E-6 | 0.536294E-10 |
| 16 | −321.788587 | 0.354296E-6 | 0.212024E-10 |

<Polynominal Deformation Terms>

| m | A8 | A10 |
|---|---|---|
| 15 | 0.656798E-14 | 0.677723E-17 |
| 16 | 0.291269E-13 | 0.566620E-17 |

TABLE 19

(EMBODIMENT 19)

$f = 41.00$ $\theta = 43.33°$ $F = 4.5$ $\beta = 14.5$
$f1 = -84.63$ $f2 = 134.96$ $f3 = 88.10$ $D1 = 95.00$
$D1/f = 2.32$ $f2/f3 = 1.53$ $|f1|/f = 2.06$
$f4 = -1507.90$ $|f4|/f = 36.78$

| m | ri | di | ni | vi | |
|---|---|---|---|---|---|
| 1 | 263.71173 | 13.18 | 1.69680 | 55.5 | |
| 2 | 1494.08116 | 0.10 | | | |
| 3 | 197.25859 | 2.80 | 1.61293 | 37.0 | |
| 4 | 62.39665 | 19.93 | | | |
| 5 | 300.34894 | 2.80 | 1.63854 | 55.4 | |
| 6 | 69.80455 | 95.00 | | | |
| 7 | 538.93483 | 10.26 | 1.80518 | 25.5 | |
| 8 | −136.51341 | 13.07 | | | |
| 9 | INF | 61.57 | | | AST |
| 10 | −60.56141 | 2.80 | 1.80518 | 25.5 | |
| 11 | 144.95228 | 22.89 | 1.71300 | 53.9 | |
| 12 | −58.72942 | 0.10 | | | |
| 13 | 128.05226 | 18.96 | 1.67790 | 55.5 | |
| 14 | −152.72486 | 0.10 | | | |
| 15 | −729.88175 | 3.00 | 1.52540 | 56.3 | * |
| 16 | −8848.89019 | 20.00 | | | * |
| 17 | INF | 71.00 | 1.51680 | 64.2 | |
| 18 | INF | | | | |

<Polynominal Deformation Terms>

| m | K | A4 | A6 |
|---|---|---|---|
| 15 | 198.348669 | 0.103625E-6 | 0.479375E-10 |
| 16 | −1000.000000 | 0.317395E-6 | 0.242825E-10 |

<Polynominal Deformation Terms>

| m | A8 | A10 |
|---|---|---|
| 15 | 0.565819E-14 | 0.660449E-17 |
| 16 | 0.277963E-13 | 0.471735E-17 |

TABLE 20

(EMBODIMENT 20)

$f = 41.00$ $\theta = 43.27°$ $F = 4.5$ $\beta = 14.5$
$f1 = -81.96$ $f2 = 127.70$ $f3 = 90.83$ $D1 = 97.00$
$D1/f = 2.37$ $f2/f3 = 1.41$ $|f1|/f = 2.00$
$f4 = -3297.50$ $|f4|/f = 80.43$

| m | ri | di | ni | vi | |
|---|---|---|---|---|---|
| 1 | 217.01481 | 13.73 | 1.69680 | 55.5 | |
| 2 | 823.26087 | 0.10 | | | |
| 3 | 155.37376 | 2.20 | 1.61293 | 37.0 | |
| 4 | 57.95555 | 21.52 | | | |
| 5 | 318.80893 | 2.20 | 1.63854 | 55.4 | |
| 6 | 65.59215 | 97.00 | | | |
| 7 | 635.45623 | 7.00 | 1.80518 | 25.5 | |
| 8 | −128.42112 | 5.29 | | | |
| 9 | INF | 65.49 | | | AST |
| 10 | −66.86998 | 2.20 | 1.80518 | 25.5 | |
| 11 | 113.84212 | 24.08 | 1.71300 | 53.9 | |
| 12 | −60.77909 | 0.10 | | | |
| 13 | 142.83715 | 16.21 | 1.69680 | 55.5 | |
| 14 | −180.08480 | 0.10 | | | |
| 15 | −1125.93847 | 2.20 | 1.52540 | 56.3 | * |
| 16 | −3193.16731 | 20.00 | | | * |
| 17 | INF | 71.00 | 1.51680 | 64.2 | |
| 18 | INF | | | | |

<Polynominal Deformation Terms>

| m | K | A4 | A6 |
|---|---|---|---|
| 15 | 205.302614 | 0.143209E-7 | 0.436306E-10 |

TABLE 20-continued (EMBODIMENT 20)

| 16 | −2243.146704 | 0.301114E-6 | 0.395417E-11 |

| | <Polynominal Deformation Terms> | |
|---|---|---|
| m | A8 | A10 |
| 15 | 0.352016E-14 | 0.459394E-17 |
| 16 | 0.212312E-13 | 0.505731E-17 |

<First Invention, Embodiment 21>

FIG. 22 is a sectional view of a lens system of an embodiment 21. Numerical data of the embodiment 21 are shown in TABLE-21. A sufficiently large air interval is attained between the first lens group G1 and the second lens group G2, thereby creating no problem in inserting the mirror M. In this embodiment, the first lens group G1 includes four lens elements, and the lens element L0 on the large conjugate side is a bi-aspherical lens having a weak refracting power on the optical axis and a strong positive refracting power at a peripheral portion thereof. The lens element L0 mainly corrects the off-axis distortion. The aspherical lens element L0 is preferably such that a ratio of the focal length f5 of the lens element L0 to the focal length f of the total lens system satisfies a relationship defined by the following equation (7) in this embodiment as well as an embodiment 22 to be described later:

$$|f5|/f>100 \qquad (7)$$

If the ratio is in excess of the lower limit value of the equation (7), the on-axis refracting power of the aspherical lens element L0 becomes too strong. Thus, when the lens element L0 is formed of plastic material, a problem of defocusing of the projected image cannot be ignored which is caused by a change of the environment such as the temperature and the humidity.

TABLE 21

(EMBODIMENT 21)

f = 41.00 θ= 42.55° F = 4.5 β = 14.5
f1 = −72.66 f2 = 135.07 f3 = 107.46 D1 = 104.43
D1/f = 2.55 f2/f3 = 1.26 |f1|/f = 1.77
f4 = −5.82E3 f5/f = 1.42

| m | ri | di | ni | vi | |
|---|---|---|---|---|---|
| 1 | 817.86370 | 23.95 | 1.49154 | 57.8 | * |
| 2 | 1132.05530 | 0.99 | | | * |
| 3 | 342.82557 | 17.00 | 1.69680 | 55.5 | |
| 4 | 3105.23658 | 0.22 | | | |
| 5 | 4134.01653 | 6.00 | 1.61293 | 37.0 | |
| 6 | 58.61559 | 16.88 | | | |
| 7 | 139.01296 | 5.00 | 1.63854 | 55.4 | |
| 8 | 65.35020 | 104.43 | | | |
| 9 | 339.98114 | 30.00 | 1.80518 | 25.5 | |
| 10 | −155.67589 | 8.11 | | | |
| 11 | INF | 64.91 | | | AST |
| 12 | 135.31259 | 19.58 | 1.80518 | 25.5 | |
| 13 | 77.61582 | 23.00 | 1.72916 | 54.7 | |
| 14 | −103.27451 | 0.20 | | | |
| 15 | 1141.72544 | 17.28 | 1.69680 | 55.5 | |
| 16 | −229.34545 | 0.20 | | | |
| 17 | 197.29088 | 24.94 | 1.69680 | 55.5 | |
| 18 | 17773.90764 | 20.00 | | | |
| 19 | INF | 71.00 | 1.51680 | 64.2 | |
| 20 | INF | | | | |

TABLE 21-continued (EMBODIMENT 21)

| | <Polynominal Deformation Terms> | | |
|---|---|---|---|
| m | K | A4 | A6 |
| 15 | 43.136111 | 0.108317E-6 | −0.282015E-11 |
| 16 | −6.226369 | 0.660407E-9 | −0.118567E-12 |

| | <Polynominal Deformation Terms> | |
|---|---|---|
| m | A8 | A10 |
| 15 | −0.240621E-16 | 0.374139E-20 |
| 16 | −0.386260E-17 | 0.156721E-20 |

<First Invention, Embodiment 22>

Numerical data of the embodiment 22 are shown in TABLE-22. A sectional view of a lens system of this embodiment is analogous to FIG. 22 showing the embodiment 21. In this embodiment as well, a sufficiently large air interval is attained between the first lens group G1 and the second lens group G2, thereby creating no problem in inserting the mirror M. Further in this embodiment, only the large conjugate side surface of the lens element L0 of the first lens group G1 is formed into an aspherical surface, thereby mainly correcting the off-axis distortion.

TABLE 22

(EMBODIMENT 22)

f = 41.00 θ= 42.79° F = 4.5 β = 14.5
f1 = −72.15 f2 = 133.23 f3 = 107.69 D1 = 104.66
D1/f = 2.55 f2/f3 = 1.24 |f1|/f = 1.76
f5 = 2.50E5 f5/f = 6.10E3

| m | ri | di | ni | vi | |
|---|---|---|---|---|---|
| 1 | 809.71244 | 16.07 | 1.49154 | 55.8 | * |
| 2 | 809.71734 | 0.99 | | | |
| 3 | 220.68091 | 17.06 | 1.69680 | 55.5 | |
| 4 | 965.56137 | 0.20 | | | |
| 5 | 1033.03613 | 5.08 | 1.61293 | 37.0 | |
| 6 | 59.85684 | 18.67 | | | |
| 7 | 162.76270 | 4.49 | 1.63854 | 55.4 | |
| 8 | 61.41639 | 104.66 | | | |
| 9 | 256.85666 | 30.00 | 1.80518 | 25.5 | |
| 10 | −177.35439 | 1.63 | | | |
| 11 | INF | 67.56 | | | AST |
| 12 | −123.58094 | 12.08 | 1.80518 | 25.5 | |
| 13 | 73.62199 | 22.25 | 1.72916 | 54.7 | |
| 14 | −99.09597 | 0.20 | | | |
| 15 | 858.68817 | 22.98 | 1.69680 | 55.5 | |
| 16 | −212.31665 | 0.20 | | | |
| 17 | 199.27482 | 21.65 | 1.69680 | 55.5 | |
| 18 | INF | 20.00 | | | |
| 19 | INF | 71.00 | 1.51680 | 64.2 | |
| 20 | INF | | | | |

| | <Polynominal Deformation Terms> | | |
|---|---|---|---|
| m | K | A4 | A6 |
| 1 | 46.036429 | 0.103407E-6 | −0.230100E-11 |

| | <Polynominal Deformation Terms> | |
|---|---|---|
| m | A8 | A10 |
| 1 | −0.388917E-16 | 0.130263E-20 |

<First Invention, Embodiment 23>

FIG. 23 is a sectional view of a lens system of an embodiment 23. Numerical data of this embodiment are shown in TABLE-23. In this embodiment, an air interval far greater than those in the embodiments 21, 22 is attained between the first lens group G1 and the second lens group G2, thus there is no problem in inserting the mirror M. Further, the lens element L3 of the first lens group G1 on the side of the liquid crystal panel 3 and the lens element L4 of the second lens group G2 are an aspherical lens each, thereby correcting the on-axis spherical aberration, off-axis distortion, and high-order astigmatism in a highly well-balanced manner. Since the lens elements L3, L4 having relatively small diameters are formed into the aspherical lens in this embodiment, it is easy to form the aspherical surface.

TABLE 23

(EMBODIMENT 23)

$f = 40.00$ $\theta = 42.16°$ $F = 4.5$ $\beta = 14.5$
$f1 = -69.13$ $f2 = 130.85$ $f3 = 113.66$ $D1 = 107.92$
$D1/f = 2.70$ $f2/f3 = 1.15$ $|f1|/f = 1.73$

| m | ri | di | ni | vi | |
|---|---|---|---|---|---|
| 1 | 180.68905 | 22.00 | 1.69680 | 55.5 | |
| 2 | 206.04152 | 0.20 | | | |
| 3 | 110.37469 | 5.00 | 1.61293 | 37.0 | |
| 4 | 53.37385 | 16.72 | | | |
| 5 | 104.95392 | 4.03 | 1.52540 | 56.3 | * |
| 6 | 36.18085 | 107.92 | | | * |
| 7 | 438.02979 | 35.00 | 1.49154 | 57.8 | * |
| 8 | -73.74918 | 1.00 | | | * |
| 9 | INF | 88.88 | | | AST |
| 10 | -259.71093 | 5.28 | 1.80518 | 25.5 | |
| 11 | 77.08544 | 21.50 | 1.72916 | 54.7 | |
| 12 | -130.52172 | 0.20 | | | |
| 13 | 966.10879 | 7.50 | 1.69680 | 55.5 | |
| 14 | -290.87101 | 0.20 | | | |
| 15 | 192.38328 | 8.00 | 1.69680 | 55.5 | |
| 16 | 8665.28884 | 20.00 | | | |
| 17 | INF | 71.00 | 1.51680 | 64.2 | |
| 18 | INF | | | | |

<Polynominal Deformation Terms>

| m | K | A4 | A6 |
|---|---|---|---|
| 5 | -0.768377 | 0.336042E-6 | -0.167690E-9 |
| 6 | -0.387362 | -0.771756E-6 | 0.311739E-9 |
| 7 | -221.366534 | -0.812804E-9 | 0.572113E-8 |
| 8 | 0.73206 | 0.177862E-6 | 0.119981E-8 |

<Polynominal Deformation Terms>

| m | A8 | A10 |
|---|---|---|
| 5 | -0.535577E-13 | 0.318776E-16 |
| 6 | -0.108533E-11 | 0.239659E-15 |
| 7 | -0.203842E-10 | 0.249052E-13 |
| 8 | 0.168784E-11 | -0.251716E-13 |

<First Invention, Embodiment 24>

FIG. 24 shows an embodiment 24. Numerical data of this embodiment are shown in TABLE-24. FIG. 25 shows an example in which the mirror M inclined at 45° is inserted in the same construction as in FIG. 24 and the light beam is caused to pass the lens system. In FIG. 25, the distance between the center (C1) of the last surface of the first lens group G1 and the center (C2) of the mirror M is set at 56.23 mm. The diaphragm AST is arranged behind the small conjugate side surface of lens element L4 constituting the second lens group G2 away therefrom by 1.64 mm (the ninth surface in TABLE-24). It can be seen that the mirror M can be inserted in a relatively small air interval between the first lens group G1 and the second lens group G2 in a compact manner. In this embodiment, all the lens elements are spherical lenses, and accordingly the distortion is relatively large as shown in an aberration diagram later. However, this lens system has a sufficient performance for an application, for example, in displaying a TV image, and is manufacturable inexpensively since aspherical lenses are not used.

TABLE 24

(EMBODIMENT 24)

$f = 41.09$ $\theta = 43.82°$ $F = 4.5$ $\beta = 14.5$
$f1 = -72.39$ $f2 = 127.06$ $f3 = 102.95$ $D1 = 88.23$
$D1/f = 2.15$ $f2/f3 = 1.23$ $|f1|/f = 1.76$

| m | ri | di | ni | vi | |
|---|---|---|---|---|---|
| 1 | 230.79216 | 25.38 | 1.69680 | 55.5 | |
| 2 | 2311.34846 | 0.10 | | | |
| 3 | 256.97749 | 2.40 | 1.61293 | 37.0 | |
| 4 | 70.07194 | 16.36 | | | |
| 5 | 375.71609 | 2.40 | 1.63854 | 55.4 | |
| 6 | 52.65455 | 88.23 | | | |
| 7 | 479.91760 | 50.00 | 1.80518 | 25.5 | |
| 8 | -126.41794 | 1.64 | | | |
| 9 | INF | 64.29 | | | AST |
| 10 | -101.85108 | 13.84 | 1.80518 | 25.5 | |
| 11 | 85.33577 | 22.52 | 1.73400 | 51.1 | |
| 12 | -91.14216 | 0.10 | | | |
| 13 | 1107.96055 | 7.29 | 1.69350 | 50.8 | |
| 14 | -250.34875 | 0.33 | | | |
| 15 | 162.38709 | 24.48 | 1.69350 | 50.8 | |
| 16 | -7552.93986 | 20.00 | | | |
| 17 | INF | 71.00 | 1.51680 | 64.2 | |
| 18 | INF | | | | |

<First Invention, Embodiment 25>

Figure 29A:
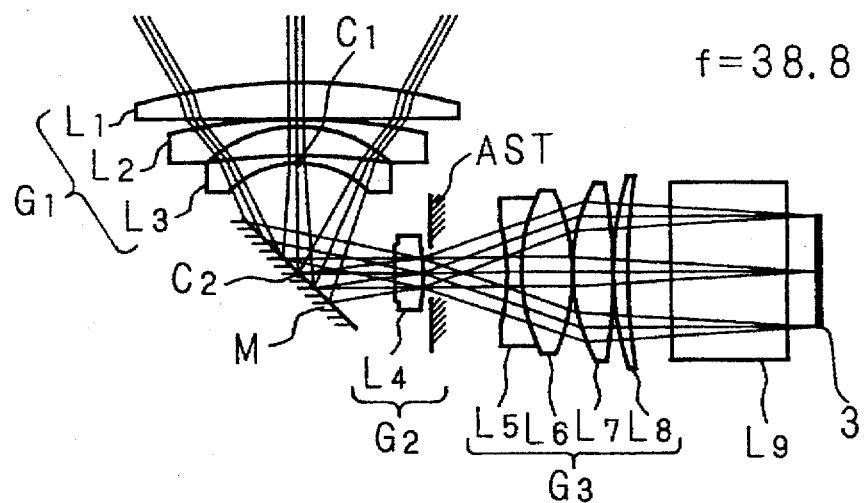
FIG. 29(a), 29(b) and 29(c) are sectional views showing a retro-focus type lens according to the first invention (embodiment 25)
Figure 29B:
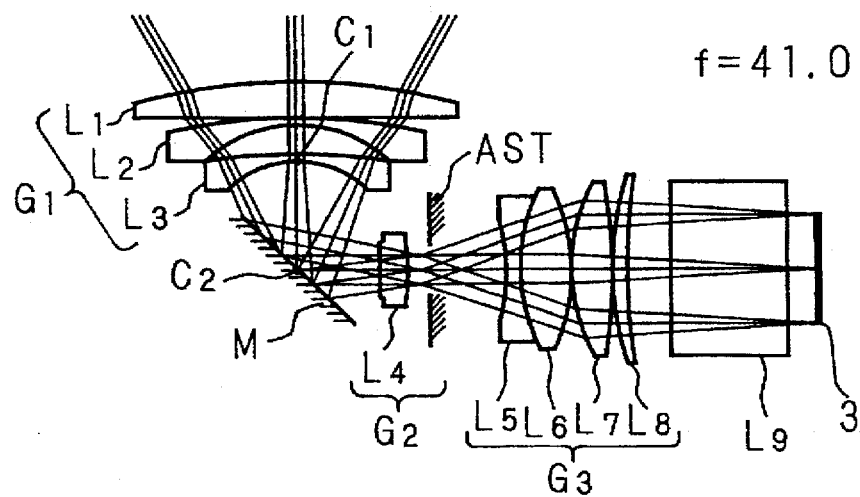
Figure 29C:
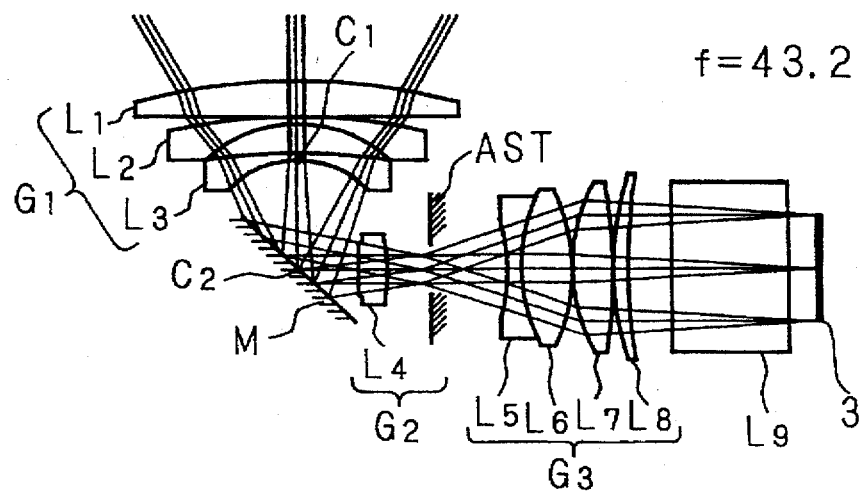
Figure 30C:
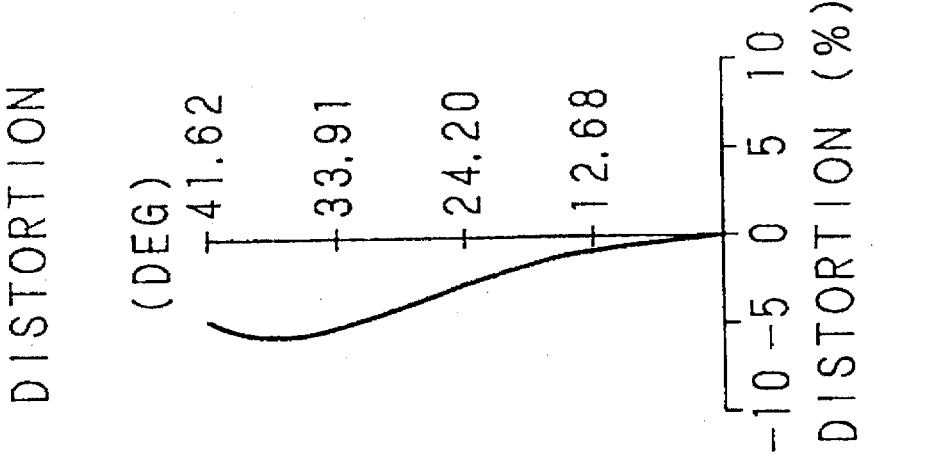
FIGS. 30(a)–(c), hereinafter collectively referred to as FIG. 30, are diagrams showing various aberrations of the retro-focus type lens according to the first invention (embodiment 1)
Figure 30B:
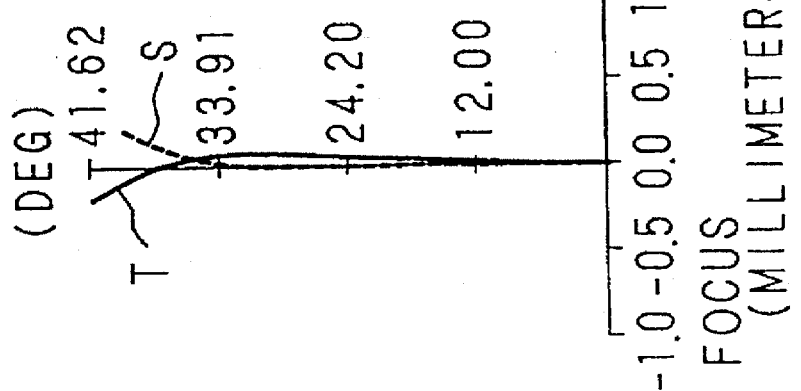
Figure 30A:
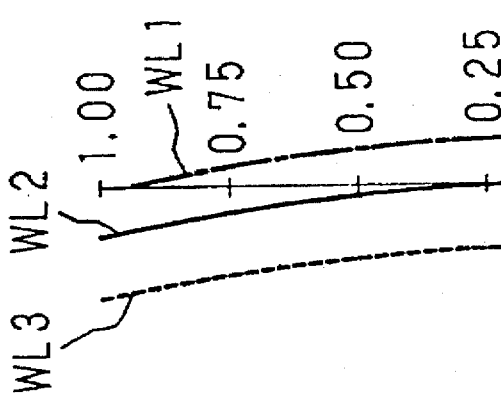
Figure 35C:
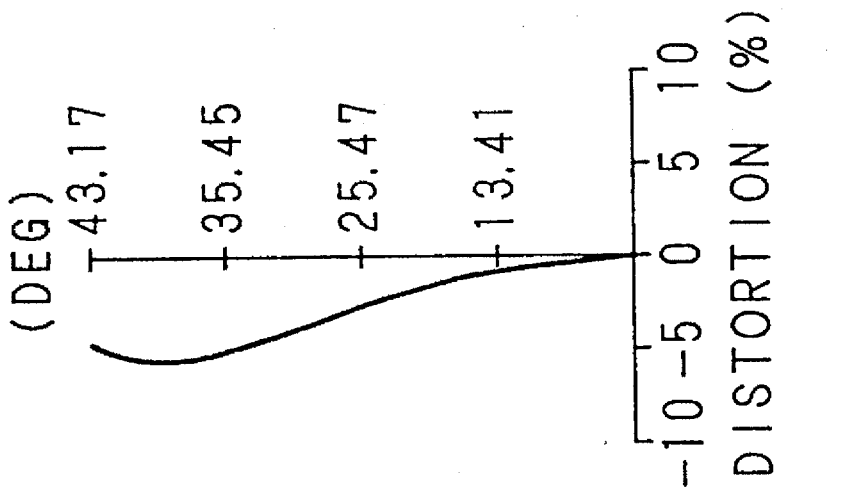
FIGS. 35(a)–(c), hereinafter collectively referred to as FIG. 35, are diagrams showing various aberrations of the retro-focus type lens according to the first invention (embodiment 6)
Figure 35B:
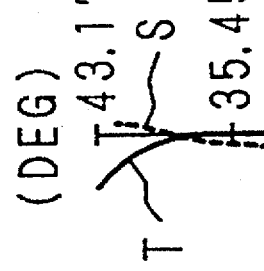
Figure 35A:
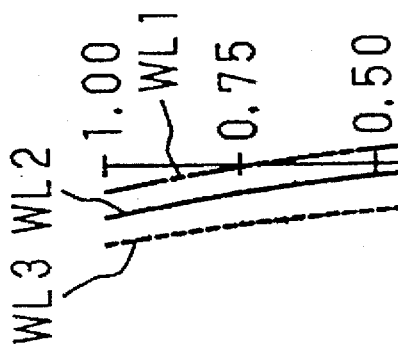
Figure 43C:
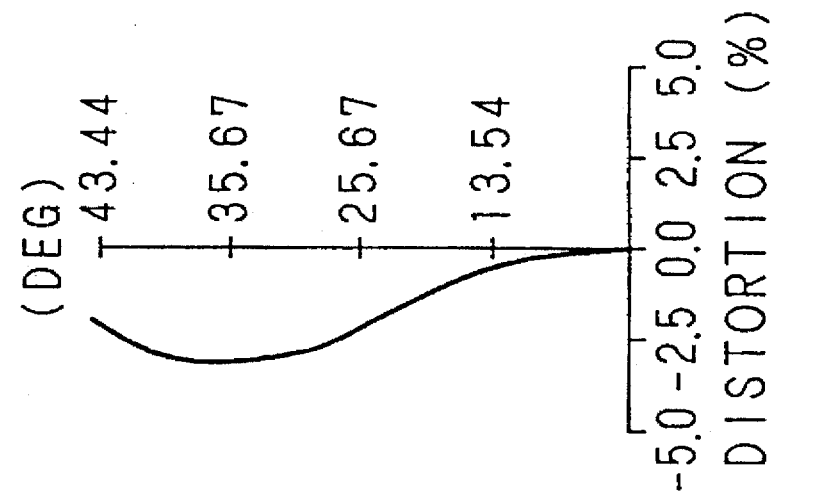
FIGS. 43(a)–(c), hereinafter collectively referred to as FIG. 43, are diagrams showing various aberrations of the retro-focus type lens according to the first invention (embodiment 14)
Figure 43B:
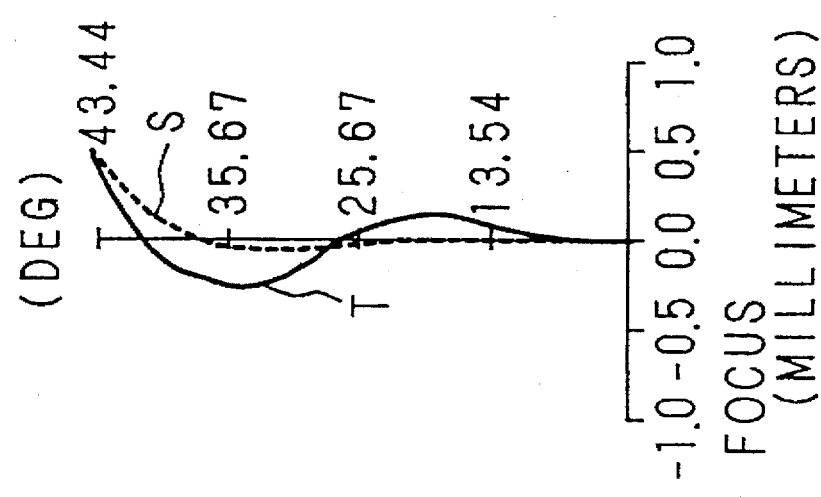
Figure 43A:
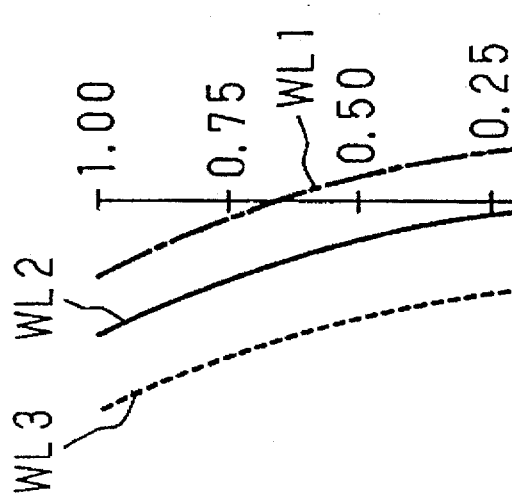
Figure 46A:
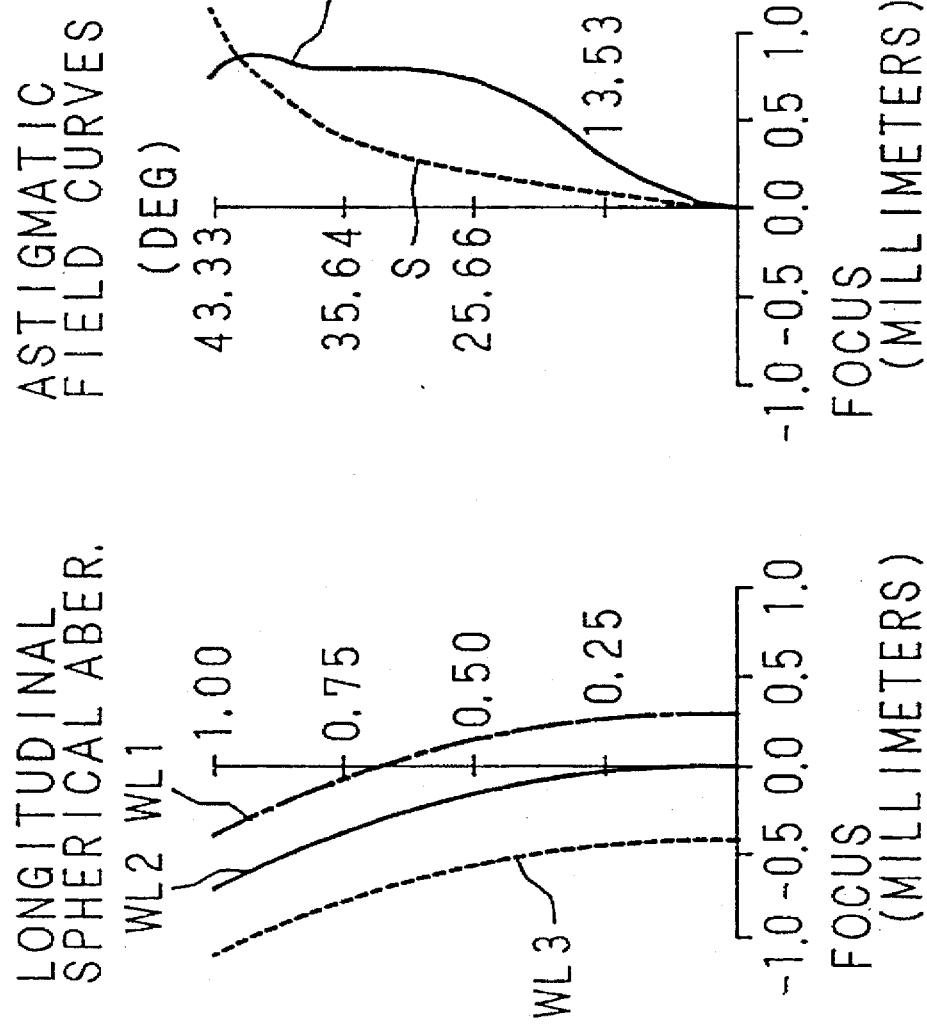
FIGS. 46(a)–(c), hereinafter collectively referred to as FIG. 46, are diagrams showing various aberrations of the retro-focus type lens according to the first invention (embodiment 17)
Figure 46B:
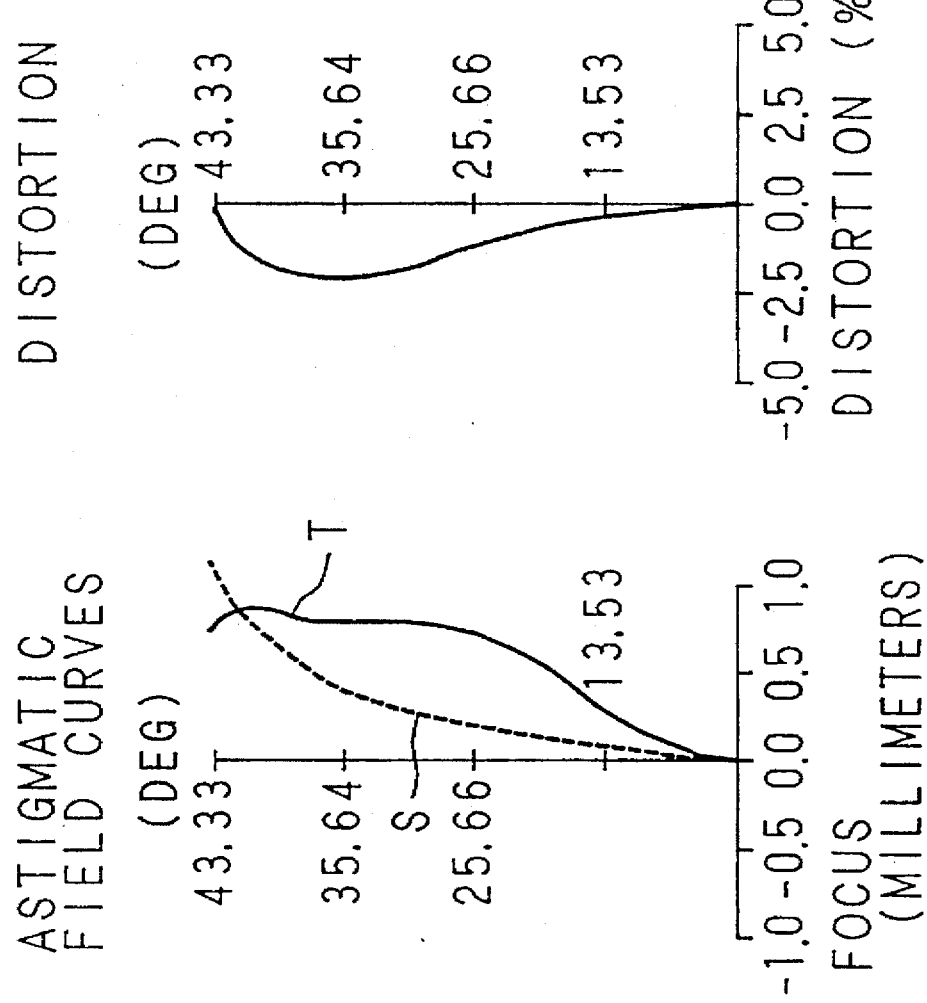
Figure 46C:
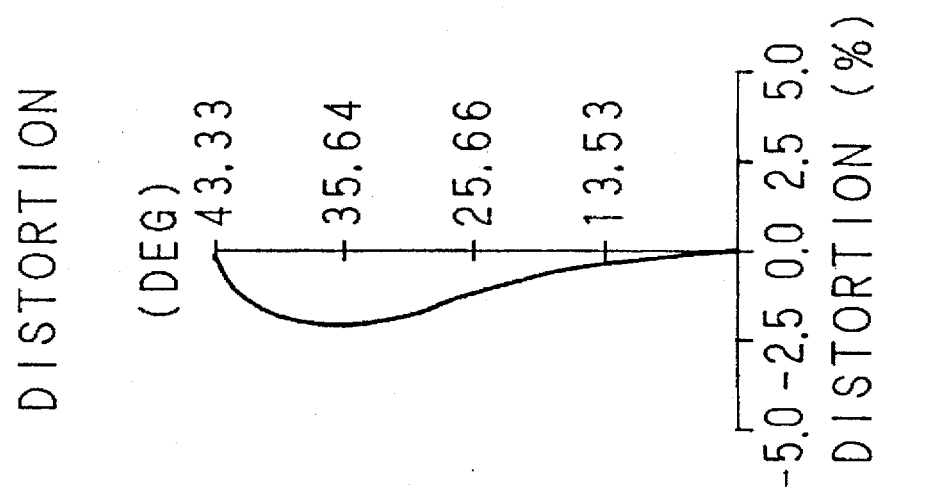

FIGS. 26, 27, and 28 shows an embodiment 25. This embodiment shows a zoom lens. The focal length of the zoom lens becomes greater in the order of FIGS. 26, 27, and 28. Numerical data of this embodiment are shown in TABLE-25. FIGS. 29(a) to 29(c) show examples in which the mirror M inclined at 45° is inserted in the same construction as in FIGS. 26 to 28 and the light beam is caused to pass the respective lens systems. In FIGS. 29(a)–(c) the distance between the center (C1) of the last surface of the first lens group G1 and the center (C2) of the mirror M is set at 53.00 mm. The diaphragm AST is arranged behind the small conjugate side surface of lens element L4 constituting the second lens group G2 away therefrom by 4 to 20 mm (the ninth surface in TABLE-25). It can be seen from FIGS. 29 that the mirror M can be inserted between the first lens group G1 and the second lens group G2.

In this embodiment, in order to change the focal length of the total lens system, the lens element L4 of the second lens group G2 is made movable independently (a, b in TABLE-25). This arrangement makes the focal length of the total lens system variable while retaining the telecentric characteristic on the side of the liquid crystal panel 3. Further in order to compensate for the shift of an image surface on the side of the liquid crystal panel 3 resulting from the change in the focal length, the total lens system including the lens groups G1, G2, and G3 is made movable integrally along the optical axis relative to the parallel plane plate L9 (c in TABLE-25). By the zooming as described above, the projection magnification β can be adjusted from 13.8× to 15.3×, about 11%. A magnification fine adjusting function of about 10% is required in reducing the moire of the projected image to be described later and in adjusting the magnification of a multi-vision projector. The zooming function of the lens system of this embodiment satisfies this requirement. Further, in order to compensate for the shift of the image surface, it may be appropriate to make the lens group G1 movable independently (TABLE-25, fine adjustment of d6 in FIGS. 26 to 28) as well as to make the lens groups G1, G2, and G3 movable integrally. With this arrangement, there can be obtained a further satisfactory imaging characteristic.

TABLE 25

(EMBODIMENT 25)

$f = 38.8–43.2$ $\theta= 44.9–42.9°$ $F. = 4.5$ $\beta = 15.3–13.8$
$f1 = -85.37$ $f2 = 139.19$ $f3 = 88.93$ $D1 = 103–87$
$D1/f = 2.65–2.01$ $f2/f3 = 1.57$ $|f1|/f2 = 2.20–1.98$
$f4 = -1997.50$ $|f4|/f = 50.94–45.76$

| m | ri | di | ni | vi | |
|---|---|---|---|---|---|
| 1 | 223.60991 | 18.00 | 1.69680 | 55.5 | |
| 2 | 815.85357 | 0.20 | | | |
| 3 | 218.87795 | 5.00 | 1.61293 | 37.0 | |
| 4 | 60.82318 | 21.82 | | | |
| 5 | 427.20443 | 4.00 | 1.63854 | 55.4 | |
| 6 | 78.31506 | a | | | |
| 7 | 1842.49361 | 14.00 | 1.80518 | 25.5 | |
| 8 | -120.09981 | b | | | |
| 9 | INF | 62.60 | | | AST |
| 10 | -74.15737 | 3.00 | 1.80518 | 25.5 | |
| 11 | 112.57176 | 26.00 | 1.71300 | 53.9 | |
| 12 | -63.64452 | 0.20 | | | |
| 13 | 173.92879 | 23.00 | 1.67790 | 55.5 | |
| 14 | -137.91210 | 0.20 | | | |
| 15 | -519.52669 | 3.00 | 1.49154 | 57.8 | * |
| 16 | -1100.36498 | c | | | * |
| 17 | INF | 71.00 | 1.51680 | 64.2 | |
| 18 | INF | | | | |

<Variable Distance>

| | a | b | c |
|---|---|---|---|
| f = 38.8 | 103.0 | 4.0 | 18.26 |
| f = 41.0 | 95.0 | 12.0 | 20.00 |
| f = 43.2 | 87.0 | 20.0 | 22.01 |

<Polynominal Deformation Terms>

| m | K | A4 | A6 |
|---|---|---|---|
| 15 | 90.479412 | -0.943206E-8 | 0.289802E-19 |
| 16 | -2000.000000 | 0.246380E-6 | 0.380317E-10 |

<Polynominal Deformation Terms>

| m | A8 | A10 |
|---|---|---|
| 15 | 0.547844E-14 | 0.566589E-17 |
| 16 | 0.206938E-13 | 0.367889E-17 |

FIGS. 30 to 53 are aberration diagrams respectively corresponding to the embodiments 1 to 24 when viewed at the small conjugate side. FIGS. 54 to 56 are aberration diagrams corresponding to the respective zooming states of the embodiment 25 when viewed at the small conjugate side. The spherical aberration is shown with respect to three wave-lengths (WL1=610 nm, WL2=546.1 nm, WL3=470 nm), the astigmatism and the distortion are shown with respect to the e line. The respective aberrations shown in FIGS. 30 to 56 lie sufficiently in a practical range.

In the foregoing embodiments, the diaphragm AST is arranged independently behind the lens element L4 of the second lens group G2. However, an outside periphery of the small conjugate side surface of the lens element L4 may be used in place of the diaphragm AST or the diaphragm function may be realized by a construction of a lens barrel (not shogun) for holding the lens element L4. Particularly, in the lens construction wherein the diaphragm is arranged right behind the fourth lens element L4 as in the foregoing embodiments 1 to 4, 7, 8, 22 to 24, these alternative diaphragm means are effective. Further in the embodiments 1 to 25, in focusing the lens system when the distance from the screen to the first lens element L1 (or L0) is changed, it is effective to move the first lens group G1 integrally along the optical axis or to move the lens groups G1, G2, and G3 integrally along the optical axis relative to the parallel plane plate L9.

Besides the construction in which the diaphragm AST has an aperture diameter thereof determined fixedly, the lens system may be constructed such that the aperture diameter is variable as already known in the conventional camera lens or the like, thereby making the effective F-number variable. The lens having the variable aperture diameter is effective, as described with reference to FIGS. 62(a) and (b) and FIGS. 63(a) and (b) in relation to the fifth and sixth inventions, since it can adjust the contrast ratio and the luminance of the projected image properly in combination with a liquid crystal panel (PDLC, DSM liquid crystal, etc.) which electrically switches the state of the transmitting beam between the scattering state and the transparent state. In addition, if the aperture diameter of the diaphragm is made variable electrically by a means such as a motor as already known, the contrast ratio and the luminance can be automatically adjusted in accordance with an output of an optical sensor for detecting the brightness of the external light.

<Second and Third Inventions>

Figure 57A:
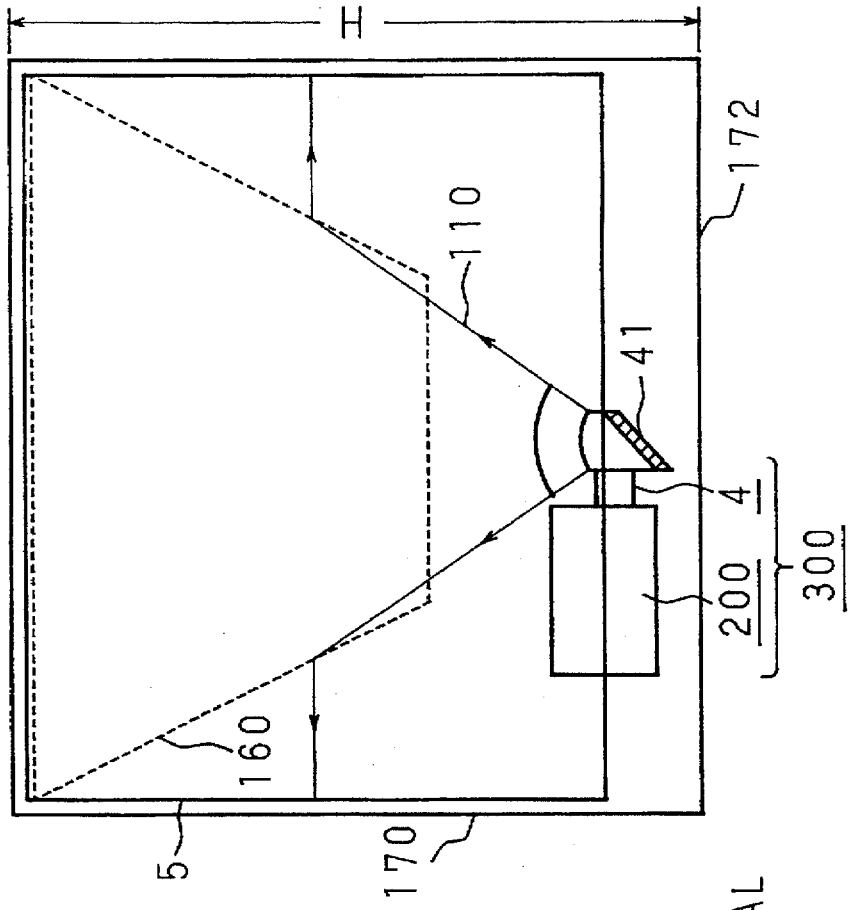
FIGS. 57(a) and 57(b) are overall construction diagrams of a projection-type display apparatus according to the second invention, the third invention, and the fifth invention.
Figure 57B:
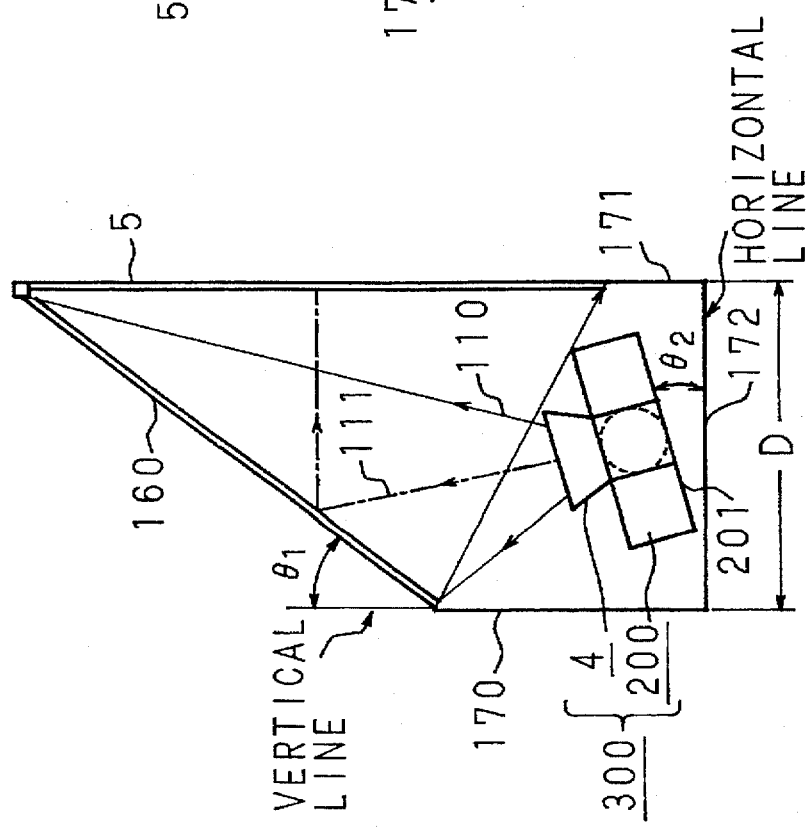

FIGS. 57(a) and 57(b) show a construction of a projection-type display apparatus according to the second and third inventions, FIG. 57(a) being a side view and FIG. 57(b) being a front view. In these figures, indicated at 300 is a projector including a casing 200 and a projection lens 4. A first mirror 41 is built in the projection lens 4. The projector 300 is accommodated in a cabinet 170 which holds a second mirror 160 and a translucent screen 5.

Figure 58A:
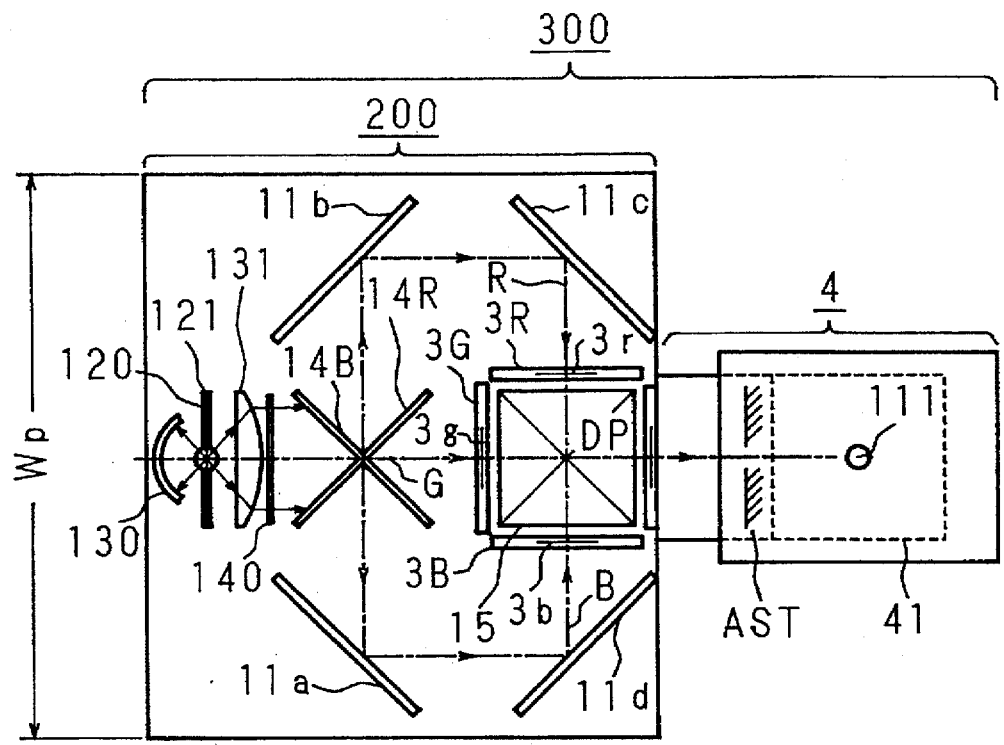
FIGS. 58(a) and 58(b) are construction diagrams of a projector incorporated in the projection-type display apparatus according to the second invention, the third invention, and the fifth invention.
Figure 58B:
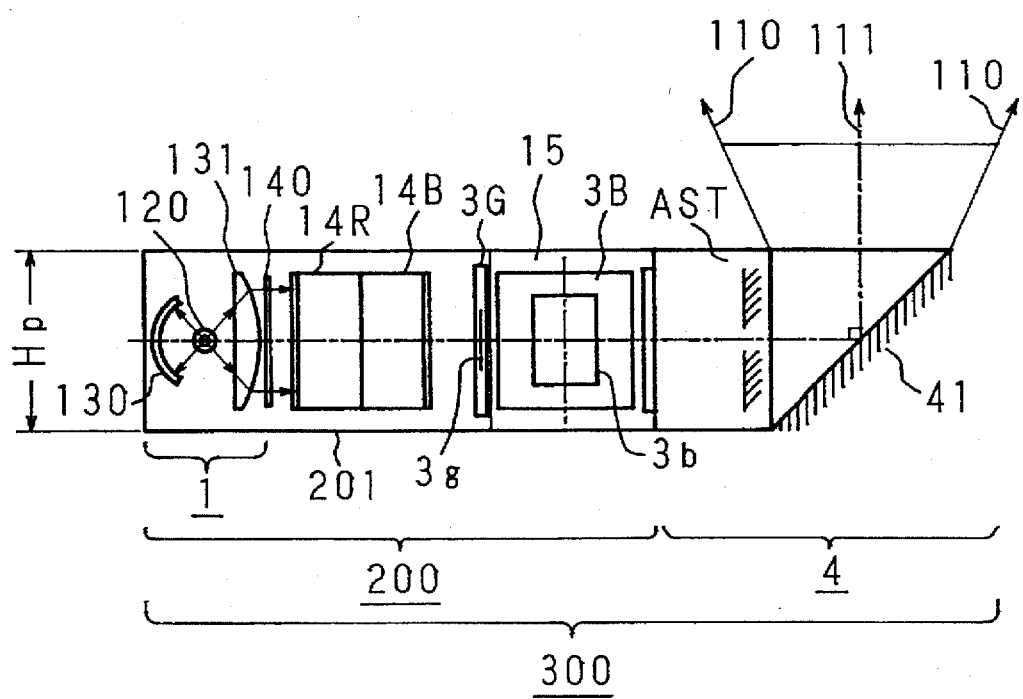

FIGS. 58(a) and 58(b) show an interior construction of the projector 300, FIG. 58(a) being a plan view and FIG. 58(b) being a front view. In these figure, indicated at 1 is a light source including a lamp 120, an electrode 121 of the lamp 120, a concave mirror 130, and a condenser lens 131. As the lamp 120 is used a white light source such as a metal halide lamp, a xenon lamp, and halogen lamp. In these figures is illustrated a construction in which a discharge gap is provided between a pair of electrodes 121 in a metal halide lamp or xenon lamp. The concave mirror 130 has a center of curvature at an emission point of the lamp 120, and is adapted to reflect the beam toward the right of the lamp 120 efficiently in the drawings of FIGS. 58(a) and 58(b). A specific coating is applied to the concave mirror 130 if necessary so as to cause the infrared light to transmit therethrough, thereby reducing the degree of the radiation of heat toward the liquid crystal panel. Further, a specific coating is applied to a refracting surface of the condenser lens 131 if necessary so as to reflect the infrared rays and/or ultraviolet rays while to cause the visible light to transmit therethrough.

A filter 140 for transmitting only the visible light is arranged in an emitting direction of the light source 1. Before the filter 140 are arranged in an intersecting manner a dichroic mirror 14B for reflecting the blue light while transmitting the green and red lights and a dichroic mirror 14R for reflecting the red light while transmitting the green and blue light. Along an optical path of the reflected light from the dichroic mirror 14R are arranged mirrors 11b, 11c for reflecting all the lights and a liquid crystal panel 3R including image display unit 3r. On the other hand, along an optical path of the reflected light from the dichroic mirror 14B are arranged mirrors 11a, 11d for reflecting all the lights and a liquid crystal panel 3B including image display unit 3b. Along an optical path of the transmitted light from the dichroic mirrors 14B, 14R is arranged a liquid crystal panel 3G including an image display unit 3g. A drive circuit for causing an image to be displayed on the display knits 3r, 3g, and 3b of the respective liquid crystal panels 3R, 3G, and 3B is unillustrated. Enclosed by these liquid crystal panels 3R, 3G, and 3B is arranged a known dichroic prism 15 for selectively reflecting the red and blue lights while transmitting the green light. A projection lens 4 is arranged in the emitting direction of the dichroic prism 15. The projection lens 4 is internally provided with the first mirror 41 and a diaphragm AST, and a detailed construction thereof is as described with respect to the first invention. FIG. 58(b) shows a case where the first mirror 41 is inclined at 45° as a typical example. A lens system before and after the first mirror 41 is unillustrated.

An operation of this embodiment will be described next. The light from the light source 1 (the light emitted from the lamp 120 and the reflected light from the concave mirror 130) is focused into a parallel beam by the condenser lens 131 to be incident upon the filter 140. The filter 140 transmits only the visible light while reflecting or absorbing the unnecessary infrared rays and ultraviolet rays. The beam transmitted through the filter 140 is incident upon the dichroic mirrors 14B, 14R. The illumination light is separated into lights of three primary colors of read (R), green (G), and blue (B) by the dichroic mirrors 14B, 14R. The blue light B has its optical path bent by the mirrors 11a, 11d so as to be projected upon the liquid crystal panel 3B. The red light R has its optical path folded by the mirrors 11b, 11c so as to be projected upon the liquid crystal panel 3R. The green light G is projected upon the liquid crystal panel 3G. In this way, since the liquid crystal panels are illuminated with the parallel beam by the presence of the condenser lens 131 (telecentric illumination system), they can be illuminated with the light of uniform chromaticity even if a spectral characteristic of the dichroic mirrors 14R, 14B has an incidence-angle dependency. Further, even in the case where the liquid crystal panels 3R, 3G, and 3B have a display characteristic dependent on the incidence angle of the illumination light, a uniform display characteristic can be obtained in a display screen of each panel since the illumination beam is a parallel beam.

The transmitted lights modulated by the image on the liquid crystal panels are combined into a beam by the dichroic prism 15, thereby being introduced to the projection lens 4. The combined beam is folded by 90° by the first folded mirror 41, and accordingly the projected light comes out through the projection lens 4 as shown in FIG. 58(b). It is not necessary to set an inclined angle of the first mirror 41 at 45°. In short, the inclined angle is set at an optimum angle in designing the entire set. Those having a mirror inclined at an angle other than 45° belong to modifications of the present invention.

The respective image display units 3r, 3g, 3b of the liquid crystal panels 3R, 3G, 3B are equally sized, and it is required to project an image having an aspect ratio of 4:3 in the case of the projection-type display apparatus of the NTSC system and to project an image having an aspect ratio of 16:9 in the case of the projection-type display apparatus of the HDTV system in such a manner that a larger side direction becomes a horizontal direction in the projected image. However, the longer side direction of the liquid crystal display panels is converted into a lateral direction by the first mirror 41. Accordingly, the image display units 3r, 3g, and 3b are arranged such that the longer side direction thereof coincides with a vertical direction in the drawing of FIG. 58(b) showing a front view, i.e. a direction of a center ray 111 of the projected beam from the projection lens 4. According to the NTSC system and the HDTV system, the horizontal direction of the projected image is the longer side direction. However, there are types in which the vertical direction on the projection screen is specially the longer side direction in a projection type display for use in office automation, or the like. In this case, the image display unit should be arranged such that a direction of the shorter side of the display screen of the liquid crystal panel coincides with the vertical direction in the drawing of FIG. 58(b). A phenomenon in which the display directions of the liquid crystal panel are switched occurs similarly in the case where the first mirror 41 is inclined at an angle other than 45°. Thus, the direction of the side of the liquid crystal panel which is desired to be projected horizontally should be set so as to coincide with the vertical direction as in FIG. 58(b) regardless of the inclined angle of the mirror.

As described above, the diaphragm AST determines the F-number of the projection lens 4 and works to make the chief ray of the beam incident upon the projection lens 4 from the respective points of the liquid crystal panels parallel with the optical axis of the lens system. Accordingly, if the aperture diameter of the diaphragm AST is set at a large value to thereby decrease the F-number of the projection lens 4, the beams projected onto the screen 5 are increased to thereby increase the luminance. Further, if the aperture diameter of the diaphragm AST is set at a small value to hereby increase the F-number of the projection lens 4, the beams projected onto the screen 5 are decreased to thereby decrease the luminance, but the resolving power is improved since the aberrations of the projection lens 4 becomes smaller. Further, the chief ray is made into a parallel ray by the diaphragm AST as described above, which eliminates a variation in the incidence angle of the beams when they transmits through the dichroic prism 15. Thus, there can be eliminated a color shade of the projected image due to the incidence-angle dependency of the spectral characteristic of the dichroic prism 15.

Next, an operation of the entire set will be described with reference to FIGS. 57(a) and (b). A portion of the projector 300 before the first mirror 41 (casing 200) is arranged in the cabinet 170 on the left half from the center of the screen 5 in the front view (FIG. 57(b)) from the screen side. The beam folded by the first mirror 41 in the projection lens 4 is projected as a projected light 110 in a upward direction, and then bent toward the screen 5 by the second mirror 160 as shown in the side view (FIG. 57(a)), thereby forming an enlarged image on the screen 5.

The second mirror 160 may be rectangular, and it is sufficient for the mirror 160 to have a reflecting surface only in a range where the projected light is incident. It is effective in reducing the weight of the set if a trapezoidal mirror is used as shown by a broken line in FIG. 57(b), since an area of the mirror can be minimized. As described above, the oblique angle of the off-axis beam with respect to the optical axis can be made smaller than the oblique angle of the outgoing light from the lens with respect thereto within the lens system. Therefore, if the mirror is mounted in the lens, the first mirror 41 can be made small in size. In addition, if the casing 200 is accommodated in the cabinet 170 on the left half from the center of the screen 5, a portion 171 of the cabinet 170 below the screen 5 can be made smaller. Thus, the height H of the set can be reduced easily.

In making the depth D smaller, it is effective to set an angle θ 1 (see FIG. 57(a)) of the second mirror 160 relative to the vertical line at 45° or smaller. To this end, an angle θ 2 of a bottom surface 201 of the casing 200 relative to a bottom surface 172 (coinciding with the horizontal line) of the cabinet 170 should be set such that a center line 111 of the projected beam indicated by a one-dot-one-chain line inclines more backward than vertical. Specifically, it is appropriate to set θ 2≧0°. Although the center line of the projected beam incident upon the screen 5 coincides with the horizontal direction in FIG. 57 for the sake of convenience, the center line is preferably set such that an extension thereof comes to the eye position of the viewer.

In order to reduce the height H, it is required to make the casing 200 as thin as possible. To this end, in the embodiment shown in FIGS. 58(a) and (b), the optical system including from the light source 1 to the dichroic prism 15 is arranged on a plane perpendicular to the center ray 111 of the outgoing light of the projection lens 4 (see FIG. 58(a)) to reduce the thickness Hp of the casing 200. Indicated at 201 in FIG. 58(b) is the bottom surface of the casing 200, which orthogonally intersects with the center ray 111 of the projected light. In other words, the bottom surface 201 is arranged on a plane parallel with the plane of FIG. 58(a) showing the plan view. It can be considered to arrange the optical system by rotating the casing 200° by 90° about the optical axis of the projection lens 4, using the same optical parts as those shown in FIGS. 58(a) and (b). However, since the width Wp of the casing 200 is greater than the thickness Hp in this case, it is disadvantageous to apply this arrangement to the construction of FIGS. 57(a) and (b) in order to reduce the height of the entire projection-type display apparatus. Further, the screen 5 has the aspect ratio of 4:3 in the apparatus of the NTSC system and of 16:9 in the apparatus of the HDTV system, and the longer side direction is set as the horizontal direction. As shown in FIG. 58(b), if the liquid crystal panel is arranged such that the longer side direction of the image display plane thereof becomes the vertical direction within the projector 300, the longer side direction of the projected image is conveniently converted by the first bent mirror 41 so as to coincide with the longer side direction (horizontal direction) of the screen 5. FIGS. 57(a) and (b) show the example in which the casing 200 is arranged on the left half from the center of the screen 5. However, the effects of the invention are invariable even if the casing 200 is arranged on the right half from the center of the screen 5.

In order to reduce the height of the entire set under the above arrangement of the optical system in the casing, it is required to set properly the angle θ 2 in FIG. 57(a) between the bottom surface 201 of the casing 200 and the bottom surface 172 of the cabinet 170 (which is caused to coincide with the horizontal direction for the sake of convenience in FIGS. 57(a) and (b)). FIGS. 57(a) and (b) show the example in which the apparatus having a diagonal screen size of 40 inches (aspect ratio 3:4) is constructed using the projection lens according to the first invention (embodiment 1). In the illustrated example, θ 1=38° and θ 2=14°. Under these conditions, the height H of the set was 712 mm and the depth D thereof was 360 mm. Likewise by setting θ 1=45°, θ 2=0° in the screen of 40 inches, the height H was 636 mm and the depth D was 432 mm, thereby providing the larger depth while providing the smaller height than the above example. In this example, since the bottom surface of the projector coincides with the horizontal direction, the set can be easily assembled and inspected. If an increase in the depth is permitted, this construction is preferable in the light of manufacturing. Considering the condition (θ 2≧0°) which reduces the depth of the set, it is desirable to satisfy the following conditional equation in order to reduce the depth and the height of the set in a well-balanced manner:

$$0° \leq \theta 2 \leq 20° \quad (8)$$

If θ 2 is below a lower limit value of the conditional equation (8), the depth of the set is unnecessarily large. Further, if the θ 2 is in excess of an upper limit value of the conditional equation (8), following problems occurs that the height of the set is unnecessarily large, that the casing 200 shields the incident beam to the screen 5 and that the casing 200 projects forward of the set over the plane of the screen 5.

<Fourth Invention>

Figure 60A:
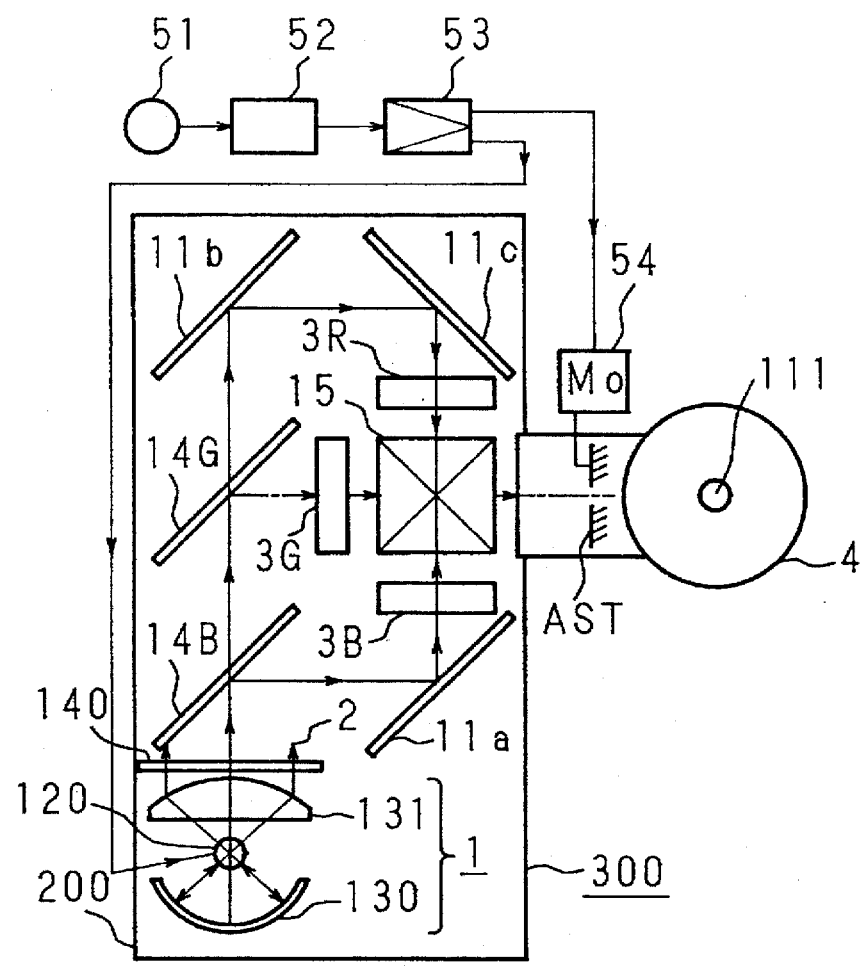
FIGS. 60(a) and 60(b) are construction diagrams of a projector incorporated in the projection-type display apparatus according to the fourth invention and the sixth invention.

FIGS. 59(a)-(c) show a construction of a projection-type display apparatus according to the fourth invention, FIG. 59(a) being a plan view, FIG. 59(b) being a front view, and FIG. 59(c) being a side view. In these figures, like or corresponding reference numerals designate like or corresponding parts shown in FIGS. 57(a) and (b), thus no description will be given on those parts. In these figures, indicated at 41 is a mirror built in a projection lens 4 which is similar to the first mirror 41 according to the second and third inventions. FIGS. 60(a) and (b) show an interior construction of a projector 300, FIG. 60(a) being a plan view showing a plane where an optical system before the projection lens 4 is arranged and FIG. 60(b) being a side view. In these figures, like or corresponding reference numerals designate like or corresponding parts shown in FIGS. 58(a) and (b), thus no description will be given on those parts. Indicated at 51 is an optical sensor, at 52 an amplifier, at 53 a motor/lamp control circuit, and at 54 a motor.

An operation of this embodiment will be described next. The light from the light source 1 is focused into a parallel beam by a condenser lens 131 and only the visible light is transmitted through a filter 140. The beam transmitted through the filter 140 is incident upon the dichroic mirrors 14B, 14G. The illumination light is separated into lights of three primary colors of read (R), green (G), and blue (B) by the dichroic mirrors 14B, 14G. The blue light B has its optical path bent by a mirror 11a so as to be projected upon the liquid crystal panel 3B. The red light R has its optical path bent by mirrors 11b, 11c so as to be projected upon the liquid crystal panel 3R. The green light G is reflected by the dichroic mirror 14G to be projected upon the liquid crystal panel 3G. In this way, since the liquid crystal panels are illuminated with the parallel beam by the presence of the condenser lens 131 (telecentric illumination system), they can be illuminated with the light of uniform chromaticity even if a spectral characteristic of the dichroic mirrors 14B, 14G has an incidence-angle dependency. Further, even in the case where a display characteristic of the liquid crystal panels 3R, 3G, and 3B have the incidence-angle dependency of the illumination light, a uniform display characteristic can be obtained in a display screen of each panel since the illumination beam is a parallel light.

Figure 60B:
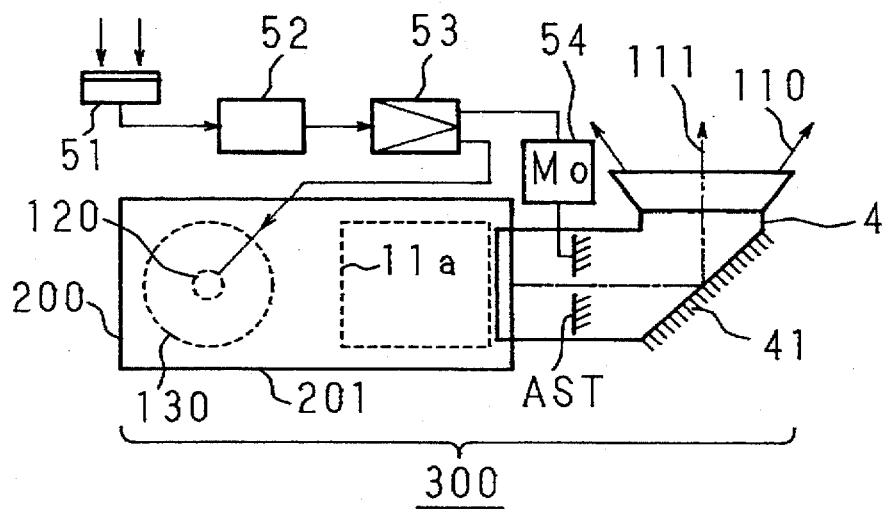

The transmitted lights modulated by the image on the liquid crystal panels are combined into a beam by the dichroic prism 15, thereby being introduced to the projection lens 4. As described in relation to the first invention, the projection lens 4 is provided internally with the bent mirror 41, and includes lens systems before and after the mirror (lens systems are unillustrated). FIG. 60(b) illustrates a case where the bent mirror 41 is inclined at 45° as a typical example. The combined beam is bent by 90° by the bent mirror 41, and accordingly a projected light 110 comes out through the projection lens 4 as shown in FIG. 60(b). The optical system before the projection lens 4 (including the light source 1 to the dichroic prism 15) is arranged on a plane parallel with a bottom surface 201 of the casing 200 (see FIG. 60(b)) as shown in the plan view of FIG. 60(a).

Similar to the second and third inventions, a diaphragm AST determines the F-number of the projection lens 4 and works to make the chief ray of the beam incident upon the projection lens 4 from the respective points of the liquid crystal panels parallel with the optical axis of the lens system. Accordingly, if the aperture diameter of the diaphragm AST is set at a large value to thereby decrease the F-number of the projection lens 4, the beams projected onto the screen 5 are increased to thereby increase the luminance. Further, if the aperture diameter of the diaphragm AST is set at a small value to thereby increase the F-number of the projection lens 4, the beams projected onto the screen 5 are decreased to thereby decrease the luminance, but the resolving power is improved since the aberrations of the projection lens 4 are reduced. Further, the chief ray is made into a parallel ray by the diaphragm AST as described above, which eliminates a variation in the incidence angle of the beams when they transmit through the dichroic prism 15. Thus, there can be eliminated a color shade of the projected image due to the incidence-angle dependency of the spectral characteristic of the dichroic prism 15.

Next, an operation of the entire set will be described with reference to FIGS. 59(a)–(c). A portion of the projector 300 before the mirror 41 (casing 200) is arranged in the cabinet 170 on the left half from the center of the screen 5 in the plan view (FIG. 59(a)) from the above, and the bottom surface 201 of the casing 200 is arranged substantially in parallel with the screen 5. The beam bent by the mirror 41 in the projection lens 4 is projected as the projected light 110 on the screen 5 to form an enlarged image thereon. In this embodiment, a center ray 111 of the beam from the projection lens 4 advances in the horizontal direction, and incident upon the screen 5 substantially perpendicularly to the screen 5.

As described in relation to the first invention, if the mirror 41 is arranged in the lens, an oblique angle of an off-axis beam relative to the optical axis can be made smaller than an oblique angle of an outgoing beam relative thereto. Accordingly, the size of the mirror can be made smaller compared to a case where the mirror is arranged outside the projection lens 4. By accommodating the casing 200 in the left half of the cabinet 170 from the center of the screen 5, the front dimensions (W, H in FIG. 59(b)) of the cabinet 170 can be made substantially equal to the dimensions of the screen 5. In addition, using the wide-angle projection lens 4 as shown in the first invention, the depth of the cabinet 170 (D in FIG. 59(c)) can be reduced.

As described above, the bottom surface 201 of the casing 200 is arranged substantially in parallel with the screen 5 so that the center ray 111 of the projected light 110 advances in the horizontal direction, thereby reducing the depth D while minimizing the front dimensions W, H of the apparatus. It can be considered in FIG. 59(b) to arrange the casing 200 rotated by 90° about the center ray 111 using the same projector as in FIGS. 60(a) and (b). It goes without saying that such an arrangement of the projector belongs to modifications of the present invention. FIGS. 59(a)–(c) show the construction in which the casing 200 is arranged on the left half from the center of the screen 5. However, there is no problem in arranging the casing 200 on the right half.

Figure 61:
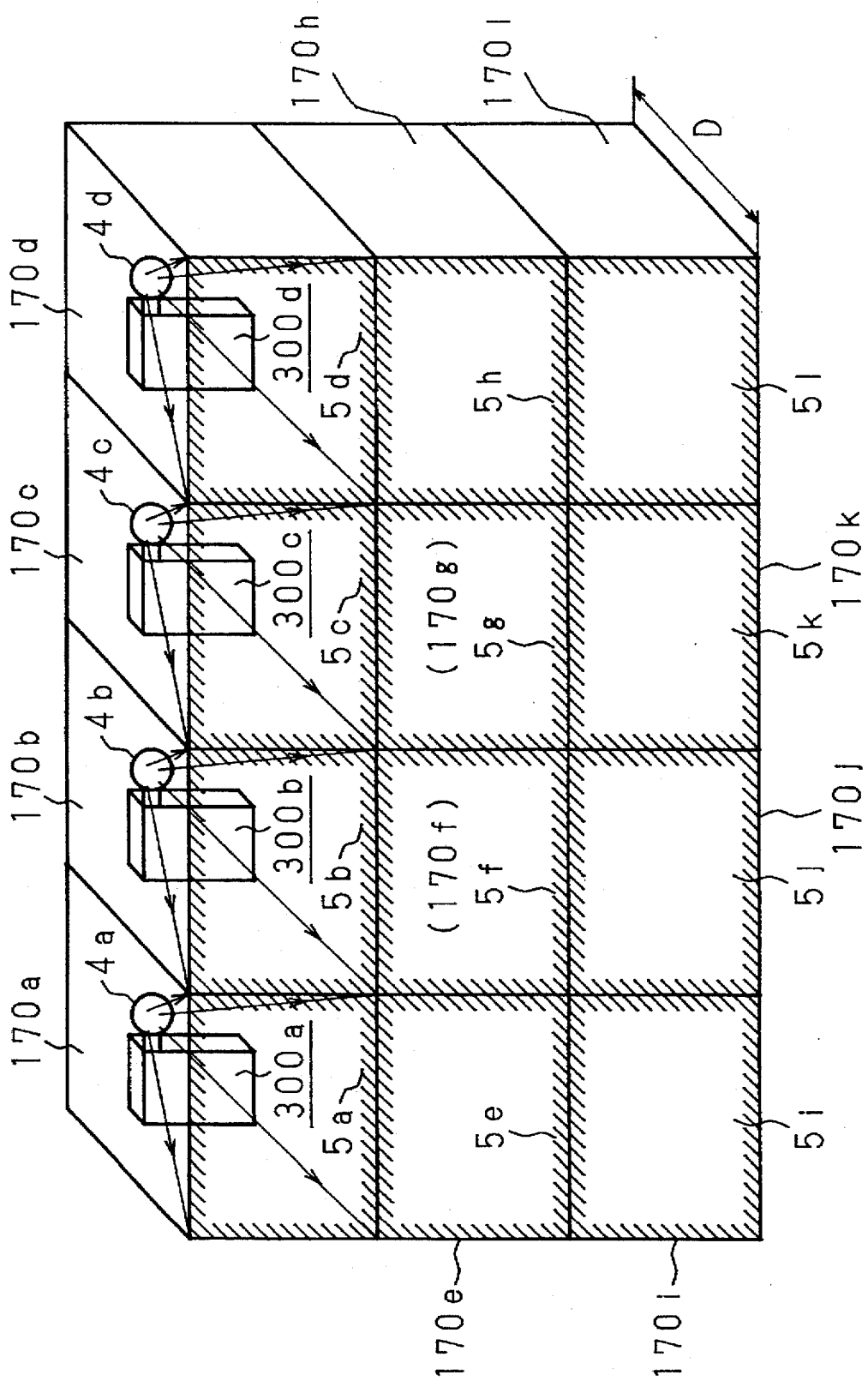
FIG. 61 is an overall construction diagram of a multi-vision projection-type display apparatus according to the fourth invention.

A modification of the fourth invention described above will be described with reference to FIG. 61. FIG. 61 shows an exemplary construction of a multi-vision projector in which a plurality of projectors 300, each as shown in FIGS. 60(a) and (b), are arranged in rows and columns. In this figure, indicated at 300a to 300d and 4(a)–4(d) are projectors and projection lenses, respectively, similar to the one shown in FIGS. 60(a) and (b). The illustrated example shows an array of 3 (row)×4 (column), but projectors 300e to 300l and projection lenses 4e to 4l in the two lower rows are not unillustrated for the sake of simplicity. Indicated at 5a to 5l are screens on which the projected lights coming from the projection lenses 4a to 4l are incident to form unit projected images. The respective projectors are so arranged that the adjoining unit images are arrayed closely on the screens 5a to 5l. Bottom surface of casings of the respective unit projectors 300a to 300l are arranged in parallel with the screens 5a to 5l similar to the case shown in FIGS. 59(a)–(c). Indicated at 170a to 170l are cabinets for accommodating the projectors 300a to 300l and holding the screens 5a to 5l.

The screens 5a to 5l may be arrayed in rows and columns separately for each unit screen, or may constitute an integral screen. Alternatively, the screens 5a to 5l may partially constitute semi-integral screens corresponding to collections of unit screens of, e.g. 2×2. For example, {5a, 5b, 5e, 5f}, {5c, 5d, 5g, 5h} may constitute the semi-integral screens, and {5i, 5j}, {5k, 5l} may constitute other semi-integral screens. Further, as the cabinets 170a to 170l, separate box-like cabinets may be arrayed in rows and columns. Alternatively, it may be appropriate to form several of these cabinets into a box-like semi-integral cabinet and to array these semi-integral cabinets, or to form all of these into a single box-like integral cabinet.

As described above, the multi-vision projector shown in FIG. 61 is constructed by arraying a plurality of projection-type display apparatuses shown in FIGS. 59(a)–(c) having the front dimensions W, H substantially equal to the dimensions of the screen 5 and the small depth D. Accordingly, the apparatus is allowed to have a small depth D in which apparatus adjoining unit images are arranged with little spacing. Though the array of the unit screens is 3 (row)×4 (column) in the example of FIG. 61, the array is not limited to this. Since this embodiment is a multi-vision construction, there can be easily realized the apparatus having an extremely large screen, a high resolution, and a high luminance.

Further, by manufacturing the projection lenses 4a to 4l into zoom lenses in the construction of FIG. 61, the projection magnifications can be easily adjusted to the same value even if there is any difference in the projection magnification between the respective screens, thereby minimizing the discontinuity of the images between the unit screens.

The dichroic prism 15 in the foregoing second, third, and fourth inventions may be formed of glass material. However, the apparatus can be manufactured light weighted and inexpensively by using the plastic materials (PMMA, PC, ZEONEX, OZ1000, ARTON, APO, etc.) as described in the embodiment 13 of the first invention.

Further, if the projection lens 4 is manufactured as the zoom lens described in the embodiment 25 of the first invention, the dimensions of the projected image can be made adjustable. As already known, a lenticular screen having a periodic structure in the horizontal direction is used as the screen 5, and the liquid crystal panel 3 has a periodic structure caused by the matrix-like electrodes. Accordingly, periodic structures can be observed in the enlarged projected image in the horizontal and vertical directions. Out of these periodic structures, it is known that the vertically striped moire is generated resulting from the interference of the horizontal period structures of the screen 5 and the liquid crystal projected image, thereby preventing viewers from viewing the images clearly. It is already known that the visibility is lowered by optimizing a ratio of the horizontal period of the screen 5 to that of the liquid crystal panel, to thereby minimize the bad effect of the vertically striped moire to the image viewing. Thus, if the projection lens 4 is manufactured as a zoom lens and the projection magnification is adjusted, the moire which is superimposed on the projected image can be adjusted to the degree that it becomes hardest to see.

<Fifth Invention>

Liquid crystal materials based on various principles of operation including conventionally known TN (Twisted Nematic) liquid crystal, PDLC (Polymer Dispersed Liquid Crystal), and DSM (Dynamic Scattering Mode) liquid crystal are applied in the liquid crystal panel for use in the projection-type display apparatus. The PDLC and the DSM liquid crystal are known as those whose state are switched between the scattering state and the transparent state according to a voltage applied to pixels. Accordingly, in the case where the projected image is formed by means of the projection lens 4, the projected beam is shielded by the diaphragm AST provided in the projection lens 4 of FIGS. 58(a) and (b) when the liquid crystal panel is in the scattering state. Thus, the projected image is obliged to have a dark level. On the other hand, when the liquid crystal panel is in the transparent state, the projected image has a bright level since the parallel beam having transmitted through the panel is projected through the projection lens 4 almost without any loss.

Figure 62A:
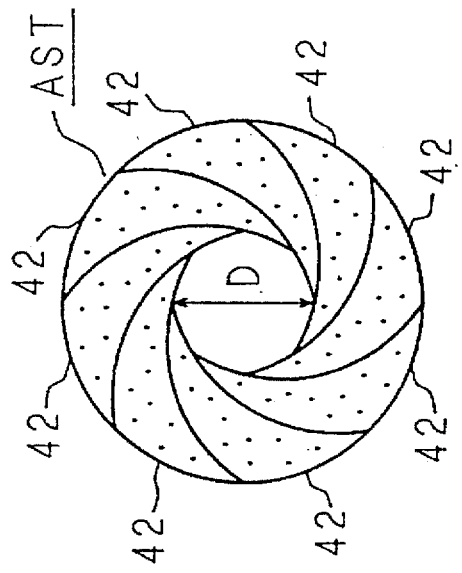
FIGS. 62(a)–(d), hereinafter collectively referred to as FIG. 62, are diagrams showing effects of the fifth invention in the case where an aperture diameter of a projection lens is made variable.
Figure 62C:
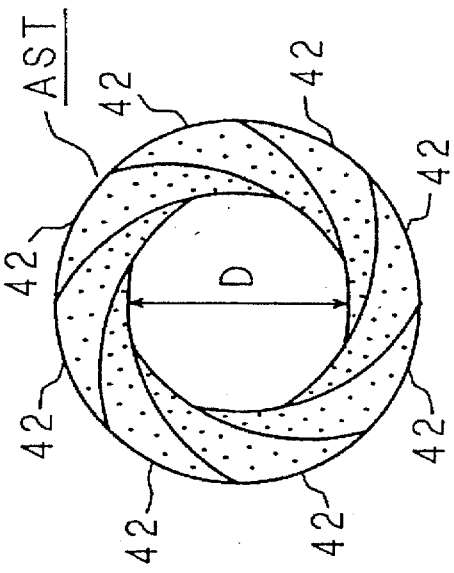
Figure 62B:
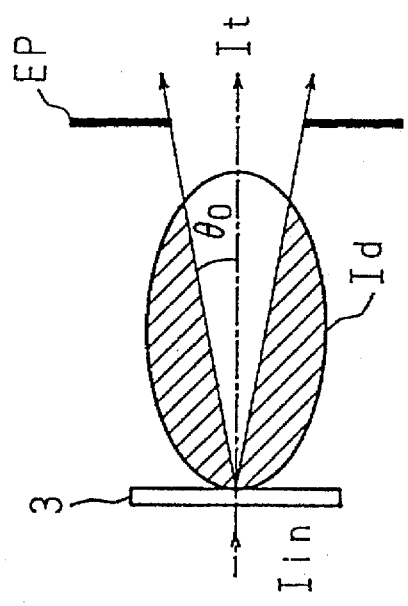

The constructional feature of the projection-type display apparatus according to the fifth invention is to make the aperture diameter of the diaphragm AST variable in the projection-type display apparatus using the PDLC and the DSM liquid crystal. Novel effects brought about by this construction will be described with reference to FIGS. 62 showing diagrammatically the principle of the fifth invention. In FIGS. 62(a) and (b), indicated at EP is an entrance pupil of the projection lens 4 which is variable according to the aperture diameter of the diaphragm AST, and a single liquid crystal panel B is shown for the sake of convenience. FIGS. 62(b) and (d) show a case where the aperture diameter of the diaphragm AST is increased, while FIGS. 62(a) and (c) show a case where the aperture diameter of the diaphragm AST is decreased.

FIGS. 62(a)–(d) will be explained supposing the liquid crystal as the type whose state is switched between the transparent state and the scattering state (PDLC, DSM, etc.). In the case where the liquid crystal panel 3 is in the transparent state, the illumination light Iin becomes a parallel transmitted light It, and further becomes a projected beam through the entrance pupil EP without loss. On the other hand, in the case where the liquid crystal panel 3 is in the scattering state, the transmitted light becomes a diffused beam Id. Thus, the beam within a recipient angle $\theta_0$ of the entrance pupil EP becomes the projected beam through the entrance pupil EP but the beam outside the recipient angle $\theta_0$ indicated by oblique lines is not projected. It can be seen that if the aperture diameter of the entrance pupil EP is changed by adjusting the aperture diameter of the diaphragm AST, the intensity of the projected beam when the liquid crystal panel 3 is the scattering state (dark level) is changed to thereby change the contrast ratio (a ratio of the bright level to the dark level of the projected image).

Figure 62D:
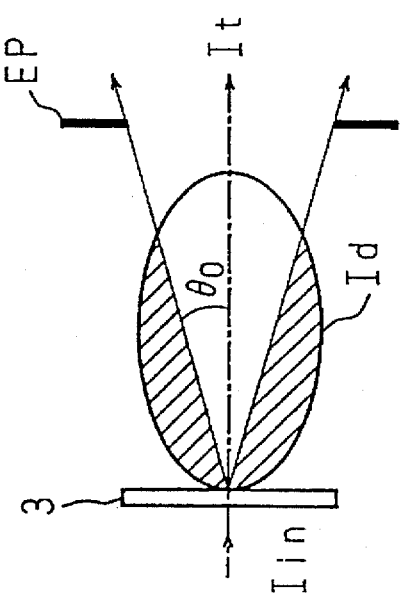
Figure 63A:
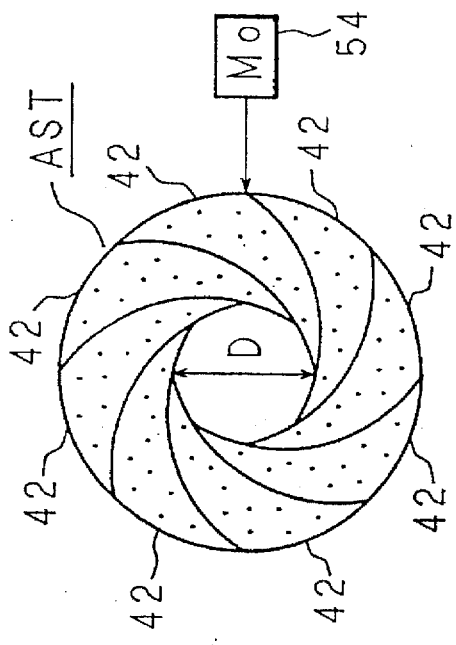
FIGS. 63(a)–(d), hereinafter collectively referred to as FIG. 63, are diagrams showing effects of the sixth invention in the case where an aperture diameter of a projection lens is made variable.

Since the illumination light (Iin in FIGS. 62(a) and (b)) incident upon the liquid crystal panel is in actuality not a perfectly parallel light, the luminance of the projected image when the liquid crystal panel is in the transparent state (bright level) is also changed by changing the aperture diameter of the diaphragm AST. More specifically, by constructing the diaphragm AST in the projection lens of the first invention so that the aperture diameter D thereof (effective F-number of the projection lens) can be made variable by means of a known diaphragm blade 42 as shown in FIGS. 6(c) and 62(d) or the like, the contrast ratio and the luminance level can be adjusted optimally according to an optical characteristic of the liquid crystal panel and the viewer's preference. Even if the liquid crystal panel is of the type whose state is not switched between the transparent state and the scattering state such as the TN liquid crystal, the luminance of the projected image (bright level) can be mainly changed since the illumination light is not perfectly parallel as described above. Thus, the invention is of course applicable to such a type of liquid crystal panel. Further, since the aberrations of the projection lens are reduced if the aperture diameter of the diaphragm AST is decreased, the projected image is formed with a high resolution.

The embodiment of the fifth invention is described using the construction of the projector according to the second and third inventions shown in FIGS. 58(a) and (b) as an exemplary construction. However, according to the fifth invention, an essential element of the second and third inventions, namely the first mirror 41, is not necessarily provided in the projection lens 4. The projection lens may be of the type including a known directly operable barrel structure. Further, the projection system is not limited to the rear system, but may be the front system using a reflection type screen.

<Sixth Invention>

Figure 63B:
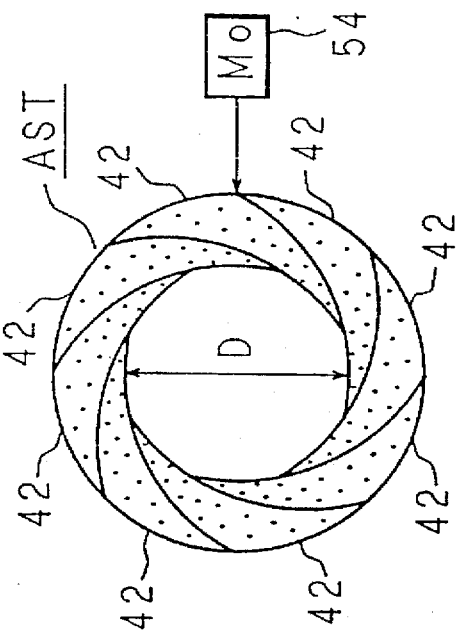
Figure 63C:
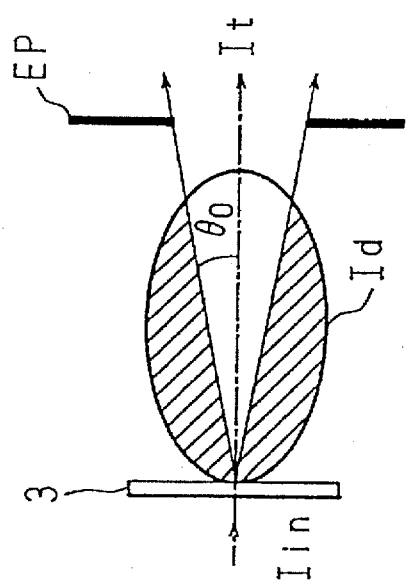
Figure 63D:
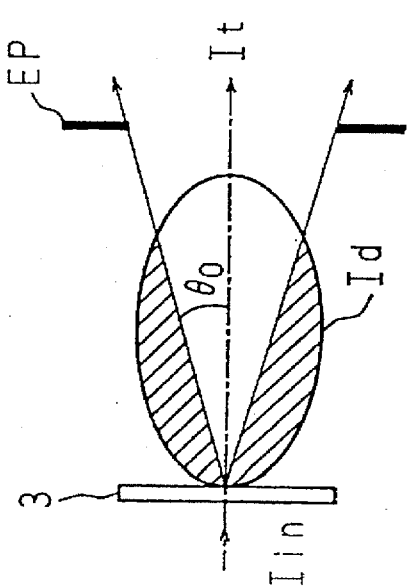

In a projection-type display apparatus according to the sixth invention, the aperture diameter of the diaphragm AST and/or a drive power of the lamp are controlled according to an output of an optical sensor for detecting the brightness of the external light in a place where the apparatus is installed, thereby automatically adjusting the luminance and/or contrast ratio of the projected image according to the state of the external light. The basic concept to adjust the aperture diameter of the diaphragm AST is similar to that of the fifth invention. FIGS. 63(b) and (d) show a case where the aperture diameter of the diaphragm AST is increased, while FIGS. 63(a) and (c) show a case where the aperture diameter of the diaphragm AST is decreased. According to the sixth invention, the aperture diameter D is made variable by driving a diaphragm blade 42 by means of a motor 54, thereby optimally adjusting the contrast ratio and the luminance level of the projected image.

An operation of a projector according to the sixth invention will be described with reference to FIGS. 60(a) and (b) which are referred-to explain the fourth invention. An optical sensor 51 detects the external light of the environment where the projection-type display apparatus is placed, and outputs an electric signal according to the brightness of the external light. An amplifier 52 amplifies the output of the optical sensor 51. Subsequently, a drive signal to be applied to the motor 54 and a drive power signal to be applied to a lamp 120 are generated in a motor/lamp control circuit 53 in accordance with the amplified output. The motor 54 adjusts the aperture diameter of the diaphragm AST according to an output of the control circuit 53. Specifically, the aperture diameter of the diaphragm AST is increased when the external light is bright while being decreased as the external light becomes darker. In the case where the liquid crystal material of the type whose state is switched between the transparent state and the scattering state such as the PDLC and the DSM liquid crystal is used as liquid crystal for the liquid crystal panels 3R, 3G, 3B, the projected image can be formed as follows by controlling the diaphragm AST as described above. When the external light is bright, the projected image of high luminance is formed at the reduced contrast ratio and resolution. On the other hand, when the external light is dark, the projected image of high resolution can be formed at the low luminance and high contrast ratio. In the case where the liquid crystal material of the type whose state is not switched between the transparent state and the scattering state such as TN liquid crystal is used as liquid crystal for the liquid crystal panels 3R, 3G, 3B, the luminance and resolution of the projected image can be mainly controlled by changing the aperture diameter of the diaphragm AST.

In the apparatus shown in FIGS. 60(a) and (b), not only the aperture diameter of the diaphragm AST but also the drive power of the lamp 120 is controlled according to the output of the control circuit 53. More specifically, the drive power of the lamp 120 is increased to thereby form the projected image of high luminance when the external light is bright, while being decreased to thereby form the projected image of low luminance when the external light is dark. It may be appropriate to execute both the diaphragm control and the lamp drive power control, or it may be sufficient to execute only either one of these.

Next, description is given on the mounting of the optical sensor 51 with reference to FIGS. 59(a)–(c). In these figures, the optical sensor 51 is arranged at an end of the screen 5 with a light receiving surface thereof faced outward of the cabinet 170. With this arrangement, the optical sensor 51 is allowed to detect the brightness of the external light incident upon the surface of the screen 5, and the processing after the amplifier 52 in FIGS. 60(a) and (b) can be carried out.

The embodiment of the sixth invention is described using the construction of the projector according to the fourth invention shown in FIGS. 60(a) and (b) as an exemplary construction. However, according to the sixth invention, an essential element of the fourth invention, namely the bent mirror 41, is not necessarily provided in the projection lens 4. The projection lens may be of the type including a known directly operable barrel structure not having a mirror. Further, the projection system is not limited to the rear system, but may be the front system using a reflection type screen. In the case of the front projection system, it is preferable either to dispose the optical sensor 51 on the reflection type screen or to dispose it at a part of or in the vicinity of the casing 200.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A projection-type display apparatus, comprising:
   projection means including a built-in image display device and adapted to project an image displayed on the image display device in an enlarged manner;
   a projection lens provided at an exiting portion of said projection means;
   a first mirror provided in said projection lens for reflecting a light beam that is substantially horizontal to an upward direction;
   a second mirror for reflecting a projected light beam exiting from said projection lens;
   a translucent screen on which the projected light beam reflected by said second mirror is incident, to thereby form an enlarged image; and
   a cabinet for accommodating said projection means and for holding said second mirror and said translucent screen;
   wherein a portion of said projection means before said first mirror including the image display device is asymmetrically mounted relative to a vertical center line of said translucent screen such that said portion of said projection means is entirely disposed on one side relative to the vertical center line of said translucent screen and arranged on a plane substantially perpendicular to the projected light beam exiting from said projection lens,
   wherein the projected light beam exiting from said projection lens is reflected in a substantially upward direction by said first mirror and then bent to a substantially horizontal direction by said second mirror so as to be incident upon said translucent screen.

2. A projection-type display apparatus according to claim 1, further comprising a dichroic prism provided immediately before the projection lens for combining light beams of three primary colors.

3. A projection-type display apparatus according to claim 1 wherein the projection lens is a zoom lens capable of adjusting a projection magnification.

4. The projection-type display apparatus of claim 2 wherein said dichroic prism is formed of plastic.

5. A projection-type display apparatus according to claim 1, wherein a direction of the image display device corresponding to the horizontal direction of the screen coincides with a direction of a center ray of an exiting light beam from the projection lens.

6. A projection-type display apparatus, comprising:
   projection means including a built-in image display device and adapted to project an image displayed on the image display device in an enlarged manner;
   a projection lens provided at an exiting portion of the projection means;
   a casing for holding an optical system of the projection means that is before the projection lens;
   a first mirror provided in the projection lens for reflecting a light beam;
   a second mirror for reflecting a projected light beam exiting from the projection lens;
   a translucent screen on which the projected light beam reflected by the second mirror is incident, to thereby form an enlarged image; and
   a cabinet for accommodating said projection means and for holding the second mirror and the screen;
   wherein the casing is arranged entirely on one side relative to a vertical center line of the screen;
   wherein the arrangement of the casing and the optical system the casing holds is such that the projected light beam exiting from the projection lens is reflected in a substantially upward direction by the first mirror and then reflected to a substantially horizontal direction by the second mirror so as to be incident upon the screen;
   further wherein the arrangement at the casing disposes the optical system on a plane substantially perpendicular to a center ray of an exiting light beam from the projection lens; and
   wherein the casing is further arranged such that an angle θ defined between a bottom portion of the casing and a bottom portion of the cabinet is set within a specified angle range.

7. A projection-type display apparatus according to claim 6 wherein the center ray from the projection lens exits in the vertical direction or in an oblique direction and is inclined from the vertical direction toward a rear surface of the apparatus by the angle θ, where θ satisfies the following condition:

$$0° \leq \theta \leq 20°.$$

8. A projection-type display apparatus according to claim 6, further comprising a dichroic prism provided immediately before the projection lens for combining beams of three primary colors.

9. A projection-type display apparatus according to claim 6 wherein the projection lens is a zoom lens capable of adjusting a projection magnification.

10. The projection-type display apparatus of claim 6, further comprising:

a diaphragm provided in said projection lens for restricting a recipient angle of a light beam exiting from the image display device, wherein an aperture diameter of the diaphragm is automatically adjusted according to an ambient light level.

11. The projection-type display apparatus of claim 10, further comprising:

a light sensor sensing the ambient light level, a motor for changing the aperture diameter of said diaphragm, and a control circuit controlling said motor to change the aperture diameter of said diaphragm in accordance with the ambient light level sensed by said light sensor.

12. The projection-type display apparatus of claim 6 wherein said projection means includes a lamp illuminating the image display device and further comprising:

a control circuit controlling a level of light output from the lamp according to an ambient light level.

13. The projection-type display apparatus of claim 6, further comprising:

a diaphragm provided in said projection lens for restricting a recipient angle of a light beam exiting from the image display device, wherein an aperture diameter of the diaphragm is adjustable.

14. A projection-type display apparatus, comprising:

projection means including a built-in image display device and adapted to project an image displayed on the image display device in an enlarged manner;

a projection lens provided at an exiting portion of the projection means;

a casing for holding an optical system of the projection means before the projection lens;

a mirror provided in the projection lens for reflecting a light beam;

a translucent screen on which the projected light beam exiting from the projection lens is incident, to thereby form an enlarged image; and a cabinet for accommodating the projection means and for holding the screen;

wherein a center ray of the projected light beam exiting from the projection lens is reflected to a substantially horizontal direction by the mirror so as to be incident upon the screen; an optical system in a portion of the projection means before the mirror is arranged on a plane substantially perpendicular to the center ray of an exiting light beam from the projection lens; and a portion of the casing, provided to be substantially parallel with the plane where the optical system is arranged, is substantially parallel with the screen.

15. A projection-type display apparatus according to claim 14, wherein a plurality of projection means are arranged in a matrix and a projected image of each projection means forms a unit image.

16. A projection-type display apparatus according to claim 14, further comprising a dichroic prism provided immediately before the projection lens for combining lights of three primary colors.

17. A projection-type display apparatus according to claim 14 wherein the projection lens is a zoom lens capable of adjusting a projection magnification.

18. The projection-type display apparatus of claim 14, further comprising:

a diaphragm provided in said projection lens for restricting a recipient angle of a light beam exiting from the image display device, wherein an aperture diameter of the diaphragm means is automatically adjusted according to an ambient light level.

19. The projection-type display apparatus of claim 18, further comprising:

a light sensor sensing the ambient light level, a motor for changing the aperture diameter of said diaphragm, and a control circuit controlling said motor to change the aperture diameter of said diaphragm in accordance with the ambient light level sensed by said light sensor.

20. The projection-type display apparatus of claim 14 wherein said projection means includes a lamp illuminating the image display device and further comprising:

a control circuit controlling a level of light output from the lamp according to an ambient light level.

21. The projection-type display apparatus of claim 8 wherein said dichroic prism is formed of plastic.

22. The projection-type display apparatus of claim 16 wherein said dichroic prism is formed of plastic.

23. The projection-type display apparatus of claim 14, further comprising:

a diaphragm provided in said projection lens for restricting a recipient angle of a light beam exiting from the image display device, wherein an aperture diameter of the diaphragm means is adjustable.

24. A projection-type display apparatus, comprising:

projection means including a built-in image display device and adapted to project an image displayed on the image display device in an enlarged manner;

a projection lens provided at an exiting portion of the projection means;

a screen on which the projected light beam exiting from the projection lens is incident to thereby form an enlarged image;

wherein the image display device is provided with such a function that an optical characteristic within a display plane is switched between a scattering state and a transparent state according to the brightness of the displayed image.

25. The projection-type display apparatus of claim 24, further comprising:

a diaphragm provided in said projection lens for restricting a recipient angle of a light beam exiting from the image display device, wherein an aperture diameter of the diaphragm is automatically adjusted according to an ambient light level.

26. The projection-type display apparatus of claim 25, further comprising:

a light sensor sensing the ambient light level, a motor for changing the aperture diameter of said diaphragm, and a control circuit controlling said motor to change the aperture diameter of said diaphragm in accordance with the ambient light level sensed by said light sensor.

27. The projection-type display apparatus of claim 24 wherein said projection means includes a lamp illuminating the image display device and further comprising:

a control circuit controlling a level of light output from the lamp according to an ambient light level.

28. The projection-type display apparatus of claim 24, further comprising:

a diaphragm provided in said projection lens for restricting a recipient angle of a light beam exiting from the image display device, wherein an aperture diameter of the diaphragm is adjustable.

29. A projection-type display apparatus, comprising:

projection means provided internally with an image display device and a lamp for illuminating the image display device, and adapted to project an image displayed on the image display device in an enlarged manner;

a projection lens provided at an exiting portion of the project means;

diaphragm means provided in the projection lens for restricting a recipient angle of a light beam incident upon the projection lens from the image display device;

a screen on which the projected light beam exiting from the projection lens is incident to thereby form an enlarged image;

a motor for causing an aperture diameter of the diaphragm means to vary;

an optical sensor for outputting an electric signal according to an amount of light incident thereon;

an amplifying circuit for amplifying an output of the optical sensor; and a control circuit for generating a drive control signal to be applied to the motor, the lamp, or both in accordance with an output of the amplifying circuit;

wherein the aperture diameter of the diaphragm means, a drive power of the lamp, or both are changed according to an illuminated state detected by the optical sensor.

30. A projection-type display apparatus according to claim 29 wherein the image display device is provided with such a function that an optical characteristic within a display plane is switched between a scattering state and a transparent state according to the brightness of the displayed image.

* * * * *